United States Patent
Francis et al.

(10) Patent No.: US 12,514,956 B2
(45) Date of Patent: Jan. 6, 2026

(54) ROTATING FRAME APPARATUS AND BIOCOMPATIBLE SCAFFOLD CONSTRUCT

(71) Applicant: Embody, Inc., Norfolk, VA (US)

(72) Inventors: Michael P. Francis, Norfolk, VA (US); Kyle Christensen, Norfolk, VA (US)

(73) Assignee: Embody, Inc., Norfolk, VA (US)

( * ) Notice: Subject to any disclaimer, the term of this patent is extended or adjusted under 35 U.S.C. 154(b) by 211 days.

(21) Appl. No.: 17/538,762

(22) Filed: Nov. 30, 2021

(65) Prior Publication Data

US 2022/0193303 A1    Jun. 23, 2022

Related U.S. Application Data

(60) Provisional application No. 63/119,618, filed on Nov. 30, 2020, provisional application No. 63/119,628, filed on Nov. 30, 2020.

(51) Int. Cl.
*A61L 27/24* (2006.01)
*A61L 27/36* (2006.01)
(Continued)

(52) U.S. Cl.
CPC ............ *A61L 27/24* (2013.01); *A61L 27/367* (2013.01); *B33Y 10/00* (2014.12); *B33Y 70/00* (2014.12); *B33Y 80/00* (2014.12); *A61L 2430/30* (2013.01)

(58) Field of Classification Search
CPC .... A61L 27/24; A61L 27/367; A61L 2430/30; A61L 27/34; A61L 27/3826; A61L 27/3834; A61L 27/386; A61L 27/3873; A61L 2430/10; A61L 27/56; B33Y 10/00; B33Y 70/00; B33Y 80/00; A61F 2/00
See application file for complete search history.

(56) References Cited

U.S. PATENT DOCUMENTS 5,711,960 A    1/1998  Shikinami
6,224,630 B1 *  5/2001  Bao .................. A61L 31/048
                                                    623/16.11
(Continued)

FOREIGN PATENT DOCUMENTS

AU    2021385611 B2    7/2025
JP    H07236688 A      9/1995
(Continued)

OTHER PUBLICATIONS

Christoffer K. Abrahamsson et al., "Condrogenesis and Mineralization During In Vitro Culture of Human Mesenchymal Stem Cells on Three-Dimensional Woven Scaffolds", published 2010; Tissue Engineering: Part A vol. 16, No. 12; DOI: 10.1089/ten.tea.2010.0190.

(Continued)

*Primary Examiner* — Jennifer A Steele
(74) *Attorney, Agent, or Firm* — SCHWEGMAN LUNDBERG & WOESSNER, P.A.

(57) ABSTRACT

A biocompatible scaffold construct includes a plurality of collagen fiber strands, a first portion of which have been coated by a first biocompatible solution and, optionally, a second portion of which have been coated by a second biocompatible solution different than the first biocompatible solution. The coatings may include cells. And the scaffold is constructed on rotating frame collectors.

3 Claims, 38 Drawing Sheets
(19 of 38 Drawing Sheet(s) Filed in Color)

(51) Int. Cl.
  *B33Y 10/00*  (2015.01)
  *B33Y 70/00*  (2020.01)
  *B33Y 80/00*  (2015.01)

(56) References Cited

U.S. PATENT DOCUMENTS

| | | | |
|---|---|---|---|
| 7,622,299 | B2 | 11/2009 | Sanders et al. |
| 8,367,148 | B2 | 2/2013 | Greenhalgh et al. |
| 9,125,759 | B2 | 9/2015 | Greenhalgh et al. |
| 9,179,976 | B2 | 11/2015 | Paulos et al. |
| 9,902,932 | B2 | 2/2018 | Nain |
| 10,150,258 | B2 | 12/2018 | Feinberg et al. |
| 10,150,884 | B2 | 12/2018 | Wroblesky et al. |
| 10,265,156 | B2 | 4/2019 | Van Kampen |
| 10,624,993 | B2 | 4/2020 | Matheny |
| 2008/0187996 | A1* | 8/2008 | Baca .............. C12N 5/0075 435/396 |
| 2009/0163936 | A1* | 6/2009 | Yang .............. A61L 27/3804 606/151 |
| 2013/0183352 | A1* | 7/2013 | Xie .............. A61L 27/306 623/23.72 |
| 2016/0288414 | A1 | 10/2016 | Ozbolat et al. |
| 2017/0361534 | A1 | 12/2017 | Fernandez-Nieves et al. |
| 2018/0243481 | A1 | 8/2018 | Martin et al. |
| 2018/0289490 | A1* | 10/2018 | Estes .............. A61P 19/08 |
| 2019/0255220 | A1 | 8/2019 | Li |
| 2019/0291350 | A1 | 9/2019 | Feinberg et al. |
| 2019/0350690 | A1* | 11/2019 | Koob .............. B29C 53/56 |
| 2020/0215228 | A1 | 7/2020 | Coulombe et al. |
| 2020/0246505 | A1 | 8/2020 | Francis |
| 2021/0260256 | A1* | 8/2021 | Boodagh .............. A61L 31/16 |

FOREIGN PATENT DOCUMENTS

| | | | | |
|---|---|---|---|---|
| JP | H07265406 | A | 10/1995 | |
| JP | 2000511091 | A | 8/2000 | |
| JP | 2005278909 | A | 10/2005 | |
| JP | 2005537845 | A | 12/2005 | |
| JP | 2015526108 | A | 9/2015 | |
| JP | 2023551694 | A | 12/2023 | |
| JP | 2025108455 | A | 7/2025 | |
| WO | WO-2010048281 | A1 * | 4/2010 | .......... C07K 14/78 |
| WO | WO2011/126294 | | 10/2011 | |
| WO | WO-2014078080 | A1 * | 5/2014 | .......... A61K 33/38 |
| WO | WO-2017077985 | A1 | 5/2017 | |
| WO | WO-2020160491 | A1 | 8/2020 | |
| WO | 2022115801 | | 6/2022 | |

OTHER PUBLICATIONS

Eileen Gentleman et al., "Mechanical characterization of collagen fibers and scaffolds for tissue engineering", accepted Mar. 24, 2003; Biomaterials 24 (2003) 3805-3813; DOI:10.1016/S0142-9612(03)00206-0 (see abstract).
Eileen Gentleman et al., "Development of Ligament-Like Structural Organization and Properties in Cell-Seeded Collagen Scaffolds in vitro", published online Feb. 7, 2006; Annals of Biomedical Engineering, vol. 34, No. 5, pp. 726-736; DOI: 10.1007/s10439-005-9058-4 (see p. 5).
Xiping Jiang et al., "3D printing of multilayered scaffolds for rotator cuff tendon regeneration", accepted Apr. 23, 2020; Bioactive Materials 5 (2020) 636-643; DOI: 10.1016/j.bioactmat.2020.04.017.
Nicholas J. Kaiser et al., "Digital Design and Automated Fabrication of Bespoke Collagen Microfiber Scaffolds", published 2019; Tissue Engineering; DOI: 10.1089/ten.TEC.2018.0379 (see abstract).
Jennifer L. Makridakis et al., "Design of a Novel Engineered Muscle Construct Using Muscle Derived Fibroblastic Cells Seeded onto Braided Collagen Threads", 2009 IEEE 35th Annual Northeast Bioengineering Conference, published Apr. 3-5, 2009; DOI: 10.1109/NEBC.20009.4967673 (see abstract).
Tyler K. Merceron et al., "A 3D bioprinted complex structure for engineering the muscle-tendon unit", published Jun. 17, 2015; Biofabrication 7 (2015) 035003; DOI: 10.1088/1758-5090/7/3/035003 (see abstract).
Sean V. Murphy et al., "3D bioprinting of tissues and organs", published Aug. 2014; Nature Biotechnology vol. 32 No. 8; DOI: 10.1038/nbt.2958.
Sean V. Murphy et al., "Opportunities and challenges of translational 3D bioprinting", Nature Biomedical Engineering, 4, pp. 370-380 (2020); DOI: 10.1038/s41551-019-0471-7.
Sarah M. Somers et al., "Myoblast maturity on aligned microfiber bundles at the onset of strain application impacts myogenic outcomes", published Jun. 15, 2019; Acta Biomaterialia ; DOI: 10.1016/j.actbio.2019.06.024 (see abstract).
Ali Tamayol et al., "Fiber-based tissue engineering: Progress, challenges, and opportunities", published Nov. 27, 2012; Biotechnology Advances 31 (2013) pp. 669-687; DOI: 10.1016/j.biotechadv.2012.11.007.
Kyle W. Christensen et al., "Assembled Cell-Decorated Collagen (AC-DC) bioprinted implants mimic musculoskeletal tissue properties and promote functional recovery," published Jul. 2, 2021, and available pre-print via bioRxiv at: https://doi.org/10.1101/2021.06.22.449431.
International Search Report and Written Opinion mailed Mar. 29, 2022 for Application No. PCT/US 21/61195.
International Search Report and Written Opinion mailed Apr. 18, 2022 for Application No. PCT/US 21/61259.
"International Application Serial No. PCT US2021 061259, International Search Report mailed Apr. 18, 2022", 4 pgs.
"International Application Serial No. PCT US2021 061259, Written Opinion mailed Apr. 18, 2022", 5 pgs.
"International Application Serial No. PCT US2021 061259, Invitation to Pay Additional Fees mailed Feb. 23, 2022", 3 pgs.
"International Application Serial No. PCT US2021 061259, International Preliminary Report on Patentability mailed Jun. 15, 2023", 7 pgs.
"Australian Application Serial No. 2021385611, First Examination Report mailed Mar. 28, 2024", 3 pgs.
"Australian Application Serial No. 2021385611, Response filed Oct. 31, 2024 to First Examination Report mailed Mar. 28, 2024", 29 pgs.
"Australian Application Serial No. 2021385611, Subsequent Examination Report mailed Nov. 6, 2024", 4 pgs.
"Canadian Application Serial No. 3,203,473, Examiners Rule 86(2) Report mailed Jul. 29, 2024", 4 pgs.
"Canadian Application Serial No. 3,203,473, Response filed Nov. 26, 2024 to Examiners Rule 86(2) Report mailed Jul. 29, 2024", 17 pgs.
"European Application Serial No. 21899240.2, Extended European Search Report mailed Dec. 12, 2024", 10 pgs.
"Japanese Application Serial No. 2023-532721, Notification of Reasons for Refusal mailed Jul. 23, 2024", w/ English translation, 10 pgs.
"Japanese Application Serial No. 2023-532721, Response filed Oct. 22, 2024 to Notification of Reasons for Refusal mailed Jul. 23, 2024", W/ English Claims, 12 pgs.
Christensen, Kyle W., et al., "Assembled Cell-Decorated Collagen (AC-DC) bioprinted implants mimic musculoskeletal tissue properties and promote functional recovery", bioRxiv, [Online]. Retrieved from the Internet: <URL:https ://www.biorxiv.org/content/10.1101/2021.06.22.449431v2.full>, (Jul. 2, 2021), 32 pgs.
Hiroaki, Onoe, et al., "Metre-long cell-laden microfibres exhibit tissue morphologies and functions", Nature Materials, vol. 12, (Jan. 1, 2013), 584-590.
Jamney, P, et al., "Fibrin gels and their clinical and bioengineering applications", J. R. Soc. Interface, 2009, vol. 6, (Sep. 18, 2008), 10 pgs.
"Canadian Application Serial No. 3,203,473, Examiners Rule 86(2) Report mailed Aug. 1, 2025", 5 pgs.
"European Application Serial No. 21899240.2, Response Filed May 28, 2025 to Extended European Search Report mailed Dec. 12, 2024", 18 pgs.

(56) References Cited

OTHER PUBLICATIONS

"Japanese Application Serial No. 2023-532721, Response filed Mar. 26, 2025 to Examiners Decision of Final Refusal mailed Nov. 26, 2024", w/ current English claims, 14 pgs.

"Japanese Application Serial No. 2023-532721, Examiners Decision of Final Refusal mailed Nov. 26, 2024", w English translation, 8 pgs.

"Australian Application Serial No. 2021385611, Response filed Mar. 18, 2025 to Subsequent Examination Report mailed Nov. 6, 2024", 11 pgs.

\* cited by examiner

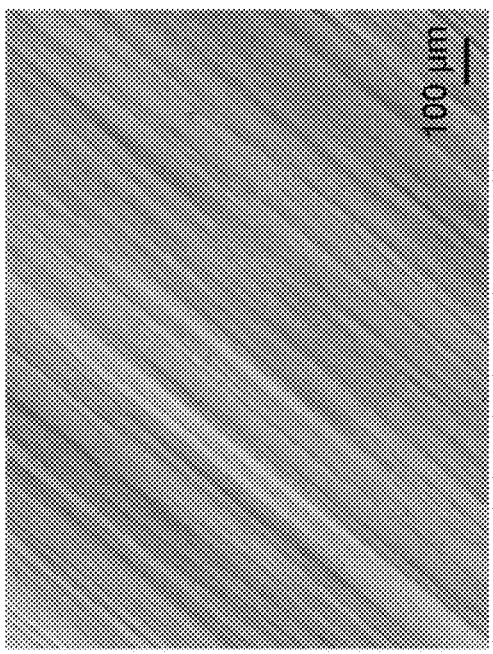
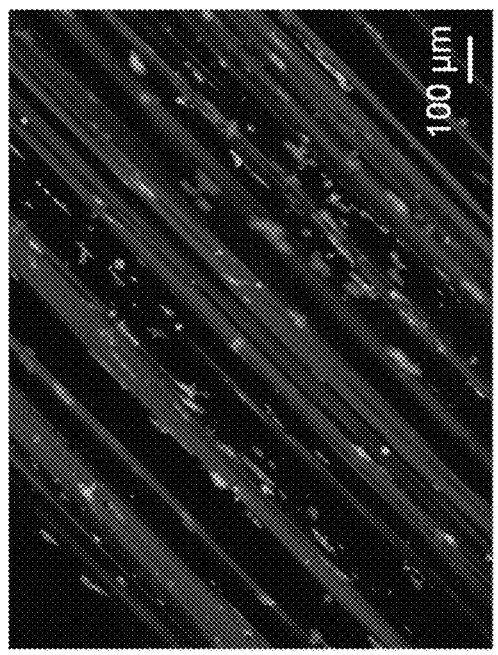
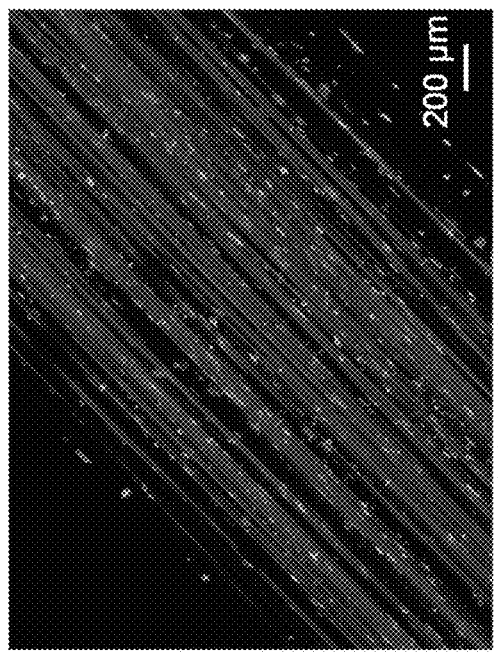
FIG. 14
FIG. 15
FIG. 16
FIG. 17

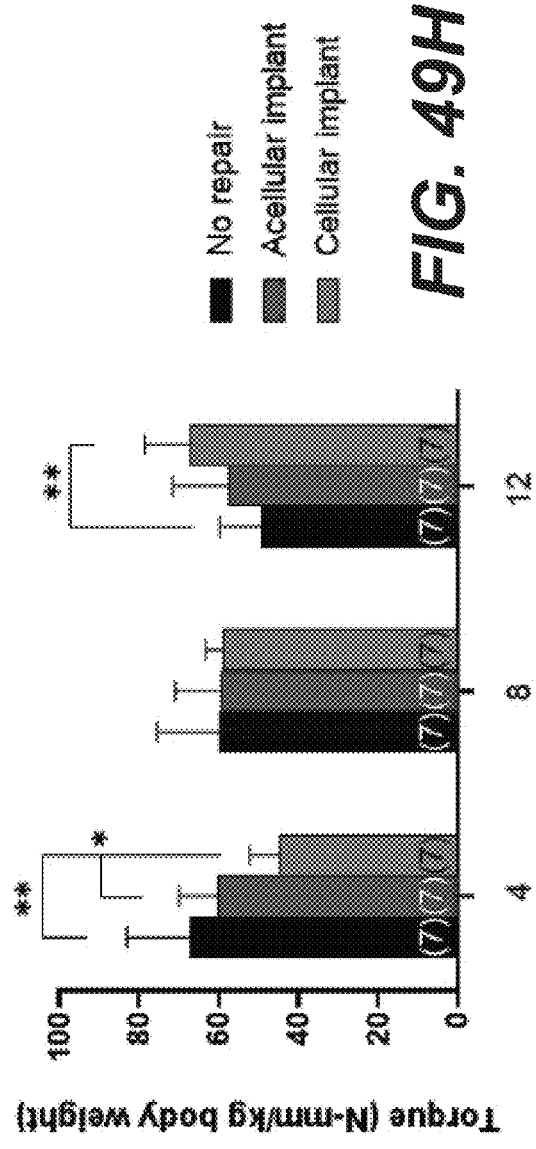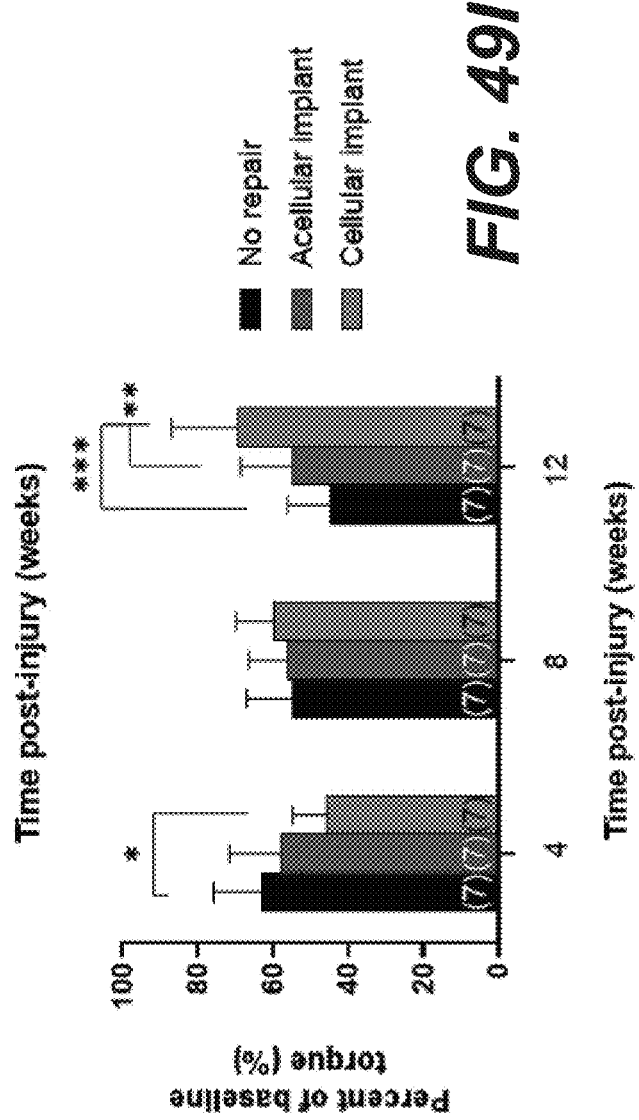

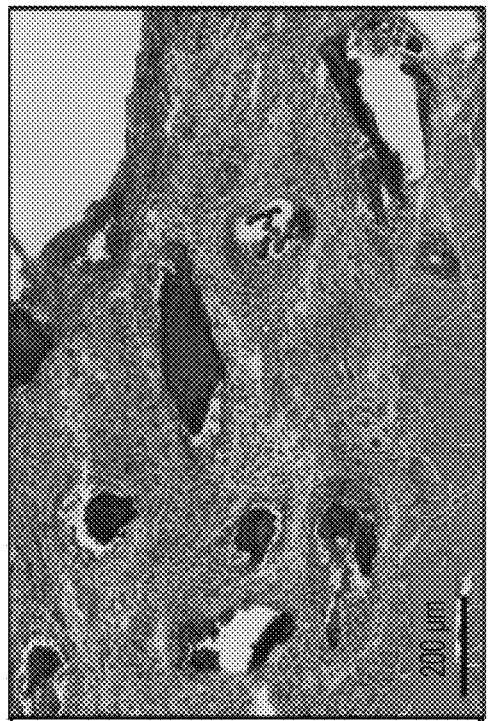
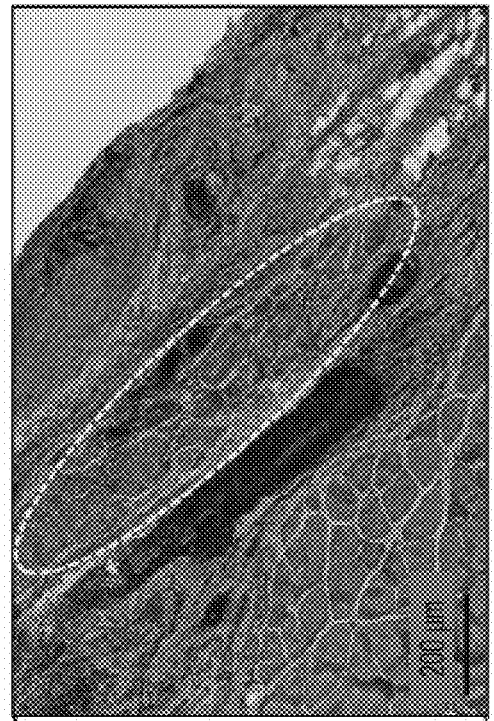
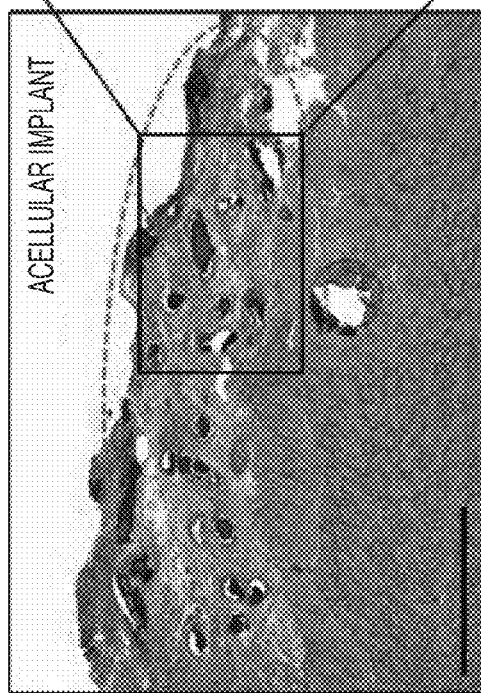
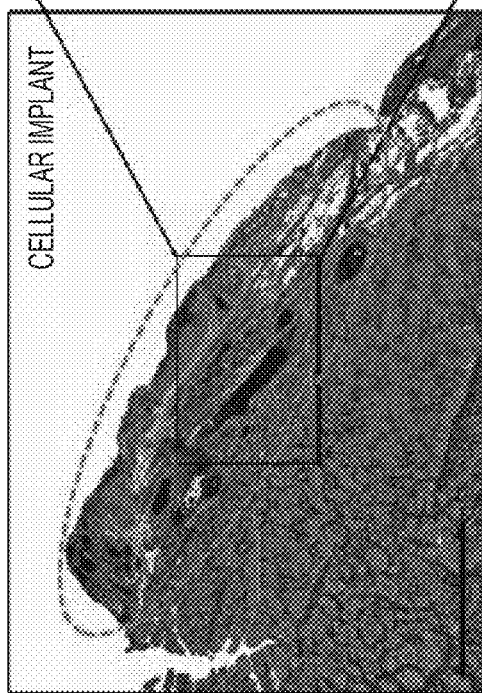
FIG. 50E
FIG. 50F

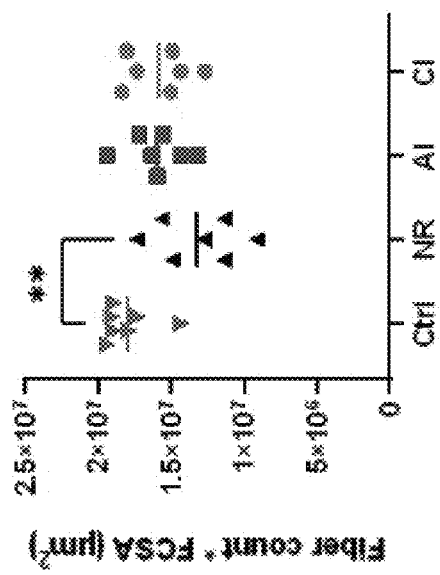
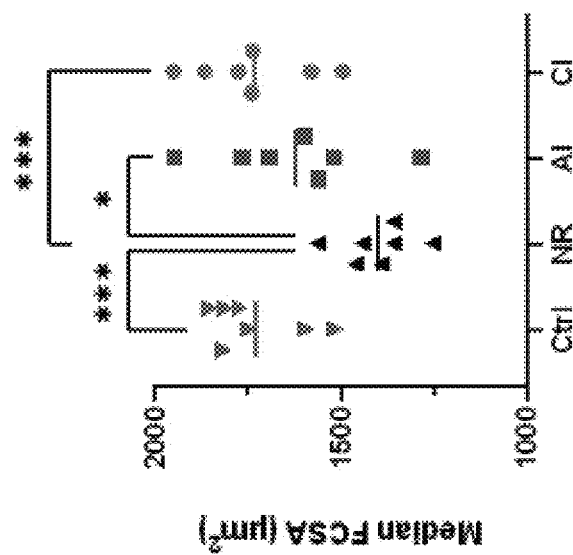
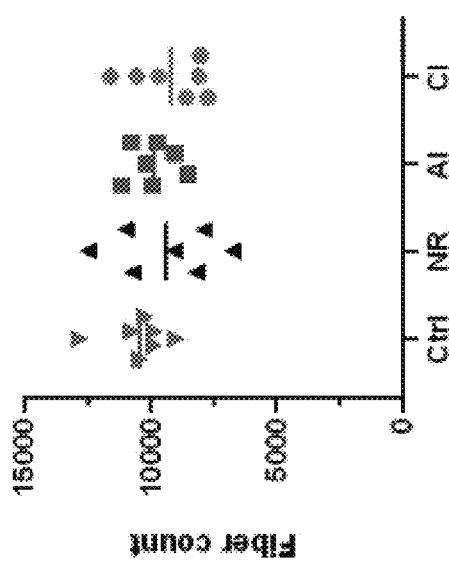
FIG. 53K
FIG. 53J
FIG. 53I

ROTATING FRAME APPARATUS AND BIOCOMPATIBLE SCAFFOLD CONSTRUCT

CROSS-REFERENCE TO RELATED APPLICATIONS

This application claims priority to U.S. Provisional Patent Application No. 63/119,628, filed Nov. 30, 2020, and entitled "Rotating Frame Apparatus and Composite Biological Scaffold," the entire disclosure of which is incorporated herein by reference. This application also claims priority to U.S. Provisional Patent Application No. 63/119,618, filed Nov. 30, 2020, and entitled "Micropost Array Apparatus and Composite Biological Scaffold," the entire disclosure of which is incorporated herein by reference.

STATEMENT OF U.S. GOVERNMENT SUPPORT

This invention was made with government support under award W81XWH1910475 awarded by DMDRP for the CDMRP. The government has certain rights in the invention.

BACKGROUND

Musculoskeletal tissue injuries are among the most common injuries treated in the United States. However, current treatment options often lead to impaired function of the injured tissue and high rates of reinjury. As such, numerous tissue engineering approaches have been developed to manufacture scaffold-like grafts aiming to facilitate the regeneration of functional native-like tissue. Recreating the biochemical, morphological, and functional properties of the targeted tissue is of particular importance.

Three-dimensional (3D) bioprinting, an additive manufacturing approach, is commonly implemented for the fabrication of scaffolds with potential regenerative medicine applications. 3D bioprinting enables the precise manipulation of cells and biomaterials into designed and often complex 3D geometries. However, bioprinting approaches typically utilize soft hydrogels as the primary structural material [Mandrycky 2016]. The mechanical properties of these hydrogels often are orders of magnitude below those of native ligament and tendon tissues. As such, typical bioprinting approaches cannot adequately recreate the functional properties of musculoskeletal tissue and are unable to produce load-bearing scaffolds for tissue repair.

Hybrid bioprinting approaches have been developed that incorporate thermoplastic polymers along with hydrogels to improve the mechanical properties of printed parts [Merceron 2015]. However, many printed synthetic materials still have limited mechanical strength and may negatively affect injury healing and tissue regeneration.

To address these challenges, numerous fiber-based tissue engineering approaches have been developed using strong, natural biomaterials such as collagen [Tamayol 2013]. These approaches build on the well-established clinical use of textiles but incorporate additional means to produce cellularized scaffolds.

Also, the use of therapeutic cells offers potential to improve the treatment of genetic, degenerative, inflammatory, and traumatic musculoskeletal disorders [O'Keefe 2019]. As opposed to biomaterial scaffolds alone, this may improve healing rates and overall regeneration and functional recovery of tissues. This may be especially true in the case of ligament- and tendon-like tissue, for which passive cellular ingrowth may be limited in the hypocellular and hypovascular environments.

Some approaches to producing biomaterial scaffolds utilize premanufactured fibers produced by traditional textile manufacturing processes of weaving, knitting, and braiding. Biomaterial fibers can be produced as feedstock for these processes by wetspinning, microfluidic spinning, biospinning, interface complexation, and melt spinning [Tamayol 2013]. Weaving can be used to create polymer scaffolds with designed porosity, morphology, and geometry by interlacing two sets of warps or wefts at right angles [Abrahamsson 2010]. Knitting is a commonly used approach for fabricating surgical meshes and forms 3D geometries from intertwining yarns or threads in a series of interconnected loops [Sahoo 2007]. Braiding is capable of forming complex biomaterial structures or patterns by intertwining multiple fiber stands [Walters 2012]. Additionally, relatively simple geometries such as bundles of parallel fibers bound by suture have been fabricated by manual assembly [Gentleman 2006].

Scaffold fabrication processes that generate biomaterial scaffolds utilizing fibers produced as an integral part of the scaffold include electrospinning, wetspinning, and direct writing. These approaches utilize processes such as solvent evaporation, polymerization within a solution bath, or temperature-based recrystallization to form microfiber scaffolds from biomaterial solutions. For example, electrospinning has been used to form randomly oriented or aligned polymer fiber mats with biomimetic surface patterns to direct tissue formation [Mauck 2009]. Wetspinning, in addition to being used to form fiber as feedstock, can be utilized to fabricate scaffolds during the fiber formation process by collecting fibers on a rotating mandrel [Kaiser 2019]. Direct writing is capable of forming fiber-based scaffolds with excellent control of porosity, fiber size, and fiber orientation [Wu 2015].

However, the post-fabrication cell seeding processes required to create cellularized scaffolds using weaving, knitting, braiding, electrospinning, wetspinning, and direct writing can be subject to human variability, and may be highly dependent on the macro-scale geometry and porosity of the biomaterial scaffolds. For example, small pore sizes may limit cell infiltration during seeding, especially for scaffolds with a high thickness or complex 3D geometry. Conversely, scaffolds with high porosity may have difficulty in retaining seeded cells uniformly throughout. The dependency of cell seeding on scaffold micro- and macro-scale geometry may lead to limited control of cell distributions throughout, particularly for the fabrication of heterogeneous tissues with distinct cell populations in designed regions.

To address challenges with seeding cells onto prefabricated scaffolds, various fiber-based approaches have been developed that directly manipulate cells or cell-laden materials during the scaffold manufacturing process [Tamayol 2013]. Compared to techniques requiring cell seeding, these approaches may result in cellularized scaffolds with improved consistency and control of cell distributions throughout. Polyester threads have been coated with a cell-laden hydrogel and wrapped around a cylindrical mandrel to form 3D tubular structures [Liberski 2011]. A microfluidic system was used to form core-shell hydrogel fibers encapsulating cells which could be implanted without forming a secondary scaffold structure [Sugimoto 2011]. A micro-weaving approach was utilized to form centimeter-scale living fabrics from similar cell-laden core-shell hydrogel fibers [Onoe 2011]. However, the limited mechanical strength of cell-laden hydrogel fibers limits their ability to be processed using traditional textile fabrication approaches [Onoe 2011]. In a direct writing approach similar to typical hydrogel-based bioprinting, a cell suspension was cross-linked within a printhead to form cell-laden scaffolds from fiber-like extrusions [Ghorbanian 2014]. Overall, poor mechanical properties of scaffolds formed using these hydrogel-based approaches have limited applicability as load-bearing scaffolds for the treatment of musculoskeletal tissue injuries.

It would be desirable to address one or more of the issues discussed above.

SUMMARY

In one aspect, the present disclosure is directed to a scaffold construct comprising a plurality of collagen microfiber strands fabricated on a rotating frame, where the strands are coated in a biocompatible solution having cells uniformly suspended therein; and the strands have properties comparable to biological tissue.

The scaffold construct may include a first biocompatible solution, a second biocompatible solution different than the first biocompatible solution, and a plurality of substantially aligned collagen microfiber strands. A first portion of the collagen microfibers may be coated by the first biocompatible solution and a second portion of the collagen microfibers may be coated by the second biocompatible solution.

In another aspect, the present disclosure is directed to an apparatus for making a scaffold construct. The apparatus may include a delivery device configured to dispense a collagen microfiber strand through a needle; a substantially planar frame; a solution manifold including a first well configured to receive a first biocompatible solution, the solution manifold being disposed between the delivery device and the substantially planar frame; and a rotation device configured to rotate the substantially planar frame about an axis of rotation. The apparatus may be configured such that rotation of the substantially planar frame dispenses the collagen microfiber strand through the needle and the solution manifold, thereby coating the collagen microfiber strand with the first biocompatible solution in the solution manifold, and wraps the collagen microfiber strand about the substantially planar frame.

In another aspect, the present disclosure is directed to a method of making a scaffold construct. The method may include affixing a collagen microfiber strand to a substantially planar frame and rotating the substantially planar frame about an axis of rotation in order to wrap the collagen microfiber strand around the substantially planar frame. Wrapping the collagen microfiber strand around the substantially planar frame draws the collagen microfiber strand from a delivery device, thereby pulling the collagen microfiber strand through a needle and drawing the collagen microfiber strand through a first well of a solution manifold filled with a first biocompatible solution.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

The groups of clauses below identify the various disclosed embodiments. It will be understood that features of any of the groups of clauses may be combined and/or interchanged with features from one or more of the other groups of clauses.

Clauses—Two-Solution Approach

1. A scaffold construct, comprising:
a plurality of collagen microfibers;
wherein a first portion of the collagen microfibers is coated by a first biocompatible solution and a second portion of the collagen microfibers is coated by a second biocompatible solution.

2. The scaffold construct of clause 1, wherein the plurality of collagen microfibers are substantially parallel to one another.

3. The scaffold construct of clause 1, wherein the plurality of collagen microfibers includes multiple layers of collagen microfibers.

4. The scaffold construct of clause 3, wherein the collagen microfibers of adjacent layers are substantially aligned with one another.

5. The scaffold construct of clause 1, wherein at least one of the first biocompatible solution and the second biocompatible solution includes cells suspended in hyaluronic acid solution.

6. The scaffold construct of clause 5, wherein the cells suspended in hyaluronic acid solution are prepared in a cell media providing a cytocompatible environment.

7. The scaffold construct of clause 1, wherein the first portion of the collagen microfibers coated by the first biocompatible solution is disposed in a first longitudinal portion of the scaffold; and
wherein the second portion of the collagen microfibers coated by the second biocompatible solution is discretely disposed in a second longitudinal portion of the scaffold; and
wherein the first longitudinal portion is different than the second longitudinal portion.

8. An apparatus for making a scaffold construct, the apparatus comprising:
a delivery device configured to dispense a collagen microfiber strand through an orifice;
a rotatable frame;
a solution manifold including a first well configured to receive a first biocompatible solution, the solution manifold being disposed between the delivery device and the rotatable frame; and
a rotation device configured to rotate the rotatable frame about an axis of rotation;
wherein the apparatus is configured such that rotation of the rotatable frame draws the collagen microfiber strand through the orifice and the solution manifold, thereby coating the collagen microfiber strand with the first biocompatible solution in the solution manifold, and wraps the collagen microfiber strand about the rotatable frame.

9. The apparatus of clause 8, wherein the apparatus is configured such that the delivery device and the rotatable frame are translated relative to one another along the axis of rotation in order to wrap the collagen microfiber strand about different portions of the rotatable frame.

10. The apparatus of clause 8, wherein the first well of the solution manifold includes a first opening configured to permit the collagen microfiber strand to pass therethrough.

11. The apparatus of clause 10, wherein the solution manifold includes a second well configured to receive a second biocompatible solution that is different than the first biocompatible solution, the second well including a second opening configured to permit the collagen microfiber strand to pass therethrough.

12. The apparatus of clause 11, wherein the solution manifold includes a slot connecting the first opening and the second opening.

13. The apparatus of clause 12, wherein the delivery device is configured to translate the solution manifold in a direction parallel with the slot in order to select which of the first well and the second well the collagen microfiber strand is drawn through.

14. A method of making a scaffold construct, comprising:
affixing a collagen microfiber strand to a rotatable frame; and
rotating the rotatable frame about an axis of rotation in order to wrap the collagen microfiber strand around the rotatable frame;
wherein wrapping the collagen microfiber strand around the rotatable frame draws the collagen microfiber strand from a delivery device, thereby dispensing the collagen microfiber strand through an orifice and drawing the collagen microfiber strand through a first well of a solution manifold filled with a first biocompatible solution.

15. The method of clause 14, further including translating the rotatable frame and a dispensing device with respect to one another along the axis of rotation in order to wrap the collagen microfiber strand about different portions of the rotatable frame.

16. The method of clause 14, wherein drawing the collagen microfiber strand through the first well of the solution manifold includes drawing the collagen microfiber strand through a first opening in the first well.

17. The method of clause 16, further including selectively drawing the microfiber strand through the first well containing the first biocompatible solution and a second well of the solution manifold containing a second biocompatible solution that is different than the first biocompatible solution.

18. The method of clause 17, wherein the second well includes a second opening configured to permit the collagen microfiber strand to pass therethrough;
wherein the solution manifold includes a slot connecting the first opening and the second opening; and
the method further comprising translating the solution manifold in a direction parallel with the slot in order to select which of the first well and the second well the collagen microfiber strand is drawn through.

19. The method of clause 14, wherein the biocompatible solution includes one or more additives to be coated on the collagen microfiber strand; and
wherein the one or more additives are selected from the group consisting essentially of growth factors, antibiotics, small-molecule pharmaceuticals.

20. A composite scaffold, comprising:
a plurality of elongated collagen fiber strands fabricated on a rotating frame;
wherein the strands are coated in a hyaluronic acid solution having mammalian cells uniformly suspended therein, and preferably connective tissue cells, including tenocytes, and preferably human and non-human mammalian cells; and
wherein the strands have a cross-sectional density comparable to native mammalian or human muscle tissue.

Clauses—Single-Solution Approach

1. A scaffold construct, comprising:
a plurality of collagen microfibers arranged in an organized configuration and coated with a biocompatible solution;
the collagen microfibers arranged in a continuous loop.

2. The scaffold construct of clause 1, wherein the plurality of collagen microfibers are substantially parallel to one another.

3. The scaffold construct of clause 1, wherein the biocompatible solution includes cells suspended in hyaluronic acid solution.

4. The scaffold construct of clause 1, wherein the scaffold construct has mechanical properties approximating or exceeding those of human musculoskeletal tissues.

5. The scaffold construct of clause 4, wherein the scaffold construct has mechanical properties approximating or exceeding those of human tendon and ligament tissues.

6. The scaffold construct of clause 5, wherein the scaffold construct has a mean ultimate tensile strength (UTS), tensile modulus, and strain at break that approximate or exceed those of human anterior cruciate ligament (ACL), human supraspinatus tendon, and human muscle.

7. An apparatus for making a scaffold construct, the apparatus comprising:
a delivery device configured to dispense a collagen microfiber strand through an orifice;
a rotatable frame;
a strand coating system configured to coat the collagen microfiber strand with a biocompatible solution during dispensing of the strand, the solution strand coating system being disposed between the delivery device and the rotatable frame; and
a rotation device configured to rotate the rotatable frame about an axis of rotation;
wherein the apparatus is configured such that rotation of the rotatable frame draws the collagen microfiber strand through the orifice, thereby coating the collagen microfiber strand with the biocompatible solution, and wraps the collagen microfiber strand about the rotatable frame.

8. The apparatus of clause 7, wherein the apparatus is configured such that the delivery device and the substantially planar frame are translated relative to one another along the axis of rotation in order to wrap the collagen microfiber strand about different portions of the substantially planar frame.

9. The apparatus of clause 7, wherein the rotatable frame includes at least two parallel beams about which the collagen microfiber strand may be wound, thus forming a scaffold construct configured in a continuous loop.

10. The apparatus of clause 9, wherein the rotatable frame is spring biased in order to maintain the continuous loop of scaffold construct under tension.

11. The apparatus of clause 9, wherein the rotatable frame includes removable end pieces that fix the parallel beams with respect to one another; and wherein removal of the removable end pieces enables the continuous loop scaffold construct to be slid off the parallel beams.

12. The apparatus of clause 7, wherein the rotatable frame is configured to be submerged in a cell culture.

13. The apparatus of clause 7, wherein the delivery device is configured to dispense multiple strands of collagen microfiber simultaneously.

14. A method of making a scaffold construct, comprising:
affixing a collagen microfiber strand to a rotatable frame; and
rotating the rotatable frame about an axis of rotation in order to wrap the collagen microfiber strand around the rotatable frame;
wherein wrapping the collagen microfiber strand around the rotatable frame draws the collagen microfiber strand from a delivery device, thereby dispensing the collagen microfiber strand through an orifice and drawing the collagen microfiber strand through a biocompatible solution.

15. The method of clause 14, further including translating the substantially planar frame and a dispensing device with respect to one another along the axis of rotation in order to wrap the collagen microfiber strand about different portions of the rotatable frame.

16. The method of clause 14, wherein the rotatable frame includes at least two parallel beams about which the collagen microfiber strand may be wound, thus forming a scaffold construct configured in a continuous loop.

17. The method of clause 16, further including removing removable end pieces that fix the parallel beams with respect to one another and sliding the scaffold construct off the parallel beams.

18. The method of clause 14, further including submerging the rotatable frame with collagen microfiber wrapped on it in a cell culture.

19. The method of clause 14, wherein multiple collagen microfibers are simultaneously drawn by the rotation of the rotatable frame.

20. The method of clause 14, wherein the biocompatible solution includes one or more additives to be coated on the collagen microfiber strand; and
wherein the one or more additives are selected from the group consisting essentially of growth factors, antibiotics, small-molecule pharmaceuticals.

Clauses—Submerged Rotating Frame Approach

1. A scaffold construct, comprising:
a plurality of collagen microfibers arranged in an organized configuration and coated with a biocompatible hydrogel;
the collagen microfibers arranged in a continuous loop.

2. The scaffold construct of clause 1, wherein the biocompatible hydrogel includes cells.

3. The scaffold construct of clause 1, wherein the biocompatible hydrogel includes a fibrin gel.

4. The scaffold construct of clause 1, wherein the scaffold construct has mechanical properties that approximate or exceed those of human musculoskeletal tissues.

5. The scaffold construct of clause 4, wherein the scaffold construct has mechanical properties that approximate or exceed those of human tendon and ligament tissues.

6. The scaffold construct of clause 5, wherein the scaffold construct has a mean ultimate tensile strength (UTS), tensile modulus, and strain at break that approximate or exceed those of human anterior cruciate ligament (ACL), human supraspinatus tendon, and human muscle.

7. An apparatus for making a scaffold construct, the apparatus comprising:
a delivery device configured to dispense a collagen microfiber strand through an orifice;
a rotatable frame;
a strand coating system configured to coat the collagen microfiber strand with a first biocompatible solution during dispensing of the strand, the solution strand coating system being disposed between the delivery device and the rotatable frame; and
a rotation device configured to rotate the rotatable frame about an axis of rotation;
wherein the apparatus is configured such that rotation of the rotatable frame draws the collagen microfiber strand through the orifice, thereby coating the collagen microfiber strand with the first biocompatible solution, and wraps the collagen microfiber strand about the rotatable frame; and
wherein the apparatus further includes a bath configured to contain a second biocompatible solution in which the rotatable frame may be submerged during wrapping of the collagen microfiber strand about the rotatable frame.

8. The apparatus of clause 7, wherein the apparatus is configured such that the delivery device and the rotatable frame are translated relative to one another along the axis of rotation in order to wrap the collagen microfiber strand about different portions of the rotatable frame.

9. The apparatus of clause 7, wherein the rotatable frame includes at least two parallel beams about which the collagen microfiber strand may be wound, thus forming a scaffold construct configured in a continuous loop.

10. The apparatus of clause 9, wherein the rotatable frame is spring biased in order to maintain the continuous loop of scaffold construct under tension.

11. The apparatus of clause 9, wherein the rotatable frame includes removable end pieces that fix the parallel beams with respect to one another; and wherein removal of the removable end pieces enables the continuous loop scaffold construct to be slid off the parallel beams.

12. The apparatus of clause 7, wherein the rotatable frame is configured to be submerged in a cell culture.

13. The apparatus of clause 7, wherein the delivery device is configured to dispense multiple strands of collagen microfiber simultaneously.

14. A method of making a scaffold construct, comprising:
affixing a collagen microfiber strand to a rotatable frame; and
rotating the rotatable frame about an axis of rotation in order to wrap the collagen microfiber strand around the rotatable frame;
wherein wrapping the collagen microfiber strand around the rotatable frame draws the collagen microfiber strand from a delivery device, thereby dispensing the collagen microfiber strand through an orifice and drawing the collagen microfiber strand through a first biocompatible solution;
wherein the rotatable frame is submerged in a second biocompatible solution during the wrapping of the collagen microfiber strand around the rotatable frame; and
wherein the first biocompatible solution forms a biocompatible hydrogel with combined with the second biocompatible solution.

15. The method of clause 14, further including translating the substantially planar frame and a dispensing device with respect to one another along the axis of rotation in order to wrap the collagen microfiber strand about different portions of the rotatable frame.

16. The method of clause 14, wherein the rotatable frame includes at least two parallel beams about which the collagen microfiber strand may be wound, thus forming a scaffold construct configured in a continuous loop.

17. The method of clause 14, wherein the first biocompatible solution includes thrombin and the second biocompatible solution includes fibrinogen, thus forming a fibrin gel when the strand coated with the first biocompatible solution is submerged in the second biocompatible solution.

18. The method of clause 14, wherein the first biocompatible solution is a cell suspension.

19. The method of clause 14, wherein multiple collagen microfibers are simultaneously drawn by the rotation of the rotatable frame.

20. The method of clause 14, wherein at least one of the first biocompatible solution and the second biocompatible solution includes one or more additives to be coated on the collagen microfiber strand; and
wherein the one or more additives are selected from the group consisting essentially of growth factors, antibiotics, small-molecule pharmaceuticals.

Clauses—Volumetric Muscle Loss Treatment Method

1. A method of treating volumetric muscle loss (VML), comprising:
affixing, within a VML wound site, a scaffold construct formed of a plurality of collagen microfibers arranged in an organized sheet-like configuration and coated with a biocompatible solution.

2. The method of clause 1, wherein the scaffold construct includes multiple sheet-like layers of the collagen microfibers.

3. The method of clause 1, wherein the biocompatible solution is hyaluronic acid.

4. The method of clause 1, wherein the biocompatible solution is a cell suspension.

5. The method of clause 4, wherein the cell suspension includes muscle progenitor cells (MPC's).

6. The method of clause 5, wherein the cell suspension includes approximately 4,000,000 cells/mL.

7. The method of clause 1, wherein the scaffold construct has mechanical properties substantially approximating or exceeding those of human tendon.

8. The method of clause 7, wherein the scaffold construct has a mean ultimate tensile strength (UTS), tensile modulus, and strain at break that substantially approximate or exceed those of human tendon.

9. A method of treating volumetric muscle loss (VML), comprising:
affixing, within a VML wound site, a scaffold construct formed of a plurality of collagen microfibers arranged in an organized sheet-like configuration,
wherein the scaffold construct includes multiple sheet-like layers of the collagen microfibers.

10. The method of clause 9, wherein the scaffold construct is coated with a biocompatible solution.

11. The method of clause 10, wherein the biocompatible solution is hyaluronic acid.

12. The method of clause 10, wherein the biocompatible solution is a cell suspension.

13. The method of clause 12, wherein the cell suspension includes muscle progenitor cells (MPC's).

14. The method of clause 12, wherein the cell suspension includes approximately 4,000,000 cells/mL.

15. The method of clause 9, wherein the scaffold construct has mechanical properties substantially approximating or exceeding those of human tendon.

16. The method of clause 15, wherein the scaffold construct has a mean ultimate tensile strength (UTS), tensile modulus, and strain at break that substantially approximate or exceed those of human tendon.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The embodiments can be better understood with reference to the following drawings and description. The components in the figures are not necessarily to scale, with emphasis instead being placed upon illustrating the principles of the embodiments. Moreover, in the figures, like reference numerals designate corresponding parts throughout the different views.

FIG. 14 is a transmitted light microscopy image of a printed scaffold showing uniform parallel fibers;

FIG. 15 is the image of FIG. 14 shown at twice the magnification as FIG. 14;

FIG. 16 is a fluorescent microscopy showing uniform distribution of cells throughout, as well as cell elongation;

FIG. 17 is the image of FIG. 16 shown at twice the magnification as FIG. 16;

FIG. 49H is a graph illustrating the torque generated by each animal at 4, 8, and 12 weeks post-repair;

FIG. 49I is a graph illustrating the post-repair torque generation as a percentage of baseline torque;

FIG. 50E is an H&E photomicrograph of an acellular implant implanted in a rodent specimen;

FIG. 50F is an H&E photomicrograph of a cellular implant implanted in a rodent specimen;

FIG. 53I is a graph showing the total fiber count of the four experimental groups (uninured control (Ctrl), no repair (NR), acellular implant (AI), and cellular implant (CI));

FIG. 53J is a graph showing median fiber cross-sectional area (FCSA) of the four experimental groups; and FIG. 53K is a graph showing the product of fiber count and FCSA for the four experimental groups.

DETAILED DESCRIPTION

Figure 1:
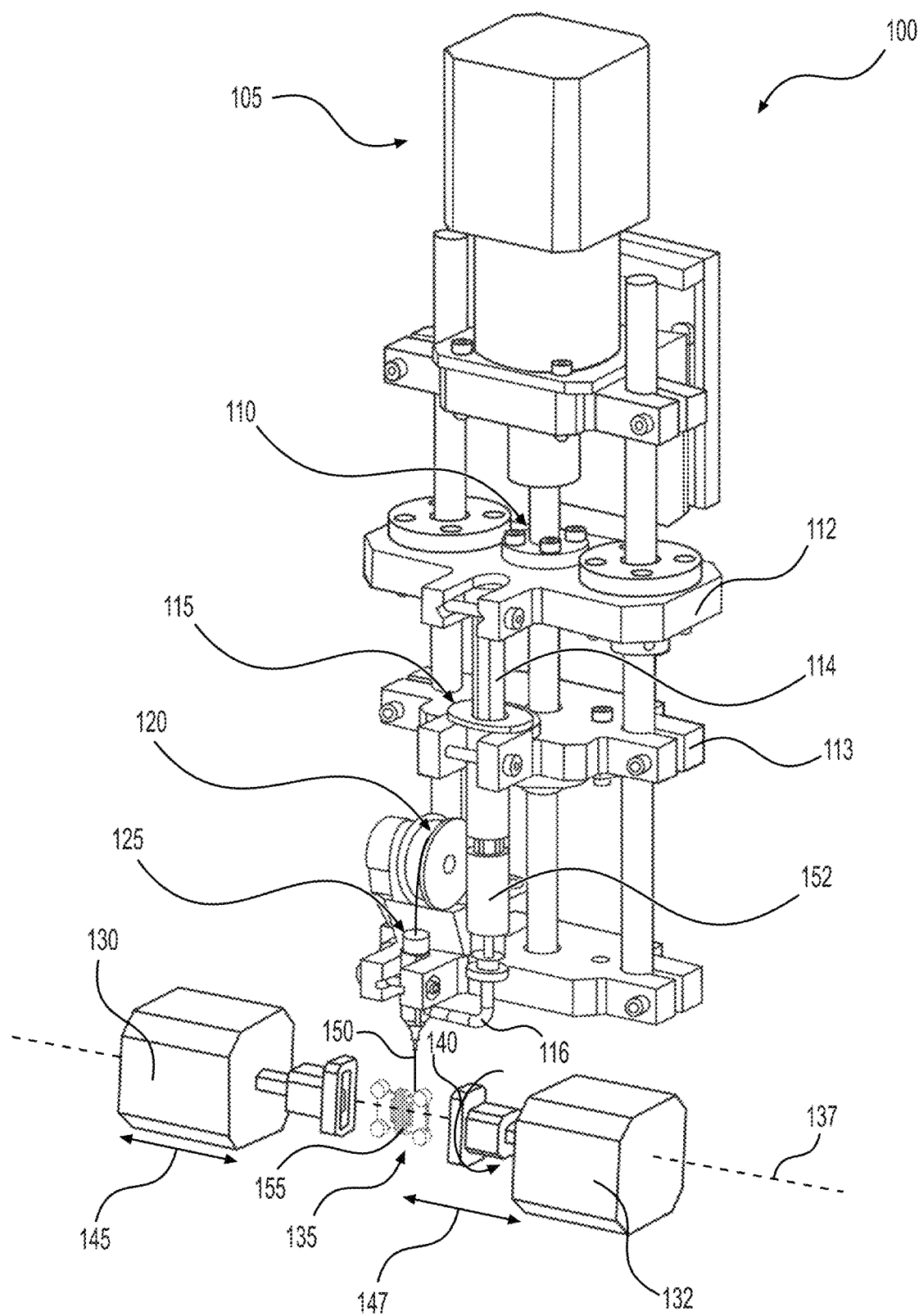
FIG. 1 is a schematic view of a portion of an apparatus for making a scaffold construct according to an exemplary embodiment.

The present invention relates to the formation of biocompatible scaffold constructs using high strength collagen fiber. In particular, this disclosure relates use of rotating frame fabrication (RFF) to produce cellularized scaffolds comprised of dense collagen microfiber to treat ligament, tendon and volumetric muscle loss (VML) injuries. Collagen microfiber is controllably seeded with cells and formed into living 3D grafts with designed porosity, fiber patterns, and macroscopic dimensions in an automated and scalable biomanufacturing process.

The following description in this specification is related to studies performed and documented in K. W. Christensen, J. Turner, K. Coughenour, Y. Maghdouri-White, A. A. Bulysheva, O. Sergeant, M. Rariden, A. Randazzo, A. J. Sheean, G. J. Christ, M. P. Francis, "Assembled Cell-Decorated Collagen (AC-DC) bioprinted implants mimic musculoskeletal tissue properties and promote functional recovery," published Jul. 2, 2021, and available pre-print via bioRxiv at: https://doi.org/10.1101/2021.06.22.449431. The entire disclosure of this publication is incorporated herein by reference.

Collagen is preferred because, as a natural polymer, collagen offers inherent biocompatibility and bioactivity, and microstructural cues mimicking native tissue that facilitate the attachment, alignment, and proliferation of cells. As described herein, grafts offer excellent strength and stability, closely matching the mechanical properties of native tendon and ligament tissue immediately after fabrication and after 4 weeks of culture in vitro. Additionally, such grafts promote the regeneration of native-like tissue and functional recovery in vivo using a validated VML injury model.

The novel biomanufacturing approaches described in this specification provide improved methods to fabricate cellularized scaffolds for regenerative medicine applications. Implantable scaffolds are fabricated from strong, stable microfibers of clinical-grade collagen with biochemical and mechanical properties appropriate for their intended medical use.

This fiber is uniformly and controllably coated with cells during scaffold fabrication and can be selectively coated with multiple cell types to create scaffolds with designed heterogeneity. Scaffolds are formed with microstructural cues to signal cell alignment as well as designed porosity, fiber patterns, and macroscopic dimensions. The fabrication process is rapid, repeatable, and automated. Resulting scaffolds mimic the biological, morphological, and functional properties of native ligament and tendon tissues.

The embodiments described herein are related to a scaffold construct, methods for making the scaffold, and an apparatus for making the scaffold. Such scaffolds include a plurality of aligned collagen microfibers coated by a biocompatible solution. Such scaffolds may be suitable for use as tendon or ligament grafts or other biomechanical surgical repairs.

To assist and clarify the subsequent description of various embodiments, various terms are defined herein. Unless otherwise indicated, the following definitions apply throughout this specification (including the claims). For consistency and convenience, directional adjectives are employed throughout this detailed description corresponding to the illustrated embodiments.

The term "biocompatible solution," as used throughout this detailed description and in the claims, refers to a liquid solution, preferably a cell culture medium, that maintains the viability of and supports the growth and functioning of the cells that are applied to coat the fibers according to the methods of the invention.

The term "collagen" includes contemplated types such as atelocollagen, telocollagen, and gelatin derived from collagen, and may be collagen from various sources, such as recombinant human collagen, porcine collagen, bovine collagen, jellyfish collagen, and mixtures thereof. A person skilled in the art will understand that microfibers will be produced having tensile strengths, resiliency, elasticity and toughness appropriate for the particular functions and uses of a given implant as discussed herein.

The term "fiber," as used throughout this detailed description and in the claims, refers to fiber, thread, or filament having a high ratio of length to diameter and normally used as a unit. The term "microfiber" is used synonymously due to the size scale of the fiber used in preferred embodiments. The term "strand" refers to an individual item of fiber, whereas a fiber-based construct may consist of many individual fiber strands. Throughout, the above terms may include fiber comprised of multiple sub-fibers assembled by secondary or tertiary assembly processes such as braiding.

The term "lateral direction," as used throughout this detailed description and in the claims, refers to a side-to-side direction extending along the width of a component.

The term "longitudinal," as used throughout this detailed description and in the claims, refers to a direction extending along the length of a component.

It will be understood that each of these directional adjectives may be applied to individual components of a discussed device or apparatus. The term "upward" refers to the vertical direction heading away from a ground surface, while the term "downward" refers to the vertical direction heading toward the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

For purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, or other joining techniques. In addition, two components may be "fixedly attached" by virtue of being integrally formed, for example, in a molding process.

The term "scaffold," as used throughout this detailed description and in the claims, refers to a 2D or 3D assemblage of fiber. The terms "construct" and "macrostructure" are used synonymously. The terms "scaffold construct," "graft," and "implant" refer to a scaffold which is intended for implantation as a medical device as used in preferred embodiments.

The term "vertical," as used throughout this detailed description and in the claims, refers to a direction generally perpendicular to both the lateral and longitudinal directions.

A preferred embodiment of the present disclosure is directed to a scaffold construct including a plurality of substantially aligned collagen microfibers coated by a biocompatible solution. A person skilled in the art will understand that microfibers in a construct may be aligned substantially parallel to one another or be partially aligned or substantially nonaligned, with microfiber orientation and spacing varying in three dimensions. In addition, some constructs may contain both aligned and non-aligned microfibers. For example, in some embodiments some of the microfibers may be oriented at an oblique angle with respect to other microfibers in the construct. Further, not only may the scaffold constructs produced by the disclosed methods be produced as a closed loop configuration, but alternatively, the finished scaffold constructs may have a planar sheet-like, prismatic, rounded, or cylindrical configuration, as well as other complex three-dimensional geometries. In some cases, the scaffold construct geometries may be based on CAD models.

In a preferred embodiment, to print certain cellularized scaffolds, the biocompatible solution includes cells suspended in a hyaluronic acid solution prepared in Dulbecco's Modified Eagles Medium (DMEM). Hyaluronic acid is a chief component of the extracellular matrix of connective tissues and is utilized herein as a "cellular glue" to facilitate the adherence of cells to collagen microfiber. An exemplary hyaluronic acid concentration may be 5 mg/mL. Any cell type may be chosen based on intended application and may include stem cells, tenocytes, chondrocytes, myoblasts, osteoblasts, or numerous tissue-specific cell types. Appropriate cell culture media and material additives should be utilized to facilitate survival of chosen cell types.

The present disclosure is further directed to a method and apparatus for making such a scaffold. It will be noted that the disclosed system and process may be applicable to other types of fibers besides collagen microfibers, including other natural fibers and/or synthetic materials or combinations thereof, which have adequate mechanical properties (strength, flexibility, etc.) for manipulation by the disclosed process. In addition, it will also be noted that, in some embodiments, the plurality of collagen microfibers may not necessarily be aligned with one another.

The scaffold is generally formed by dispensing a collagen microfiber strand in such a manner that the dispensed strand is coated in a biocompatible solution. For purposes of the present invention, the microfiber may be dispensed by drawing a microfiber strand under tension or by extruding it. In some embodiments, the collagen microfiber strand may be dispensed from a center lumen of an inner conduit of a coaxial needle, with the biocompatible solution being dispensed from an annular lumen around the inner conduit. The biocompatible solution may be dispensed from the annular lumen via controlled actuation of a plunger of a syringe containing biocompatible solution.

In a preferred embodiment, the microfiber is provided from a spool. The extrusion of an exemplary collagen fiber is disclosed by Francis et al., U.S. Patent Application Publ. No. 2020/0246505, published on Aug. 6, 2020, and entitled "Microfluidic Extrusion," which describes a product having ultimate tensile strength, modulus of elasticity, and strain at break comparable to those of native human tendons and ligaments. The entire disclosure of U.S. Patent Application Publ. No. 2020/0246505 is attached hereto as Appendix A.

Two-Solution Approach

FIG. 1 is a schematic view of a portion of an apparatus for making a scaffold construct according to an exemplary embodiment. As shown in FIG. 1, a printing device 100 may include a 3D printing assembly further including features configured for dispensing of collagen microfiber sheathed in a biocompatible solution. The 3D printing assembly is provided in order to control the motion of printing device 100 in the X, Y, and Z axes. As shown in FIG. 1, printing device 100 may include a stepper motor 105 and a lead screw 110 configured to be driven by stepper motor 105. Lead screw 110 may be rotated in order to move a first platform 112 relative to a second platform 113 in order to actuate a plunger 114 of a syringe 115, which may contain a biocompatible 32oluteion 152. Upon rotation of screw 110, biocompatible solution 152 may be pushed through a conduit 116 into and through an annular conduit of a coaxial needle 125.

At the same time biocompatible solution 152 is dispensed, a collagen microfiber strand 150 may be drawn through an inner conduit of coaxial needle 125. As shown in FIG. 1, a spool 120 may contain collagen microfiber strand 150. In order to effectuate the dispensing, a free end of collagen microfiber strand 150 may be fixed (for example, tied) to a frame. Then, as the frame is rotated, collagen microfiber strand 150 is pulled off spool 120 and through coaxial needle 125. As this happens, collagen microfiber strand 150 is coated with biocompatible solution 152.

In order to organize the collagen microfiber as it is pulled off the spool and fed through the coaxial needle, a frame 135 may be provided. Frame 135 may be rotated in order to wrap collagen microfiber strand 150 around frame 135, to thereby form a scaffold 155. Apparatus 100 may include a rotation device configured to rotate frame 135. For example, as shown in FIG. 1, the32oluteon device may include one or more motors, such as a first motor 130 and a second motor 132. As shown in FIG. 1, a frame holding apparatus may be rotatable about an axis of rotation 137, as shown by an arrow 140.

In addition, in order to facilitate mounting of frame 135 in the frame holding apparatus, one or both of the motors may be movable, for example, as shown by an arrow 145. In some embodiments, one or both of these motors may be movable manually, or via a motorized mechanism. Also, the frame holding apparatus may be movable in order to determine on which portion of frame 135 the scaffold is formed. As strand 150 is wound around frame 135, the apparatus may either translate frame 135 or translate printing device 100 along the axis of rotation, as indicated by an arrow 147 so that subsequent windings of strand 150 are formed side-by-side to provide scaffold 155 with width. In addition, multiple layers of these windings may be formed to provide scaffold 155 with thickness.

The frame may have any suitable shape. In some embodiments, the frame may have a substantially planar configuration. In some embodiments, the frame may include lobes, or extensions to facilitate gripping the frame without contacting a scaffold built upon the frame. In some embodiments, the frame may include features that facilitate mounting in the rotation device. In some embodiments, the frame may include multiple sections, for example, configured to enable multiple scaffolds to be built on the same frame. In some embodiments, the frame may include features, such as clamps, that may be slid onto the frame after winding in order to bind the strand on the frame and prevent it from unraveling. In some embodiments, the frame may include a spring loaded mechanism configured to maintain a predetermined amount of tension on the scaffold.

Figure 2:
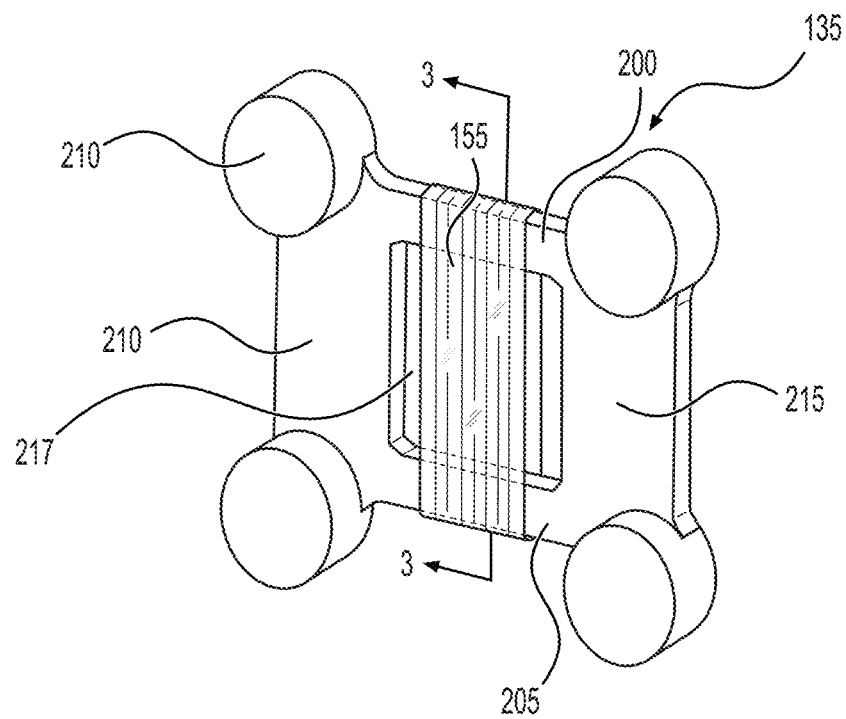
FIG. 2 is a schematic perspective view of a substantially planar frame with a collagen microfiber strand wrapped around the frame.

FIG. 2 is a schematic perspective view of a substantially planar frame with a collagen microfiber strand wrapped around the frame. As shown in FIG. 2, frame 135 may include a first cross-bar 200 and a second cross-bar 205 configured to serve as winding surfaces upon which the scaffold will be wound. In addition, frame 135 may include a first side portion 210 and a second side portion 215 joining first cross-bar 200 with second cross-bar 205. Accordingly, as shown in FIG. 2, in some embodiments, the frame may include a central opening 217. Central opening 217 may prevent scaffold 155 from becoming bound to frame 135. In addition, central opening 217 may limit the effects of cell migration from scaffold 155 to frame 135. In addition, central opening 217 may enable improved nutrient diffusion to scaffold 155 from surrounding cell culture media.

As also shown in FIG. 2, frame 135 may also include a plurality of lobes 220 extending outward in the same plane as the overall frame. Lobes 220 may be provided as a location at which to grasp/handle frame 135 without damaging scaffold 155. In some embodiments, at least a portion of lobes 220 may be raised relative to the plane of the overall frame, as shown in FIG. 220. These raised portions may facilitate mounting in the rotation device and also maintain a distance between the scaffold and its solid surface surroundings, for example the bottom of a microwell plate during cell culture.

Figure 3:
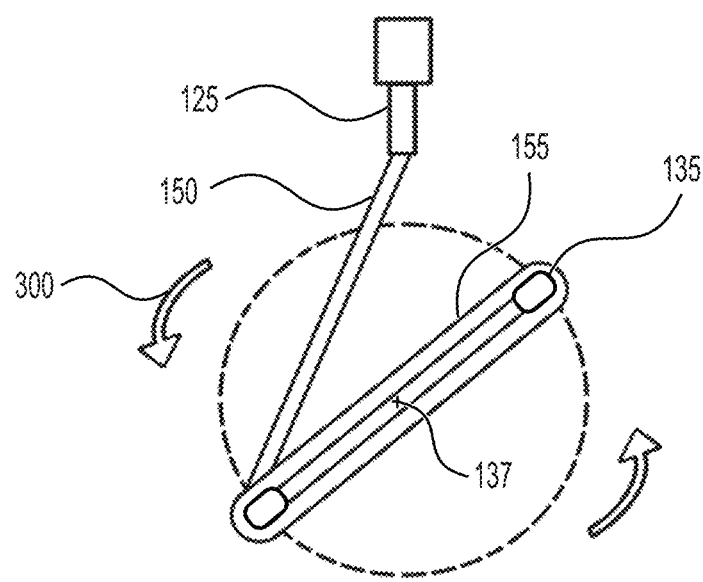
FIG. 3 is a schematic cross-sectional view of needle and rotating frame wrapping a collagen microfiber strand around the frame as taken at line 3-3 in FIG. 2.

FIG. 3 is a schematic cross-sectional view of needle and rotating frame wrapping a collagen microfiber strand around the frame as taken at line 3-3 in FIG. 2. As shown in FIG. 3, frame 135 may be rotated about axis 137, as indicated by arrows 300. This rotation draws strand 150 through needle 125 and wraps or winds strand 150 about frame 135 in order to form scaffold 155.

Figure 4:
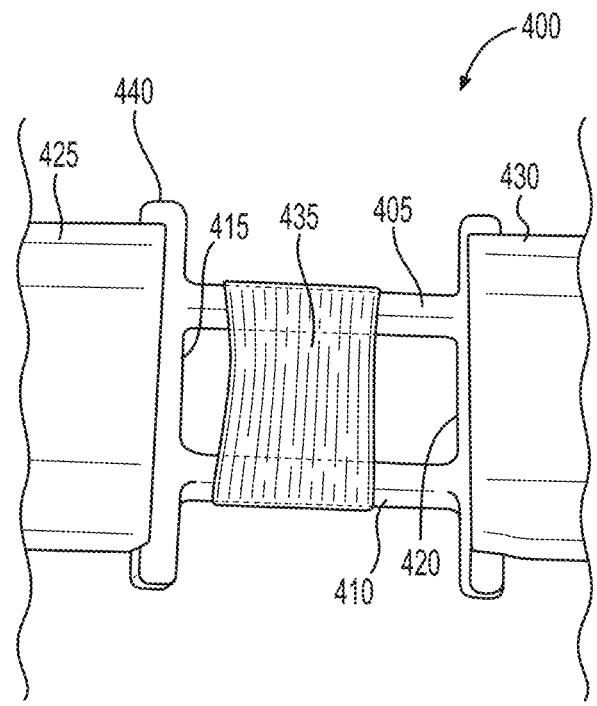
FIG. 4 is a schematic view of a portion of another embodiment of a frame with a collagen microfiber strand wrapped around it.

Other frame configurations and features are also possible. For example, FIG. 4 is a schematic view of a portion of another embodiment of a frame with a collagen microfiber strand wrapped around it. As shown in FIG. 4, a frame 400 may have a first cross-member 405, a second cross-member 410, a first end portion 415 and a second end portion 420. Frame 400 may be mounted in a rotation device including a first frame mount 425 and a second frame mount 430. By winding frame 400 as described above, a scaffold 435 may be formed. As also shown in FIG. 4, in some embodiments, the end portions of frame 400 may include extensions 440 configured to facilitate grasping/handling of frame 400 without damaging scaffold 435.

Figure 5:
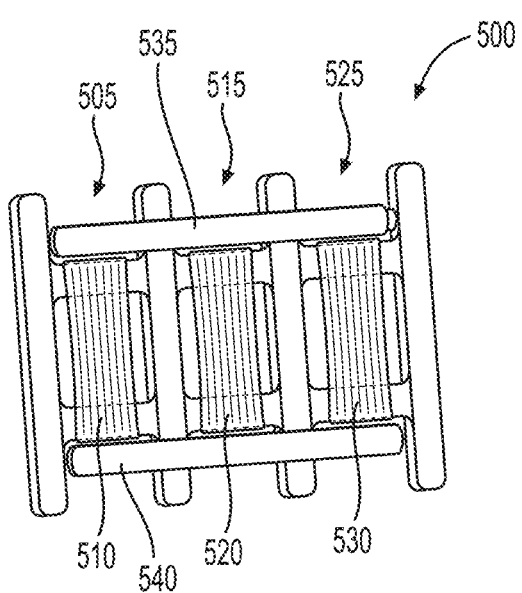
FIG. 5 is a schematic view of another embodiment of a frame with collagen microfiber strands wrapped around it in three sections.

FIG. 5 is a schematic view of another embodiment of a frame with collagen microfiber strands wrapped around it in three sections. As shown in FIG. 5, a frame 500 may be configured to have multiple scaffolds formed on it. For example, frame 500 may include a first section 505 configured to receive a first scaffold 510, a second section 515 configured to receive a second scaffold 520, and a third section 525 configured to receive a third scaffold 530. It will be understood that the frame may be configured to receive a lesser or greater number of scaffolds in order to optimize manufacturing/formation of scaffolds.

As also shown in FIG. 5, in some embodiments, frame 500 may include a first clip 535 and a second clip 540 configured to be slid onto frame 500 after forming the scaffolds in order to prevent the scaffolds from unraveling.

Figure 6:
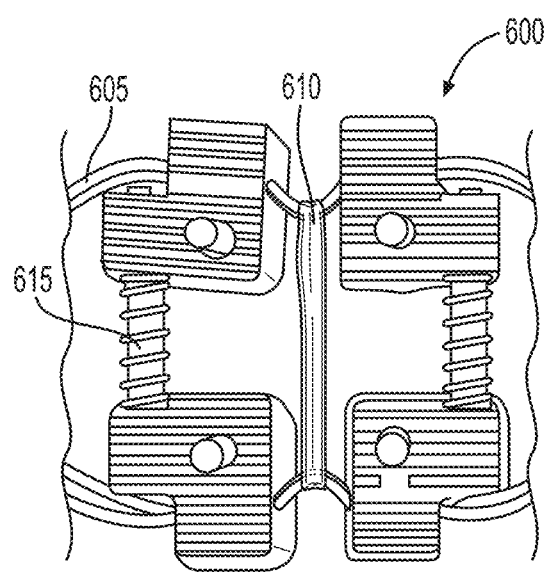
FIG. 6 is a schematic view of another embodiment of a frame with a collagen microfiber strand wrapped around it.

FIG. 6 is a schematic view of another embodiment of a frame with a collagen microfiber strand wrapped around it. As shown in FIG. 6, a frame 600 may include a peripheral portion 605 configured to receive windings of a collagen microfiber strand in order to form a scaffold 610. In order to maintain a substantially constant predetermined tension on scaffold 610, frame 600 may be spring-loaded, for example, by a spring mechanism 615.

In some embodiments, it may be desirable to form different portions of a scaffold of different compositions. For example, in some cases, it may be desirable to form the end portions of a ligament or tendon scaffold that adjoin with bone with a different composition than the other portions of the ligament or tendon. This replicates the differing structure/composition of natural ligaments and tendons. In order to produce a scaffold having different composition in different portions, an apparatus may be utilized that selectively dispenses the collagen microfiber strand through different biocompatible solutions.

Figure 7:
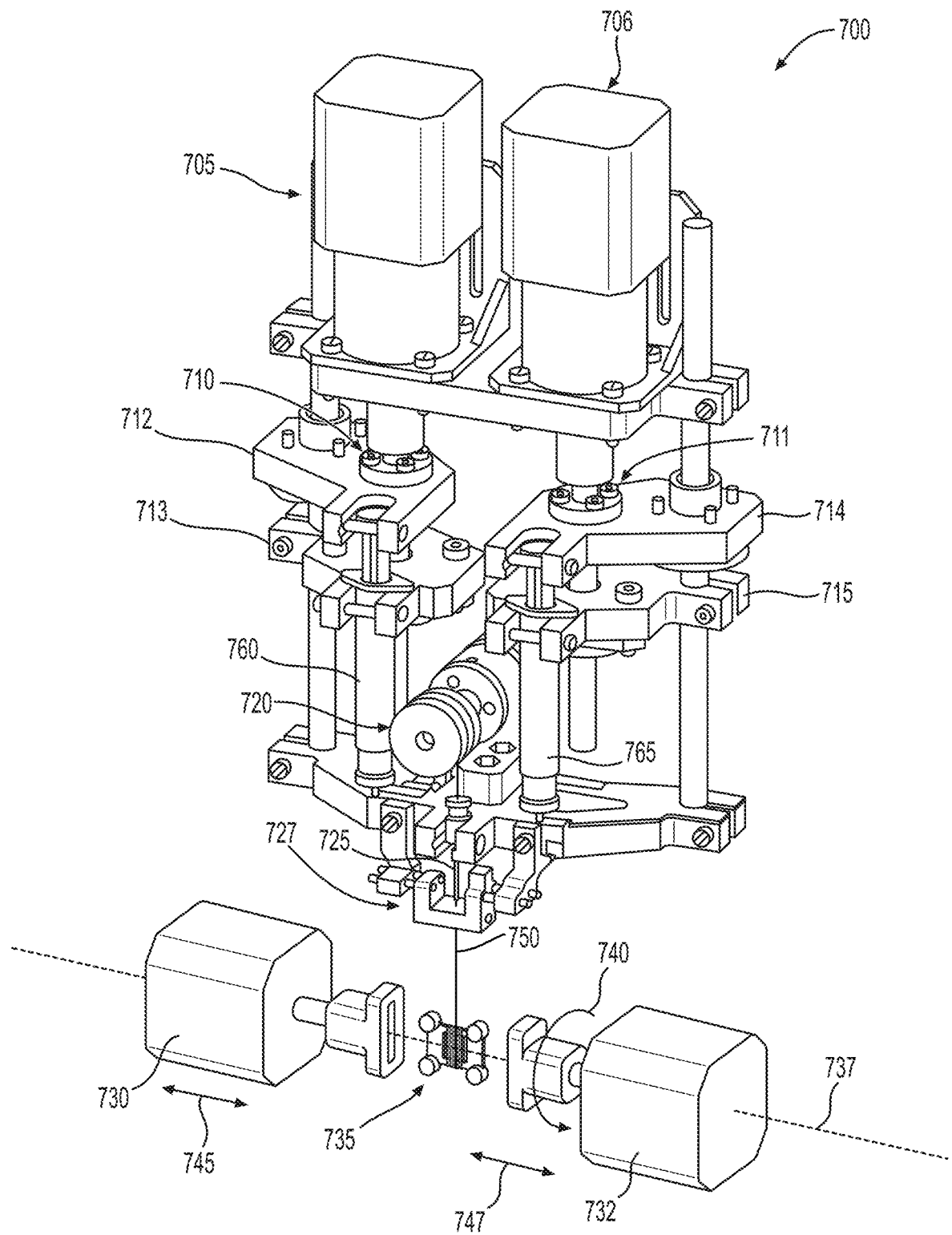
FIG. 7 is a schematic illustration of an apparatus for making a scaffold construct according to another exemplary embodiment.

FIG. 7 is a schematic illustration of an apparatus for making a scaffold construct according to another exemplary embodiment in which the apparatus is configured to selectively dispense the collagen microfiber strand through different biocompatible solutions. As shown in FIG. 7, an apparatus 700 may include two separate columns to respectively dispense two different biocompatible solutions. The first column may include a first stepper motor 705 and a first lead screw 710 configured to be driven by stepper motor 705. First lead screw 710 may be rotated in order to move a first platform 712 relative to a second platform 713 in order to actuate a plunger of a first syringe 760, which may contain a biocompatible solution. Upon rotation of screw 710, biocompatible solution may be dispensed to a solution manifold 727.

Figure 8:
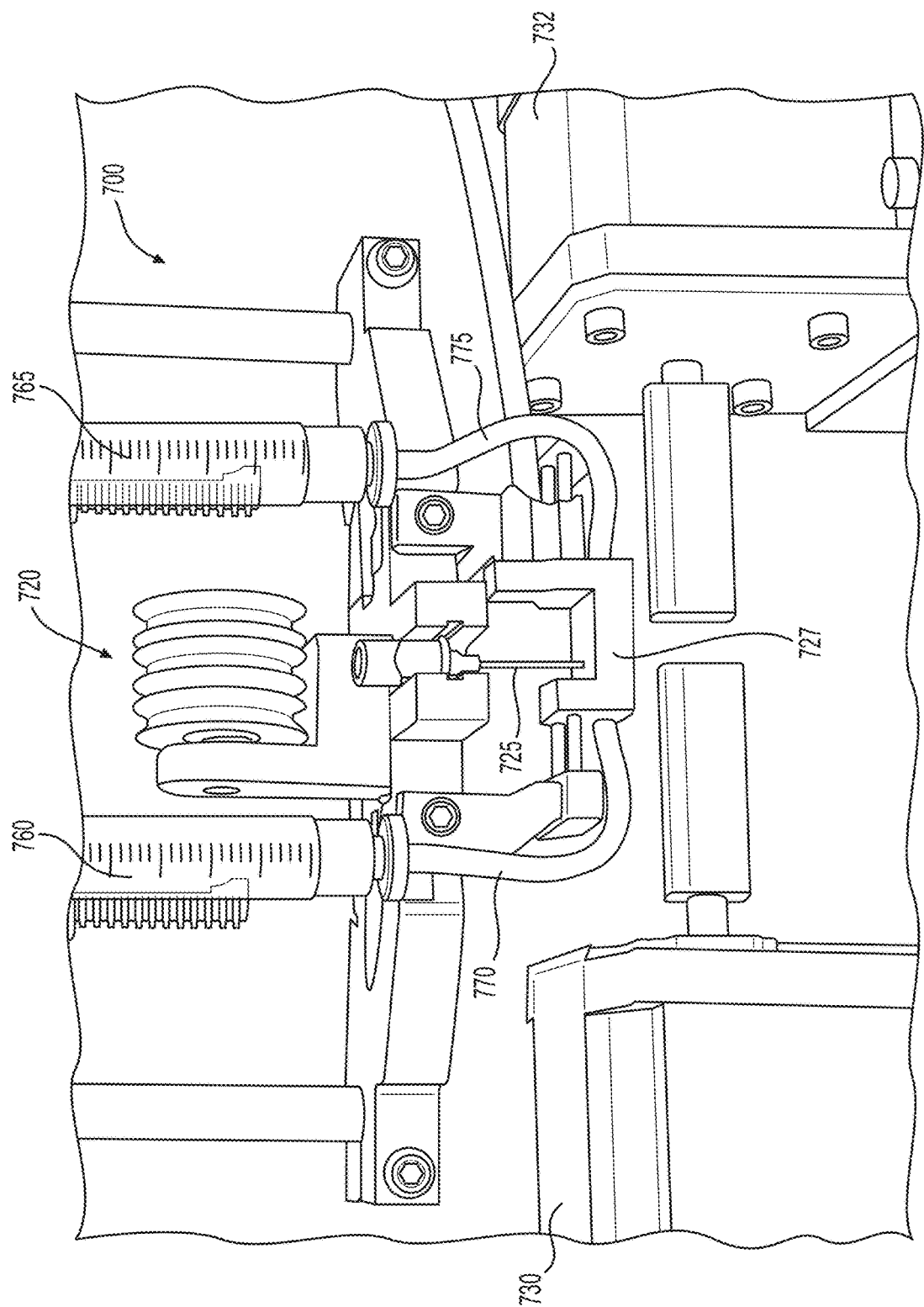
FIG. 8 is a schematic illustration of a portion of the apparatus shown in FIG. 7.

At the same time biocompatible solution is dispensed, a collagen microfiber strand may be drawn through a needle 725. As shown in FIG. 7, a spool 720 may contain collagen microfiber strand and dispense the strand through needle 725. In some embodiments, multiple spools may dispense multiple strands simultaneously. For example, as shown in FIG. 8, in some embodiments, spool 720 may be flanked by one or more additional spools.

In order to effectuate the dispensing, a free end of collagen microfiber strand 750 may be fixed (for example tied) to a frame. Then, as the frame is rotated, collagen microfiber strand 750 is wrapped around the frame and thus pulled off spool 720 and through needle 725.

In order to organize the collagen microfiber as it is pulled off the spool and fed through the coaxial needle, a frame 735 may be provided. Frame 735 may be rotated in order to wrap collagen microfiber strand 750 around frame 735, to thereby form a scaffold 755. Apparatus 700 may include a rotation device configured to rotate frame 735. For example, as shown in FIG. 7, the36oluteon device may include one or more motors, such as a first motor 730 and a second motor 732. As shown in FIG. 7, a frame holding apparatus may be rotatable about an axis of rotation 737, as shown by an arrow 740.

In addition, in order to facilitate mounting of frame 735 in the frame holding apparatus, one or both of the motors may be movable, for example, as shown by an arrow 745. In some embodiments, one or both of these motors may be movable manually, or via a motorized mechanism. Also, the frame holding apparatus may be movable in order to determine which portion of frame 735 the scaffold is formed. As strand 750 is wound around frame 735, the apparatus may either translate frame 735 or translate apparatus 700 along the axis of rotation, as indicated by an arrow 747, so that subsequent windings of strand 750 are formed side-by-side to provide scaffold 755 with width. In addition, multiple layers of these windings may be formed to provide scaffold 755 with thickness.

Solution manifold 727 may contain the first biocompatible solution, and collagen microfiber strand 750 may be drawn through an opening in manifold 727. The opening may extend vertically through a portion of manifold 727 that includes a well containing biocompatible solution. Thus, when drawing strand 750 through manifold 727, the strand 750 becomes coated with the biocompatible solution.

The delivery device configured to dispense collagen microfiber strand 750 through needle 725 may include a second column configured to dispense a second biocompatible solution. For example, apparatus 700 may include a second stepper motor 706 and a second lead screw 711 configured to be driven by second stepper motor 706. Second lead screw 711 may be rotated in order to move a third platform 714 relative to a fourth platform 715 in order to actuate a plunger of a second syringe 765, which may contain a second biocompatible solution. Upon rotation of second screw 711, the second biocompatible solution may be dispensed to solution manifold 727.

Manifold 727 may include a second well configured to contain the second biocompatible solution. The apparatus may be configured to select which of the two biocompatible solutions the strand 750 will be drawn through at any given time, by selecting which of the wells the strand passes through. This is accomplished by translating the solution manifold. FIGS. 8-12 illustrate this process in further detail.

FIG. 8 is a schematic illustration of a portion of the apparatus shown in FIG. 7. As shown in FIG. 8, different biocompatible solutions may be delivered separately to solution manifold 727. For example, a first biocompatible solution may be delivered from first syringe 760 through a first conduit 770 to a first side of manifold 727. A second biocompatible solution may be delivered from second syringe 765 through a second conduit 775 to a second side of manifold 727.

Figure 9:
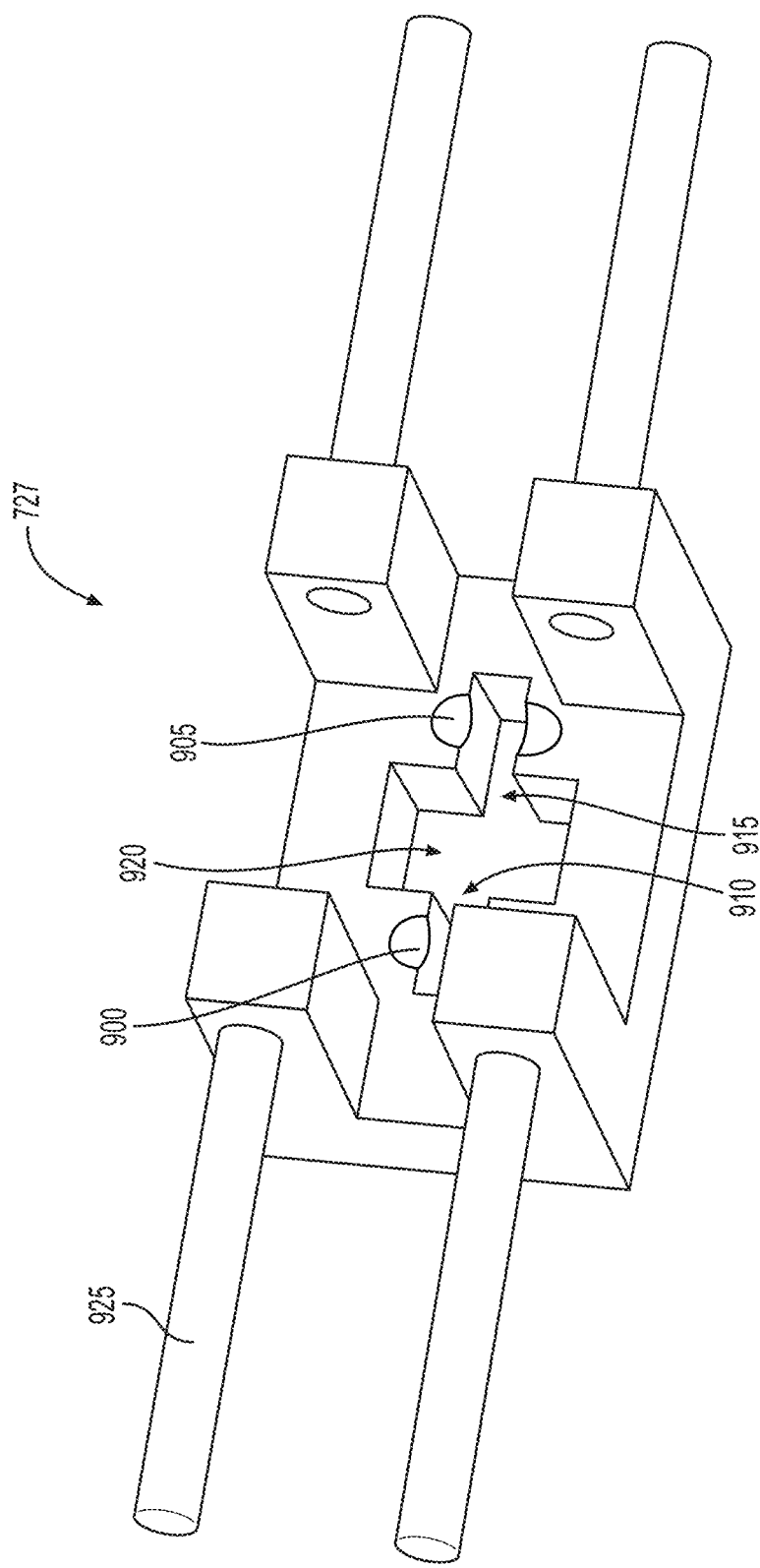
FIG. 9 is a schematic illustration of a solution manifold according to an embodiment.

FIG. 9 is a schematic illustration of a solution manifold according to an embodiment. As shown in FIG. 9, solution manifold 727 may include a first well 900 configured to receive a first biocompatible solution and a second well 905 configured to receive a second biocompatible solution. First well 900 of solution manifold 727 may include a first opening 910 configured to permit the collagen microfiber strand to pass therethrough. In addition, second well 905 may include a second opening 915 configured to permit the collagen microfiber strand to pass therethrough. Further, manifold 727 may include a slot 920 connecting first opening 910 and second opening 915. As shown in FIG. 9, slot 920 may be fairly wide with respect to the openings in the wells. In other embodiments, slot 920 may be much narrower.

FIG. 9 also shows rails 925 with which manifold 727 may be received by an actuating mechanism. During dispensing, manifold 727 may be translated in opposing directions in order to deliver the strand through the biocompatible solution in one well or the other. Thus, the dispensing apparatus is configured to translate the solution manifold in a direction parallel with the slot in order to select which of the first well and the second well the collagen microfiber strand is drawn through.

Figure 10:
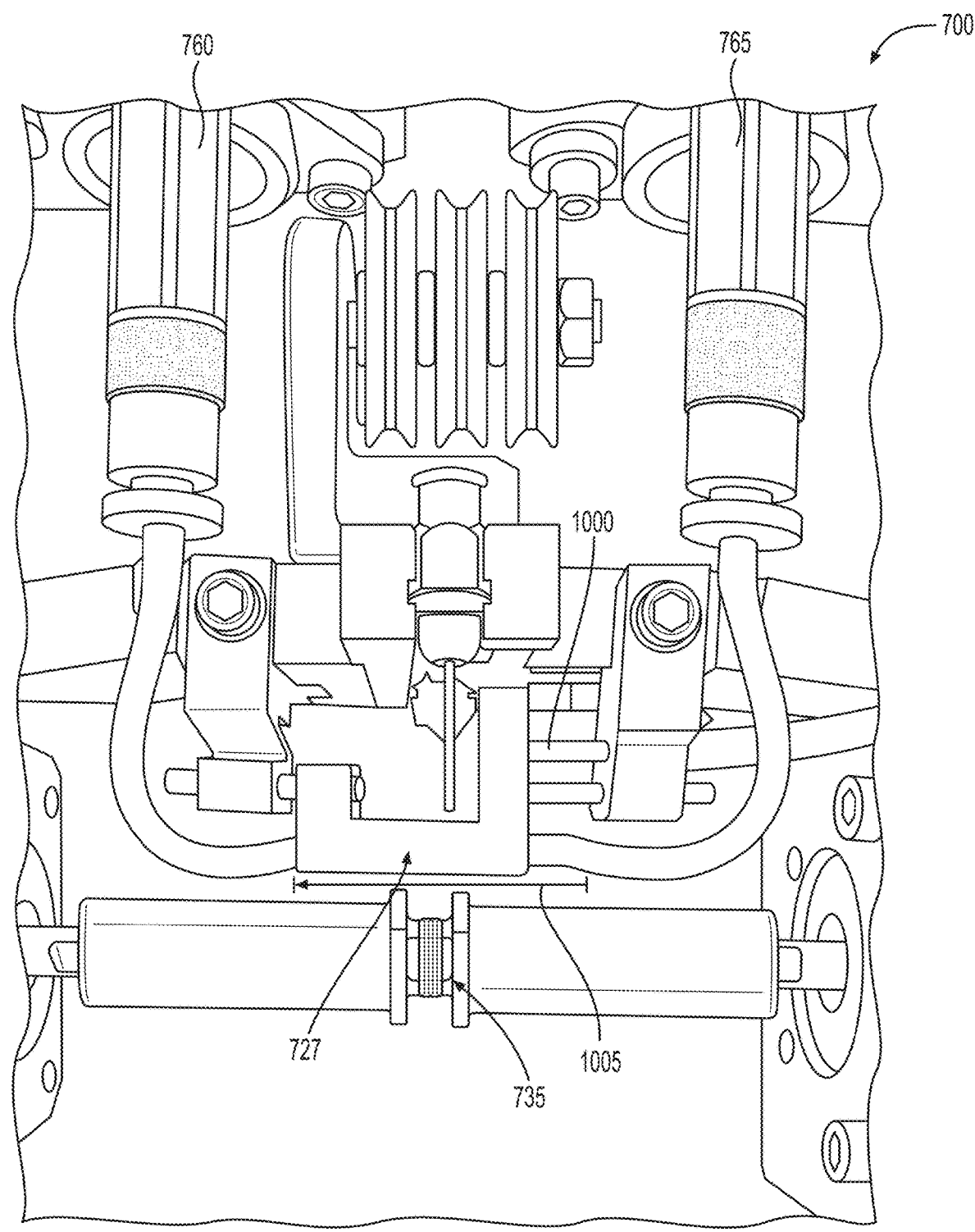
FIG. 10 is a schematic illustration of an apparatus for making a scaffold construct with the solution manifold translated to the left.

FIG. 10 is a schematic illustration of an apparatus for making a scaffold construct with the solution manifold translated to the left. As shown in FIG. 10, solution manifold 727 may be translated to the left, as indicated by an arrow 1005, in order for the strand to be delivered through the right portion of manifold 727. A thick cable 1000 and a motor (not shown) may be used to actuate/translate manifold 727 back and forth.

Figure 11:
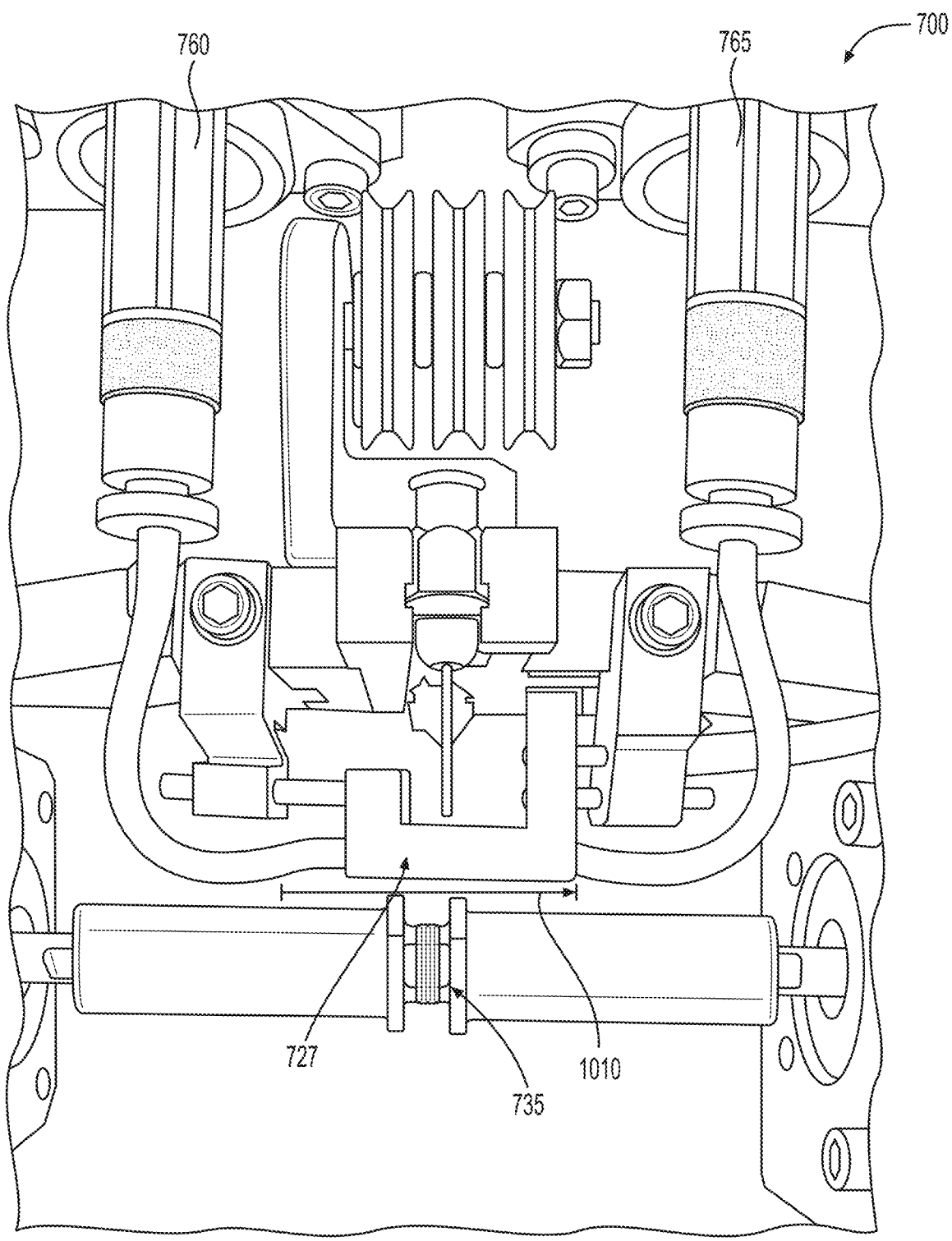
FIG. 11 is a schematic illustration of an apparatus for making a scaffold construct with the solution manifold translated to the right.

FIG. 11 is a schematic illustration of an apparatus for making a scaffold construct with the solution manifold translated to the right. As shown in FIG. 11, solution manifold 727 may be translated to the right, as indicated by an arrow 1010, in order for the strand to be delivered through the left portion of manifold 727.

Figure 12:
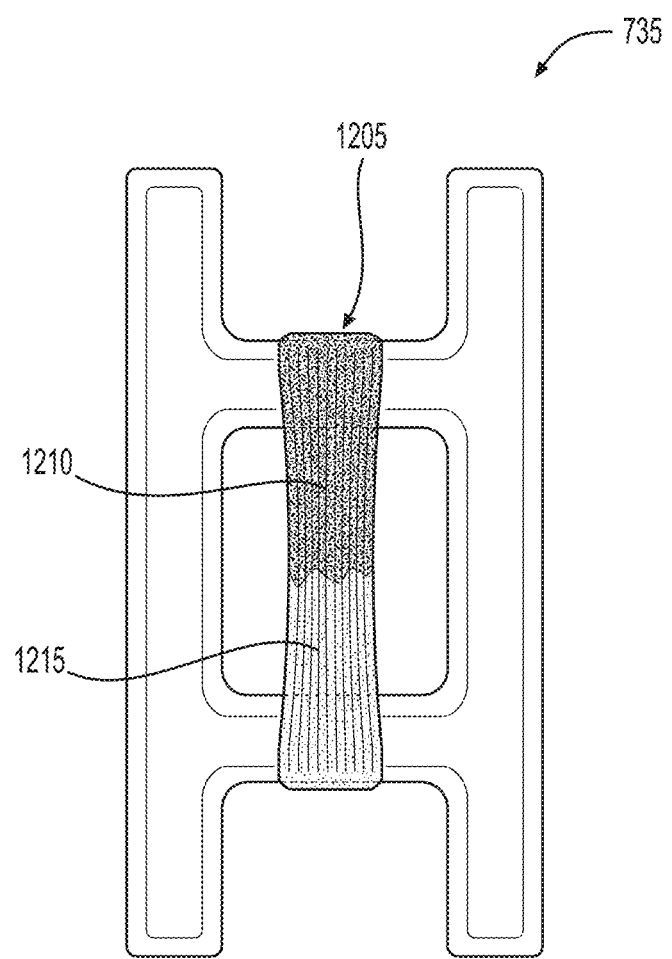
FIG. 12 is a schematic illustration of a substantially planar frame with a multi-solution scaffold wrapped around the frame.

FIG. 12 is a schematic illustration of a substantially planar frame with a multi-solution scaffold wrapped around the frame. As shown in FIG. 12, frame 735 may have a scaffold 1205 formed upon it. As further shown in FIG. 12, a first end 1210 of scaffold 1205 may be different than a second end 1215 of scaffold 1210. These differences may be produced by using different solutions. For example, one solution may be cellular and one may be acellular. In another example, one solution may have bone cells in it, whereas the other solution may have tendon or ligament cells in it.

It will be noted that other elements may be suspended in the biocompatible solution and therefore will be incorporated along with the collagen strand to form the scaffold. That is, one or more additives may be included in the biocompatible solution such that they become coated on the collagen strand. For example, in some embodiments, the biocompatible solution may include growth factors, antibiotics, small-molecule pharmaceuticals, etc.

In order to produce such a multi-solution scaffold, a first portion of the collagen microfibers coated by the first biocompatible solution may be disposed in a first longitudinal portion of the scaffold and a second portion of the collagen microfibers coated by the second biocompatible solution is disposed in a second longitudinal portion of the scaffold, wherein the first longitudinal portion is different than the second longitudinal portion.

In the example shown in FIG. 12, the first longitudinal portion is first end 1210 and the second longitudinal portion is second end 1215. In other embodiments, the scaffold portions with different compositions may be disposed side-to-side instead of end-to-end. Further, in some embodiments, a scaffold may have more than two different portions with different compositions.

Figure 13:
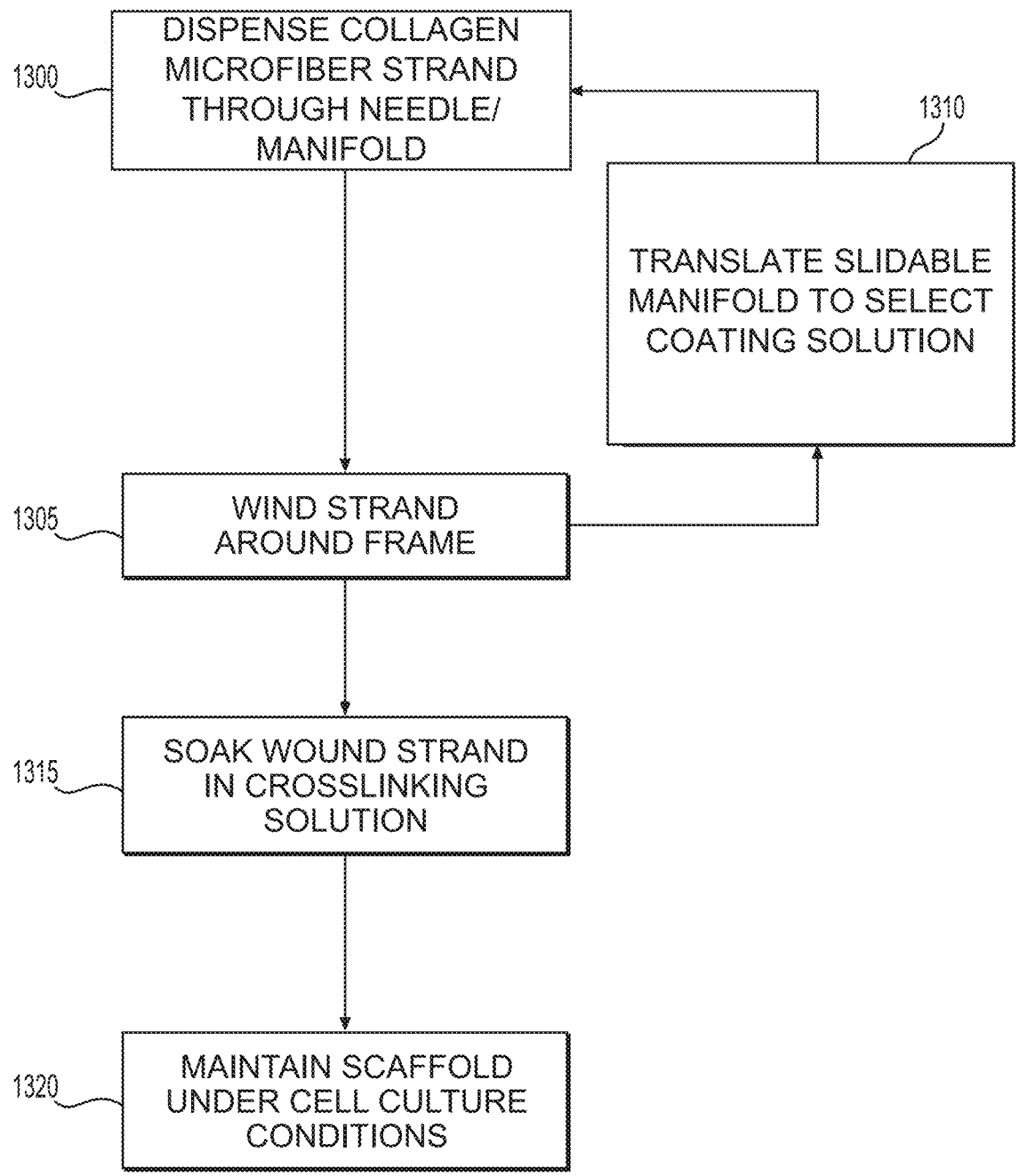
FIG. 13 is a flowchart illustrating steps of a method of making a scaffold construct according to an exemplary embodiment.

FIG. 13 is a flowchart illustrating steps of a method of making a scaffold construct according to an exemplary embodiment. As shown in FIG. 13, the method may include dispensing a collagen microfiber strand through a needle. (Step 1300.) In addition, at step 1305, the method may include winding the collagen microfiber strand around a frame. In addition, as reflected in step 1310, the solution manifold may be translated along the axis of frame rotation in order to select between two 39oluteons in the Solution manifold. These three steps can be performed sequentially in a loop or simultaneously.

In addition, since the scaffold may be implanted to support a biological tissue, it should be maintained in suitable conditions. For example, at step 1315, the method further includes maintaining the scaffold under cell culture conditions for two or more days. In some cases, the cell culture conditions may be sustained for as many as seven days without significant degradation of strength or microfiber organization.

The following is a further description of the materials and methods used to produce the scaffolds discussed herein, as well as a description of sample scaffolds produced using the rotating frame technique discussed herein.

A novel additive manufacturing approach was developed to produce cellularized scaffolds consisting of dense, highly aligned, strong collagen microfiber. Specifically, a continuous collagen microfiber, with a width on the order of about 50 µm and thickness around 5 µm (ribbon shaped), is coated uniformly with cells and wrapped around a rigid frame in three dimensions (3D) to form a scaffold. In some embodiments, a collagen microfiber having a substantially round/circular cross-section may be utilized.

In mimicking the organization of native ligament and tendon ultrastructure, this cell-coated fiber is wrapped in parallel next to and on top of itself to form rectangular macrostructures of designed width, length, and thickness. Scaffolds are cultured on these frames to maintain tension and alignment of the wrapped fiber before removal. These scaffolds aim to promote regeneration and recovery of function in musculoskeletal tissue injuries.

To implement this technology, a custom extrusion printhead (FIG. 1) was designed and mounted to a Folger Tech FT-5 R2 commercial 3D printer. The printhead uses a lead screw driven by a planetary geared stepper motor to mechanically compress a disposable syringe, dispensing cell suspension with sub-microliter resolution. The dispensed cell suspension passes through the outer needle of a coaxial needle assembly during printing. Up to 3 spools of collagen microfiber are loaded onto the printhead, each of which is fed through the inner needle of the coaxial needle assembly to simultaneously dispense three strands of fiber. At the outlet of the needle assembly, the collagen fiber is uniformly coated by the dispensed cell suspension. The volume of cell suspension dispensed per millimeter of drawn fiber is a user-determined process parameter and offers a means to control the resulting cell density and total number of cells throughout a scaffold. In preferred embodiments, cell density may vary from 0 to 10 million cells/mL depending on printing parameters and the desired number of cells within resulting scaffolds.

A custom receiving assembly was designed (FIG. 1) in which small disposable 3D-printed frames are held between two stepper motors. Prior to printing, fiber is drawn through the coaxial needle and attached at an initial anchoring point on the frame. As the frame is rotated by the motors, fiber is drawn under tension through the coaxial needle and coated by the dispensed cell suspension (FIG. 3). By coordinating the rotation of the frame and linear translation of the printhead along the width of the frame (the feed), cellularized scaffolds of dense, highly aligned collagen microfiber are produced (FIG. 2). Stepper motors driving the frame rotation are mounted on manual linear stages that allow for straightforward loading and removal of frames between consecutive prints.

In a preferred embodiment, to print cellularized scaffolds, cells are suspended in a hyaluronic acid solution prepared in Dulbecco's Modified Eagles Medium (DMEM). Additionally, control over dispensed volume is improved and the effects of cell settling during printing are limited due to the high viscosity. DMEM provides the necessary nutrients and cytocompatible environment to sustain cell health during printing.

The Folger Tech FT-5 R2 hardware and firmware was modified to facilitate our printing approach. The commercial FDM printhead was removed and replaced with a custom extrusion printhead. The printer Z axis control was repurposed as a new R rotational axis for the custom rotating frame assembly, which was mounted to the build plate of the printer. Non-stock components for the printhead and frame assembly, including frames, were 3D printed in-house from PLA using a MakerBot Replicator+. All stepper motors and drive pulleys were replaced to improve the resolution on the X, Y, and new R axes. The printer firmware was modified accordingly to accommodate these hardware changes.

Cellularized collagen microfiber scaffolds can be formed onto frames of arbitrary dimensions and geometries, such as rigid rectangular frames for culture in microwell plates or directly between two pieces of suture to facilitate future implantation. Fiber can feasibly be wrapped around any number of geometries and in varying orientations as a rigid object is rotated, with achievable complexity increased via robotic multi-axis manipulation of the "frame," for example. Scaffolds may be produced having planar sheet-like geometries, prismatic geometries, rounded or cylindrical geometries, and other complex 3D geometries based on CAD models.

A custom Python code was developed to accept user inputs for designed scaffold geometry and printing parameters and output a corresponding g-code file. This control system is described in more detail below.

To maintain sterility, the entire physical system may be located within a biosafety cabinet or filtered laminar flow hood, and all components may be handled aseptically.

Cellularized collagen microfiber scaffolds with varying geometries (FIGS. 2 and 4) were fabricated rapidly and repeatably onto 3D-printed PLA frames. Multiple samples were printed onto a single frame with clamping ends to prevent fiber unraveling (FIG. 5). Scaffolds could also be printed between two lengths of suture and held under tension during culture using a specialized mounting assembly (FIG. 6). PLA frames were found to maintain fiber alignment and macrostructure of printed scaffolds and maintained stability in culture over several weeks. Frames were designed with "legs" to raise the printed collagen scaffolds off of the surface of well plates during culture to prevent cell migration from the scaffold to the plate. Frames were designed with "ears" to improve handling with tweezers and as attachment points for loading into clamps, such as during a bioreactor study. As a benchmark, scaffolds with width 2 mm, length 10 mm, and thickness 0.5 mm can be printed in under 20 minutes with collagen microfiber draw rates of 1 to 1000 mm/min and even up to 10,000 mm/min or more. In some embodiments, the draw rate may be approximately 20 mm/min (1.2 m/hr). In other embodiments, the draw rate may be over 300 mm/min. In some cases, for example, it will be appreciated that the frame may be rotated at any suitable speed to wind the collagen microfiber. In yet other embodiments, the frame may be rotated anywhere between 1 to 240 rpm.

FIG. 14 is a transmitted light microscopy image of a printed scaffold showing uniform parallel fibers. FIG. 15 is the image of FIG. 14 shown at twice the magnification as FIG. 14. FIG. 16 is a fluorescent microscopy image showing uniform distribution of cells throughout, as well as cell elongation. FIG. 17 is the image of FIG. 16 shown at twice the magnification as FIG. 16.

Transmitted light microscopy shows densely packed, highly aligned parallel fiber scaffolds (FIGS. 14 and 15) with good dimensional fidelity after 3 days in culture. Fluorescence imaging of human tenocytes labeled with CellTracker Red CMPTX fluorescent probe after 11 days in culture shows cells distributed uniformly throughout printed scaffolds and cell elongation in the longitudinal direction (FIGS. 16 and 17). Cell fluorescence is superimposed with fiber autofluorescence at 495 nm.

Similar to the approach developed for single-solution rotating frame printing, a novel additive manufacturing approach to produce cellularized scaffolds consisting of dense, highly aligned, strong collagen microfiber coated with multiple cell types in distinct, well-defined regions was developed. The ability to control the location of multiple cell types or printed solutions within a single printed scaffold aims to enable and facilitate the repair of injuries and regeneration of injured tissues at the interface of distinct tissue types, such as the myotendinous junction (muscle-tendon interface) and enthesis (tendon/ligament-bone interface).

To implement this approach, a dual solution printhead (FIG. 7) was designed and fabricated to interface with a FolgerTech FT-5 R2 commercial 3D printer. Two separate planetary geared stepper motors mechanically compress disposable syringes individually, dispensing cell suspension with sub-microliter resolution. Rather than passing through a coaxial needle as with the single-solution rotating frame approach, cell suspensions are dispensed into opposite ends of a motorized sliding manifold. At each end of the manifold, the dispensed cell suspension builds up in a small coating reservoir. During printing, the automated manifold slides back and forth to bring each reservoir of cell suspension into or out of contact with collagen fiber being printed. As the fiber passes through each reservoir, it is uniformly coated by the respective cell suspension. The volume of cell suspension dispensed per millimeter of drawn fiber is a user-determined process parameter and offers a means to control the resulting cell density throughout a scaffold.

Up to 3 spools of collagen fiber are loaded onto the printhead and mounted to an adjustable slip clutch, which allows for control of fiber tension during printing. The fiber is fed through the center of the sliding manifold, where it is in contact with neither coating reservoir. To print regions of fiber coated with solution A, for example, the motorized manifold slides until the fiber is passing through the reservoir of dispensed solution A. The rotating frame then rotates to draw fiber through the reservoir, coating it with solution A. To then print regions of fiber coated with solution B, the motorized manifold slides the opposite direction until the fiber is passing through the reservoir of dispensed solution B, and the fiber is again drawn and coated. By coordinating coating fiber with the two solutions and the rotation of the rotating frame, scaffolds containing two distinct regions of different solutions, or cell types in the case of distinct cell suspensions, can be fabricated. This approach can feasibly be extended to print scaffolds with any number of solutions and cell types in distinct regions using a manifold capable of positioning fiber into multiple coating reservoirs.

The rotating frame receiving substrate is identical to that described for the single-solution rotating frame printing approach described above. To print cellularized scaffolds, cells are suspended in a hyaluronic acid solution prepared in Dulbecco's Modified Eagles Medium (DMEM). Hyaluronic acid is a key component of the extracellular matrix and is utilized herein as a "cellular glue" to facilitate the adherence of cells to collagen microfiber. Additionally, control over dispensed volume is improved and the effects of cell settling during printing are limited due to the high viscosity. DMEM provides the necessary nutrients and cytocompatible environment to sustain cell health during printing.

The modified Folger Tech FT-5 R2 discussed above is used for multi-solution printing as well, with the single-solution printhead described there being replaced with the multi-solution printhead (FIG. 7). Additionally, the Y-axis drive is modified to control the motorized sliding motion of the sliding manifold on the printhead. That is, Y-direction motion is no longer automated on the printhead. This does not affect functionality, as there is no required motion in the Y-direction using the rotating frame printing approach. The printer firmware was modified accordingly to accommodate these hardware changes.

The custom Python code, noted above, was developed to accept user inputs for designed scaffold geometry and printing parameters and output a corresponding g-code file. User inputs include number of scaffolds per frame, distance between scaffolds, scaffold width, scaffold height, number of layers of fiber, dispensed volume of cell suspension per millimeter drawn fiber, feed distance between parallel fibers, Z-direction standoff distance from frame to printhead during printing, Y-direction standoff distance from frame to printhead during printing, a value to specify if printing dual cell types in distinct regions or a single cell type, length of region A, length of region B, frame length, and frame rotation rate. The Python code calculates and outputs a g-code file, containing all parameters and motion/extrusion commands to execute a designed print, which is sent to the printer to produce the designed scaffold. Repetier-Host is used as a user interface to execute these commands as well as manual homing, motion, and extrusion commands.

Scaffolds with two distinct regions were fabricated rapidly and repeatably using the multi-solution rotating frame printing approach (FIG. 12). Here, a collagen fiber scaffold is shown printed with distinct regions of hyaluronic acid dyed with two different colors of food coloring for visualization.

Figure 20:
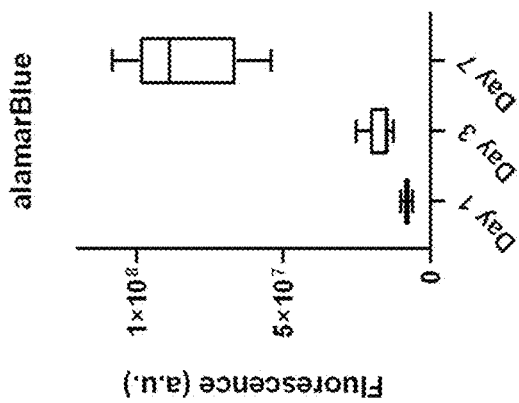
FIG. 20 is a graph illustrating results of an alamarBlue assay indicating metabolic activity for scaffolds printed with human tenocytes after 1, 3, and 7 days of culture.
Figure 19:
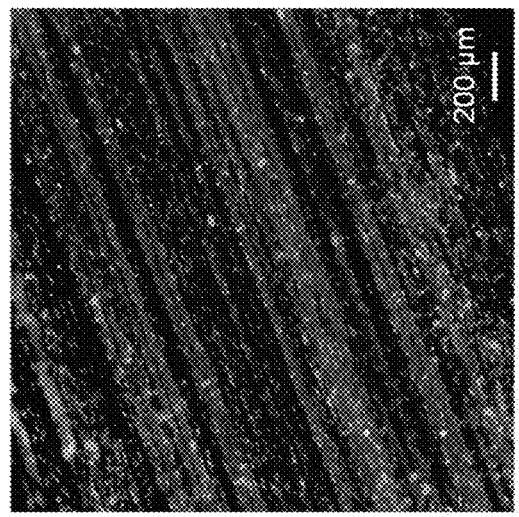
FIG. 19 is a fluorescent microscopy image of the scaffold shown in FIG. 18 after seven days of culture.
Figure 18:
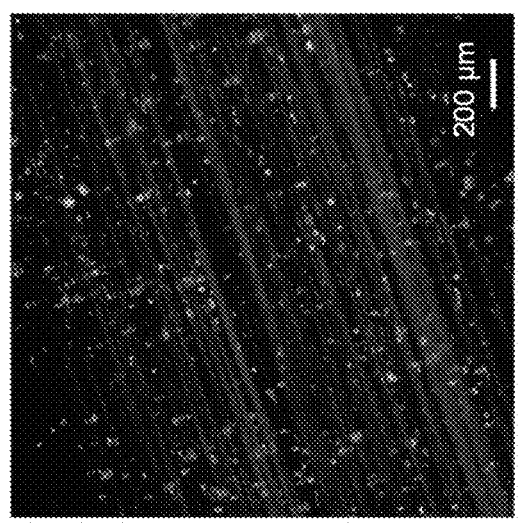
FIG. 18 is a fluorescent microscopy image of a scaffold printed with rat muscle progenitor cells (MPCs) immediately after printing, showing alive cells, dead cells, and collagen fiber autofluorescence at 405 nm.

FIG. 18 is a fluorescent microscopy image of a scaffold printed with rat muscle progenitor cells (MPCs) immediately after printing, showing alive cells, dead cells, and collagen fiber autofluorescence at 405 nm. FIG. 19 is a fluorescent microscopy image of the scaffold shown in FIG. 18 after seven days of culture. After seven days, the cells have proliferated, as shown by the more significant presence of green in FIG. 19. FIG. 20 is a graph illustrating results of an alamarBlue assay indicating metabolic activity for scaffolds printed with human tenocytes after 1, 3, and 7 days of culture.

As an initial characterization step, scaffolds were fabricated using the multi-solution rotating frame printhead, but with only a single solution. That is, the sliding manifold with coating reservoirs is used to coat fiber during printing, but it remains stationary and does not switch between coating with separate solutions during printing. Muscle-like scaffolds were printed with rat muscle progenitor cells (MPCs) (from the lab of Dr. George Christ) suspended at 4E6 cells/mL to assess cell viability and distribution. Before being harvested for printing, adherent cells were labeled with the fluorescent lipophilic tracer DiD according to standard protocols. Scaffolds with a width of 5 mm, length of 10 mm, and thickness of 0.25 mm were printed on PLA frames. Immediately after printing, dead cell nuclei were labeled with fluorescent Ethidium homodimer-1 according to standard protocols. Scaffolds were imaged on an inverted fluorescent microscope (Axiovert, Zeiss). Fluorescent images showing alive cells, dead cells, and collagen fiber autofluorescence at 405 nm were superimposed (FIG. 18). Cells are visible uniformly throughout the scaffold, with a reasonable ratio of live to dead cells. Labeling and imaging were repeated after 7 days of culture (FIG. 19). Cells are visible throughout the scaffold with increased density and ratio of live to dead cells due to significant proliferation.

Tendon-like scaffolds were also printed using human tendon cells, or tenocytes (ZenBio), suspended at 1E6 cells/mL to assess cell metabolic activity over time using the alamarBlue assay. Scaffolds were incubated for 4 hours in 10% alamarBlue solution in tenocyte growth media and fluorescence was measured according to standard protocols. Metabolic activity of cellularized scaffolds in culture (n=7) was found to increase over 7 days of culture (FIG. 20), indicating an increase in cell health, activity, and proliferation.

Figure 22:
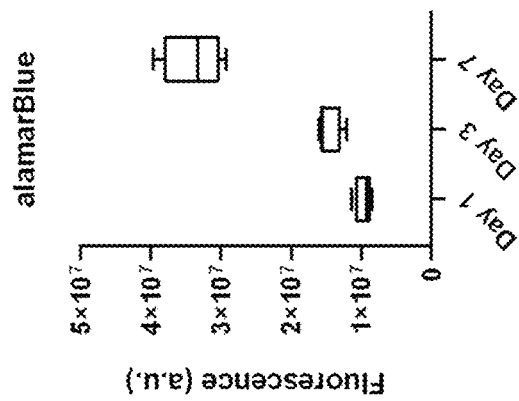
FIG. 22 is a graph showing results of an alamarBlue assay indicating metabolic activity for scaffolds printed with MPCs and tenocytes after 1, 3, and 7 days of culture.
Figure 21:
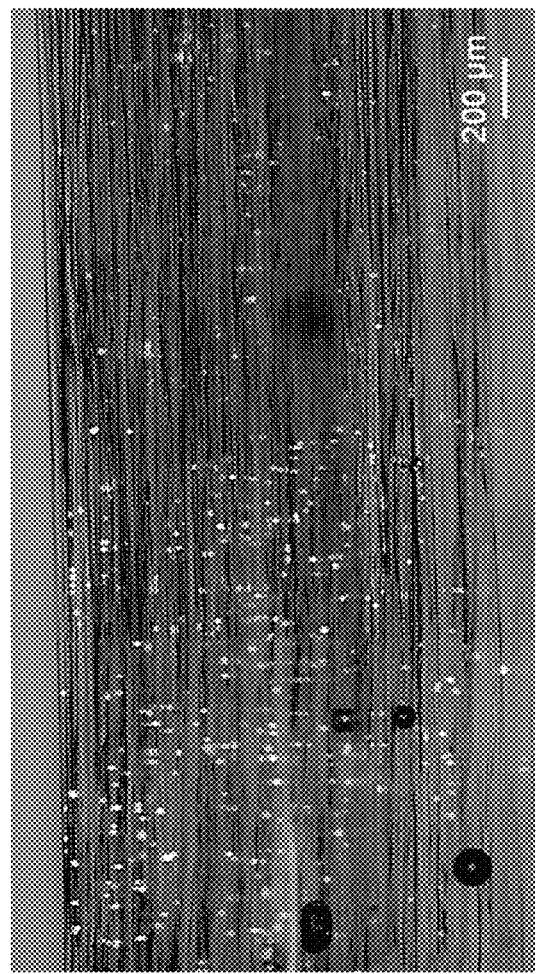
FIG. 21 is a fluorescence image of a dual-solution scaffold printed with MPCs and tenocytes in distinct regions, the image showing a high-density region of MPC's (left) and low-density region of tenocytes (right)

FIG. 21 is a fluorescence image of a dual-solution scaffold printed with MPCs and tenocytes in distinct regions, the image showing a high-density region of MPC's (left) and low-density region of tenocytes (right). FIG. 22 is a graph showing results of an alamarBlue assay indicating metabolic activity for scaffolds printed with MPCs and tenocytes after 1, 3, and 7 days of culture.

To validate multi-solution rotating frame printing, scaffolds with a low density of human tenocytes and a high density of muscle progenitor cells in distinct regions were fabricated. Specifically, the final tenocyte printing solution consisted of 1.5E6 human tenocytes/mL (ZenBio, NC) and the human muscle progenitor cell (MPC) printing solution consisted of 4E6 human muscle progenitor cells/mL (Obtained from the lab of Dr. George Christ, UVA, VA). Printed samples had a total length of 9 mm, with a tenocyte region at one end with length of 4 mm and a MPC region at the opposite end with length of 4 mm. Both cell types were labeled with CellTracker Red CMPTX fluorescent probe for visualization. Fluorescence images taken immediately after printing show distinct regions of high (left side) and low (right side) cell density (cell fluorescence shown in white) with a well-defined interface between them (FIG. 21). This illustrates the ability to fabricate scaffolds with different materials, in this case cell suspensions, in designed regions. Feasibly, this could be extended to varying patterns, such as interdigitating finger-like patterns at an interface as is present in native tissue. These dual-solution scaffolds with regions of tenocytes and MPCs were also used to assess cell metabolic activity over time using the alamarBlue assay. Scaffolds were incubated for 4 hours in 10% alamarBlue solution in muscle progenitor cell growth media and fluorescence was measured according to standard protocols. Metabolic activity of cellularized scaffolds in culture (n=4) was found to increase over 7 days of culture (FIG. 22), indicating an increase in overall cell health, activity, and proliferation across these two cell types in co-culture.

Figure 23:
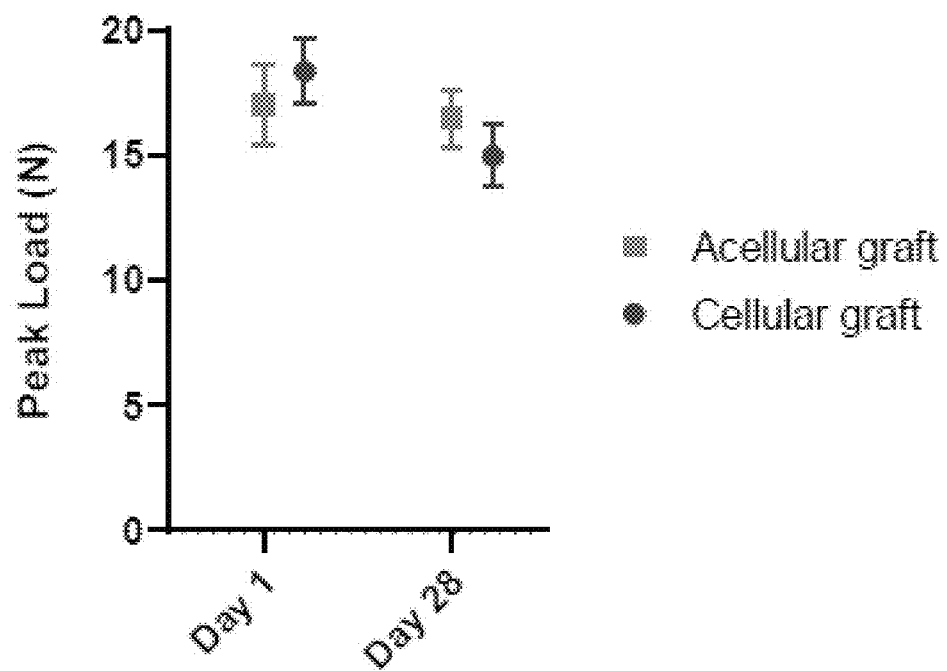
FIG. 23 is a graph showing peak load of acellular and cellular scaffolds printed using the rotating frame approach after 1 day and 28 days in culture.
Figure 24:
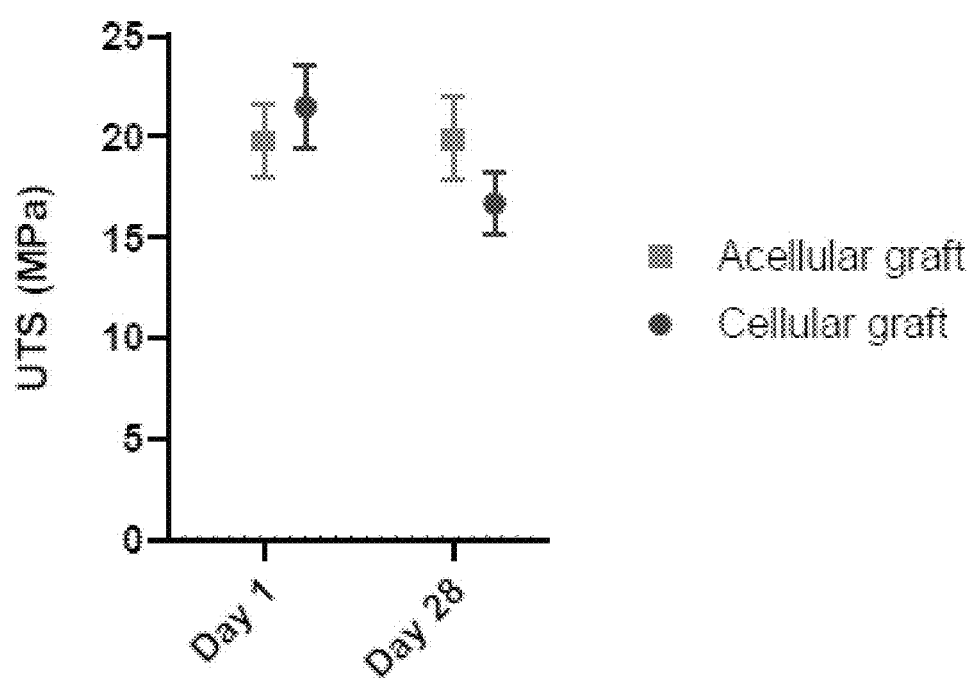
FIG. 24 is a graph showing ultimate tensile strength (UTS) of acellular and cellular scaffolds printed using the rotating frame approach after 1 day and 28 days in culture.
Figure 25:
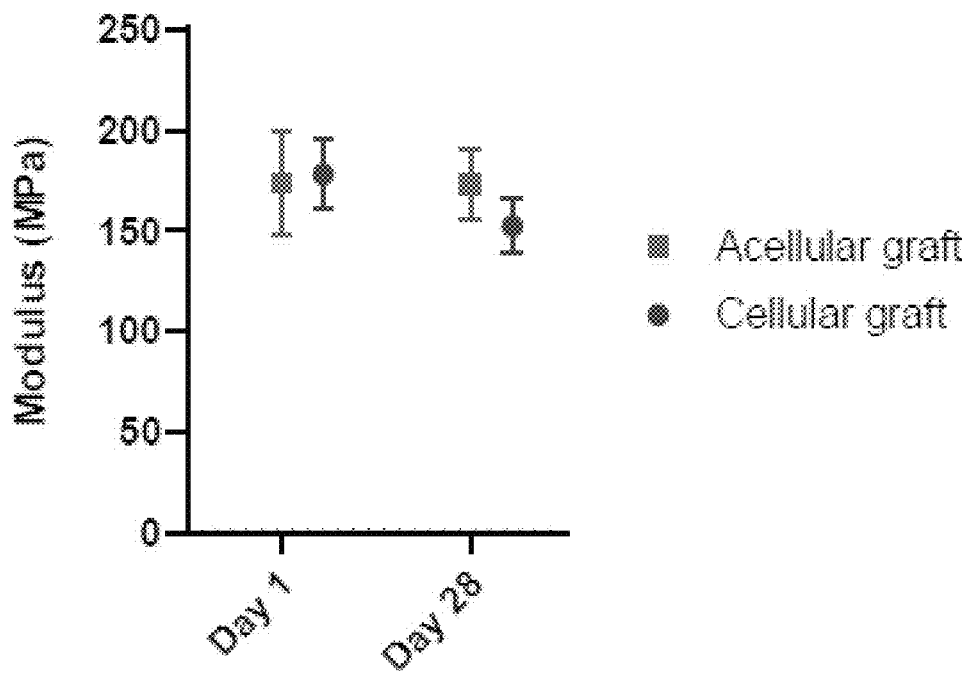
FIG. 25 is a graph showing tangent Modulus of acellular and cellular scaffolds printed using the rotating frame approach after 1 day and 28 days in culture.
Figure 26:
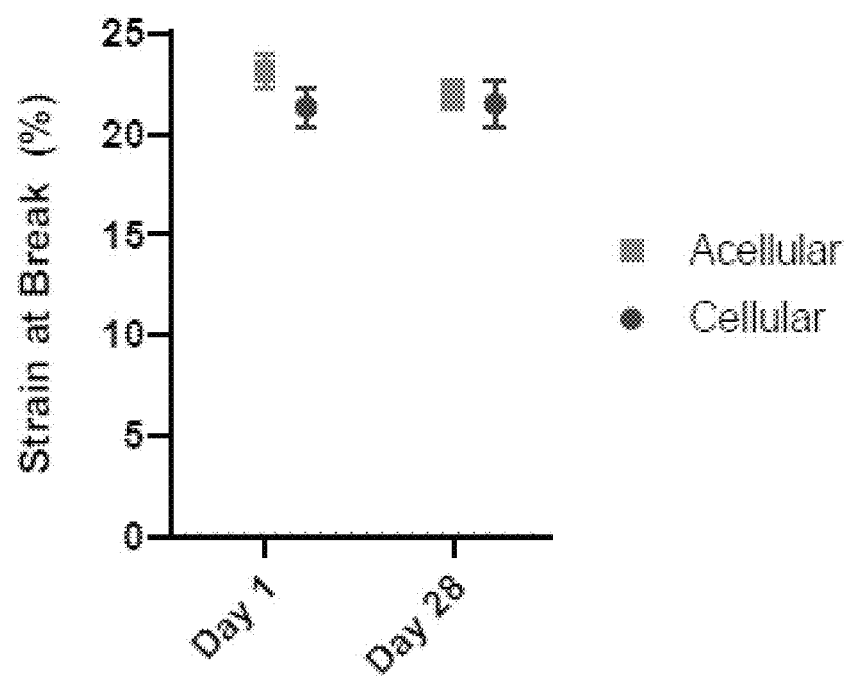
FIG. 26 is a graph showing strain at break of acellular and cellular scaffolds printed using the rotating frame approach after 1 day and 28 days in culture.

Scaffolds were printed with and without human mesenchymal stem cells (hMSCs) and cultured under typical cell culture conditions for 1 and 28 days to assess scaffold mechanical properties. FIG. 23 is a graph showing peak load of acellular and cellular scaffolds printed using the rotating frame approach after 1 day and 28 days in culture. FIG. 24 is a graph showing ultimate tensile strength (UTS) of acellular and cellular scaffolds printed using the rotating frame approach after 1 day and 28 days in culture. FIG. 25 is a graph showing tangent modulus of acellular and cellular scaffolds printed using the rotating frame approach after 1 day and 28 days in culture. FIG. 26 is a graph showing strain at break of acellular and cellular scaffolds printed using the rotating frame approach after 1 day and 28 days in culture.

Scaffolds were printed without and with cells to characterize the mechanical properties of collagen fiber scaffolds printed using the rotating frame approach and the influence of cells. Immediately before testing, samples were removed from culture and excess media was removed with using a lint-free wipe. Sample cross sections were measured using calipers. Each end was clamped into grips of a uniaxial tensile testing machine (MTS Systems Corporation, Eden Prairie, MN) with a 100 N load cell. Samples were pulled to failure with a grip displacement speed of 0.5 mm/sec and load and displacement data were recorded. Ultimate tensile strength (UTS) was determined using the highest recorded load and tangent modulus was determined by the linear region of the stress-strain curve and. Peak load, UTS, tangent modulus, and strain at break are shown in FIGS. 23, 24, 25, and 26, respectively, for identical acellular and cellular scaffolds tested to failure after 1 day and 28 days in culture.

In some embodiments, the the scaffold construct may be formed using a single biocompatible solution. That is, the scaffold construct may include a plurality of collagen microfibers arranged in an organized configuration and coated with a biocompatible solution, such as hyaluronic acid solution. In some embodiments, the biocompatible solution may include cells suspended in the biocompatible solution. In some embodiments, the biocompatible solution may include one or more additives to be coated on the collagen microfiber strand. The one or more additives may include, for example, growth factors, antibiotics, small-molecule pharmaceuticals, or any other suitable additive.

In some embodiments, the collagen microfibers may be arranged in a continuous loop, for example as wrapped around a rotatable frame in the manner described above. In some embodiments, the plurality of collagen microfibers may be substantially parallel to one another. In other embodiments, at least some of the collagen microfibers may be arranged at an oblique angle with respect to other collagen microfibers in the scaffold construct.

Such a single solution scaffold construct may have mechanical properties that approximate or exceed those of human musculoskeletal tissues. In some embodiments, the scaffold construct may have mechanical properties exceeding those of human tendon and ligament tissues. For example, in some embodiments, the scaffold construct may have a mean ultimate tensile strength (UTS), tensile modulus, and strain at break that approximate or exceed those of human anterior cruciate ligament (ACL), human supraspinatus tendon, and human muscle.

Single-Solution Approach

The scaffold construct formed with a single solution may be formed on an apparatus substantially similar to that described above. The apparatus may include a delivery device configured to dispense a collagen microfiber strand through an orifice. The apparatus may include a rotatable frame. Further, the apparatus may include a strand coating system configured to coat the collagen microfiber strand with a biocompatible solution during dispensing of the strand, the solution strand coating system being disposed between the delivery device and the rotatable frame. In addition, the apparatus may include a rotation device configured to rotate the rotatable frame about an axis of rotation.

The apparatus may be configured such that rotation of the rotatable frame draws the collagen microfiber strand through the orifice, thereby coating the collagen microfiber strand with the biocompatible solution, and wraps the collagen microfiber strand about the rotatable frame. The apparatus may be further configured such that the delivery device and the substantially planar frame are translated relative to one another along the axis of rotation in order to wrap the collagen microfiber strand about different portions of the substantially planar frame.

The rotatable frame may have any suitable configuration. In some cases, the rotatable frame may include at least two parallel beams about which the collagen microfiber strand may be wound, thus forming a scaffold construct configured in a continuous loop. In some embodiments, the rotatable frame may be spring biased in order to maintain the continuous loop of scaffold construct under tension. In some embodiments, the rotatable frame may include removable end pieces that fix the parallel beams with respect to one another, wherein removal of the removable end pieces enables the continuous loop scaffold construct to be slid off the parallel beams. In some embodiments, the rotatable frame may be configured to be submerged in a cell culture. In some embodiments, the frame may be formed of a material such that the cells in the biocompatible solution may be less likely to migrate toward the frame material than they are toward the collagen material of the scaffold. For example, in some embodiments, the rotatable frame may be formed of a material such as stainless steel. The cells are more likely to migrate toward the collagen strands than they are toward the stainless steel beams of the rotatable frame. In some embodiments, the frame may be formed of a material that may be sterilized.

In some embodiments, the delivery device may be configured to dispense multiple strands of collagen microfiber simultaneously. The multiple strands may be dispensed through the same needle/orifice. For example, in some cases, three collagen microfiber strands may be simultaneously dispensed and wound about the rotatable frame. It will be understood that any practical number of collagen microfiber strands may be simultaneously dispensed. Drawing multiple collagen microfiber strands simultaneously provides several benefits, including an increase in cellular attachment, increased size and strength of the scaffold construct, faster construction of the construct, increased surface area to which the biocompatible solution (and cells) may be coated, and provides space between the collagen microfibers within which the cells may be bound.

The method of making a scaffold construct with a single biocompatible solution may be substantially similar to the process described above for creating a dual solution scaffold construct, except that, instead of alternating between the solutions through which the strand is dispensed, the strand may be continuously dispensed through a single solution. The method of making a scaffold construct may include affixing a collagen microfiber strand to a rotatable frame and rotating the rotatable frame about an axis of rotation in order to wrap the collagen microfiber strand around the rotatable frame. Wrapping the collagen microfiber strand around the rotatable frame draws the collagen microfiber strand from a delivery device, thereby dispensing the collagen microfiber strand through an orifice and drawing the collagen microfiber strand through a biocompatible solution. This may form a scaffold construct configured as a continuous loop.

The method may further include translating the substantially planar frame and a dispensing device with respect to one another along the axis of rotation in order to wrap the collagen microfiber strand about different portions of the rotatable frame. In some cases, the method may include drawing multiple collagen microfibers simultaneously by the rotation of the rotatable frame.

In some embodiments, the rotatable frame may include at least two parallel beams about which the collagen microfiber strand may be wound. In some cases, the rotatable frame may include two end pieces that hold the parallel beams at a predetermined distance with respect to one another. At least one of the end pieces may be removable. In such embodiments, the method may include removing at least one of the removable end pieces and sliding the scaffold construct off the parallel beams.

In some cases in which a cellular solution is utilized, the method may include submerging the rotatable frame with collagen microfiber wrapped on it in a cell culture. The scaffold construct on the frame may be left in the cell culture for a predetermined amount of time.

Submerged (Hydrogel) Approach

It will be appreciated that the rotating frame printing approach may be used to form scaffold constructs that include a biocompatible hydrogel. Such constructs may be formed by dispensing a collagen microfiber through a first biocompatible solution and submerging the rotating frame in a second biocompatible solution that, when combined with the first biocompatible solution, produces a hydrogel, thus encasing the plurality of collagen microfiber windings about the rotatable frame in a biocompatible hydrogel.

An exemplary procedure includes dispensing the collagen microfiber(s) through a fibrinogen solution (that may be a cellular solution) and winding the microfiber(s) onto a rotating frame submerged in a thrombin solution. The fibrinogen and thrombin, when combined form a fibrin hydrogel material, which encases or otherwise coats the scaffold construct. Fibrin is a naturally occurring protein formed during the clotting of blood, has been widely used in FDA-approved medical procedures, and offers promise as a tissue engineering material due to its biocompatibility, bioactivity, and mechanical properties.

Whereas, in the non-submerged procedures, the first biocompatible solution is a hyaluronic acid solution (in some cases including cells, such as hMSCs), for the submerged procedures, the first biocompatible solution may, instead, include cells suspended in a 40 mg/mL bovine-derived fibrinogen solution (1 to 10 million cells/mL). As before, the rotating frame bioprinting process may be used to controllably coat collagen microfiber with this cell suspension as the fiber is wrapped next to and on top of itself to form 3D grafts with cells distributed throughout.

Instead of conducting the scaffold formation in air, in some embodiments, the submerged method may utilize a bath of 7 U/mL bovine-derived thrombin solution prepared in hMSC media in which grafts remain submerged during printing. As collagen fiber coated with the dispensed fibrinogen cell suspension contacts the bath, the thrombin rapidly initiates the solidification of the fibrinogen and formation of a stable fibrin gel. This process binds cells to the fiber and significantly reduces the number of cells dislodged from printed scaffold constructs. Solutions should be selected that, when combined, begin the process of solidifying (gelation) within seconds.

The thrombin bath also maintains scaffold hydration and may be warmed to 37° C. in order to limit cell stress during printing. When printing is complete, the bath is lowered to allow access to the temporary frame for transfer to a culture plate in which the rotatable frame may be disposed.

A 14-day study was conducted to assess cell health and proliferation through fibrin grafts using the alamarBlue assay for cell metabolic activity. While cell metabolic activity is not directly indicative of cell number due to the possibility of varying cell states, alamarBlue has been used to estimate the total number of cells in a graft by generating a standard curve. Known numbers of cells were plated in a well plate using serial dilution, allowed 3 hours for attachment, and assessed using standard alamarBlue protocols. Overall, an exponential increase in the number of cells was observed, indicating excellent cytocompatibility of implants produced with fibrin gel using the submerged rotating frame approach.

The submerged rotating frame approach may be applied to a wide variety of cytocompatible reagent pairs that form a hydrogel when brought into contact with one another, such as a collagen solution printed into a neutralizing buffer or sodium alginate printed into an ionic crosslinking solution, to name a few. In other embodiments, exemplary hydrogel precursor/fluid bath combinations may include fibrinogen+ thrombin, fibrinogen/thrombin+Factor XIII, alginate+ionic compound, collagen+enzymatic solution, silk+enzymatic solution, or gelatin+enzymatic solution. Other reagent pairs will be known to persons skilled in the art.

In addition, the first biocompatible solution may include one or more additives to be coated on the collagen microfiber strand. One or more additives may include, for example, growth factors, antibiotics, or small-molecule pharmaceuticals.

The scaffold construct formed with a biocompatible hydrogel may have mechanical properties approximating or exceeding those of human musculoskeletal tissues. For example, the scaffold construct may have mechanical properties approximating or exceeding those of human tendon and ligament tissues. Notably, the scaffold construct may have a mean ultimate tensile strength (UTS), tensile modulus, and strain at break that approximate or exceed those of human anterior cruciate ligament (ACL), human supraspinatus tendon, and human muscle.

Figure 27:
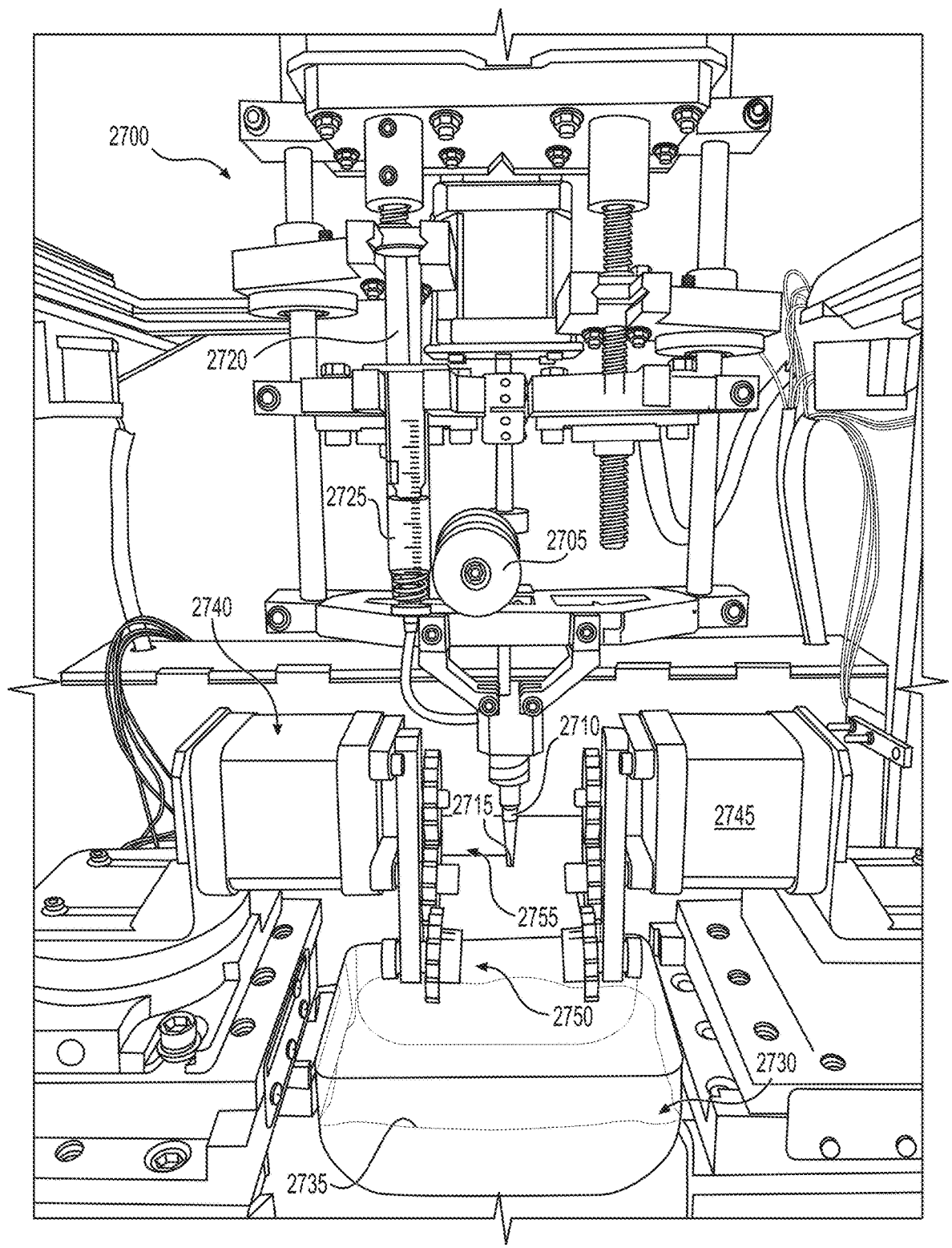
FIG. 27 is schematic front view of an apparatus for making a scaffold construct on a rotatable frame while submerged in a solution.

FIG. 27 is schematic front view of an apparatus for making a scaffold construct on a rotatable frame while submerged in a solution. Such a scaffold construct may include a plurality of collagen microfibers arranged in an organized configuration and coated with a biocompatible hydrogel. The collagen microfibers may be arranged in a continuous loop. Other geometries could also be formed using the submerged rotating frame. For example, at least some of the windings on the rotating frame may be disposed at an oblique angle with respect to the direction of winding.

As shown in FIG. 27, an apparatus 2700 for making a scaffold construct may include mechanical structure similar to the apparatus described above. For example, apparatus 2700 may include a delivery device configured to dispense a collagen microfiber strand. The delivery device may include a spool 2705 configured to dispense one or more collagen microfiber strands. In some embodiments, spool 2705 may include multiple spools (see FIG. 28). Accordingly, as discussed above, spool 2705 may be configured to dispense more than one microfiber strand, e.g., three strands.

Apparatus may further include a strand coating system configured to coat the collagen microfiber strand with a first biocompatible solution during dispensing of the strand, the solution strand coating system being disposed between the delivery device and the rotatable frame. As shown in FIG. 27, the strand coating system may include a syringe 2720 containing a first biocompatible solution 2725 and a needle or nozzle 2710 having an orifice 2715 through which the collagen microfiber strand may be drawn. It will be understood that, in some embodiments, the orifice may be provided on a different type of structure other than a needle or nozzle. Syringe 2720 may be configured to dispense first biocompatible solution 2725 in a manner that coats the collagen microfiber strand as it is being dispensed through orifice 2715.

Apparatus 2700 may be configured such that rotation of the rotatable frame draws the collagen microfiber strand through orifice 2715, thereby coating the collagen microfiber strand with the first biocompatible solution 2725, and wraps the collagen microfiber strand about the rotatable frame. Accordingly, apparatus 2700 may include a rotation device configured to rotate the rotatable frame about an axis of rotation. For example, as further shown in FIG. 27, apparatus 2700 may include a rotation system 2740 configured to spin the rotatable frame. Rotation system 2740 may include a rotation motor 2745. Rotation motor 2745 may be any suitable type of rotating motor, and may have any characteristics of the motor discussed above. For example, in some embodiments, rotation motor 2745 may be a stepper motor.

Apparatus 2700 may further include a bath configured to contain a second biocompatible solution in which the rotatable frame may be submerged during wrapping of the collagen microfiber strand about the rotatable frame. For example, as shown in FIG. 27, apparatus 2700 may include a bath 2730 containing a second biocompatible solution 2735. As shown in later figures, bath 2730 may be configured to permit a rotatable frame to be submerged therein and rotated to wind the collagen microfiber strand about the rotating frame.

In addition, apparatus 2700 may include a rotatable frame support structure 2750 configured to hold a rotatable frame to be rotated by rotation motor 2745. In addition, apparatus 2700 may include a rotatable frame relocation system 2755 configured to relocate the mounting location of the rotatable frame lower with respect to rotation motor 2745. This permits the rotatable frame to be disposed within bath 2730 while it is being rotated.

The rotatable frame may have any suitable configuration upon which a collagen microfiber strand may be wound. For example, in some embodiments, the rotatable frame may include at least two substantially parallel beams that are spaced apart. Winding the collagen microfiber strand about such parallel beams produces a scaffold construct configured as a continuous loop. Across varying rotatable frame geometries, rigid frames were found to maintain fiber alignment and the macrostructure of printed scaffold constructs in culture over several weeks.

Figure 28:
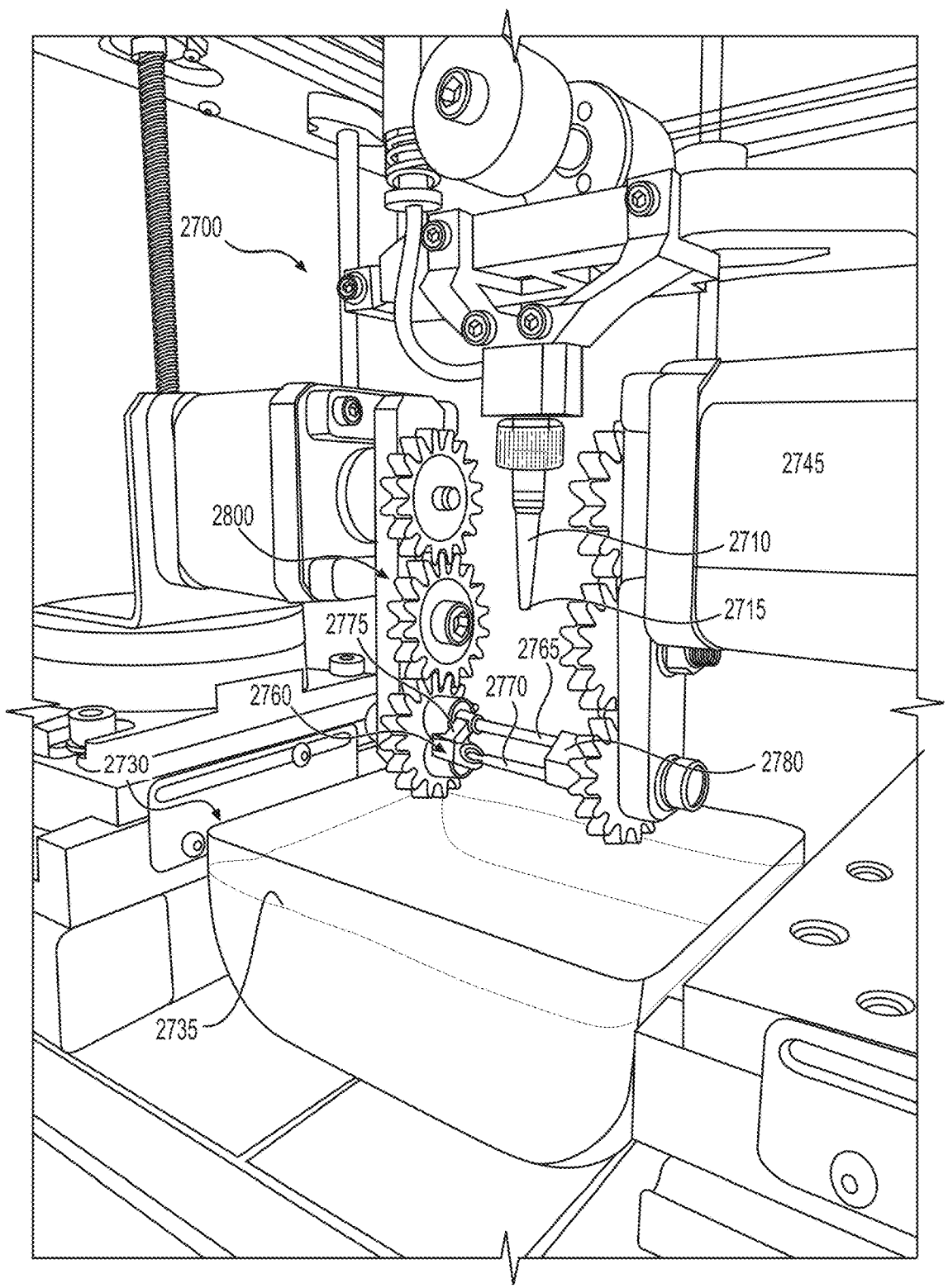
FIG. 28 is a schematic perspective front view of the apparatus of FIG. 27.

FIG. 28 is a schematic perspective front view of the apparatus of FIG. 27. As shown in FIG. 28, the rotatable frame 2760 may include at least two parallel beams about which the collagen microfiber strand may be wound, thus forming a scaffold construct configured in a continuous loop. (See also, FIGS. 34-36.) For example, as shown in FIG. 28, rotatable frame 2760 may include a first beam 2765 and a second beam 2770. In some embodiments, first beam 2765 and second beam 2770 may be substantially parallel to one another when rotatable frame 2760 is assembled. In some embodiments, rotatable frame 2760 may also include a first end piece 2775 and a second end piece 2780 that fix first beam 2765 and second beam 2770 with respect to one another. In some embodiments, at least one of these end pieces may be removable to permit the continuous loop scaffold construct to be slid off the beams.

The rotatable frame may have any of a variety of suitable configurations and/or properties, including those of the designs shown in FIGS. 2-6 and 12 and discussed above. In some embodiments, the rotatable frame may be spring biased in order to maintain the continuous loop of scaffold construct under tension. See, for example, FIG. 6.

After the collagen microfiber strand is wound on a rotatable frame, the entire frame may be submerged in a cell culture. Accordingly, in some embodiments, the rotatable frame may be configured to be submerged in a cell culture without degrading.

As also shown in FIG. 28, apparatus 2700 may include an additional rotation assembly configured to facilitate submerged printing. For example, rotatable frame relocation system (2755; shown in FIG. 27) may include a gear system 2800. Gear system 2800 transmits the rotation of rotation motors to a lower location so that the rotatable frame may be rotated at a location displaced from the axis of the motor output shaft.

A method of making a scaffold construct may include affixing a collagen microfiber strand to a rotatable frame and rotating the rotatable frame about an axis of rotation in order to wrap the collagen microfiber strand around the rotatable frame, as discussed above. As also described above, wrapping the collagen microfiber strand around the rotatable frame draws the collagen microfiber strand from a delivery device, thereby dispensing the collagen microfiber strand through an orifice and drawing the collagen microfiber strand through a first biocompatible solution. The the rotatable frame is submerged in a second biocompatible solution during the wrapping of the collagen microfiber strand around the rotatable frame and the first biocompatible solution combined with the second biocompatible solution form a biocompatible hydrogel.

Figure 29:
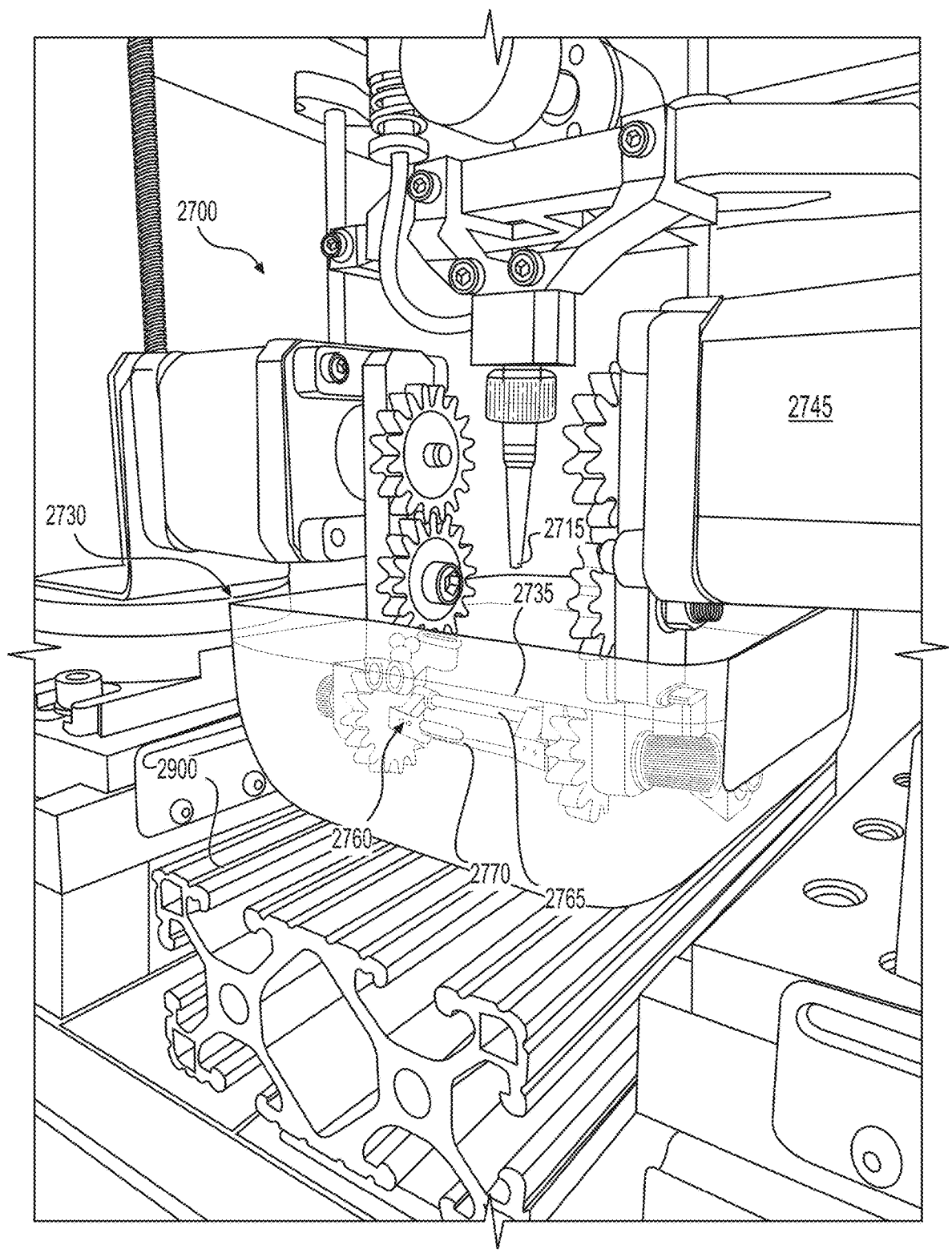
FIG. 29 is a schematic perspective front view of the apparatus of FIG. 27 with the rotatable frame submerged.

FIG. 29 is a schematic perspective front view of the apparatus of FIG. 27 with the rotatable frame submerged. As shown in FIG. 29, a support block 2900 may be used to raise the position of bath 2730 in order to submerge rotating frame 2760.

Figure 30:
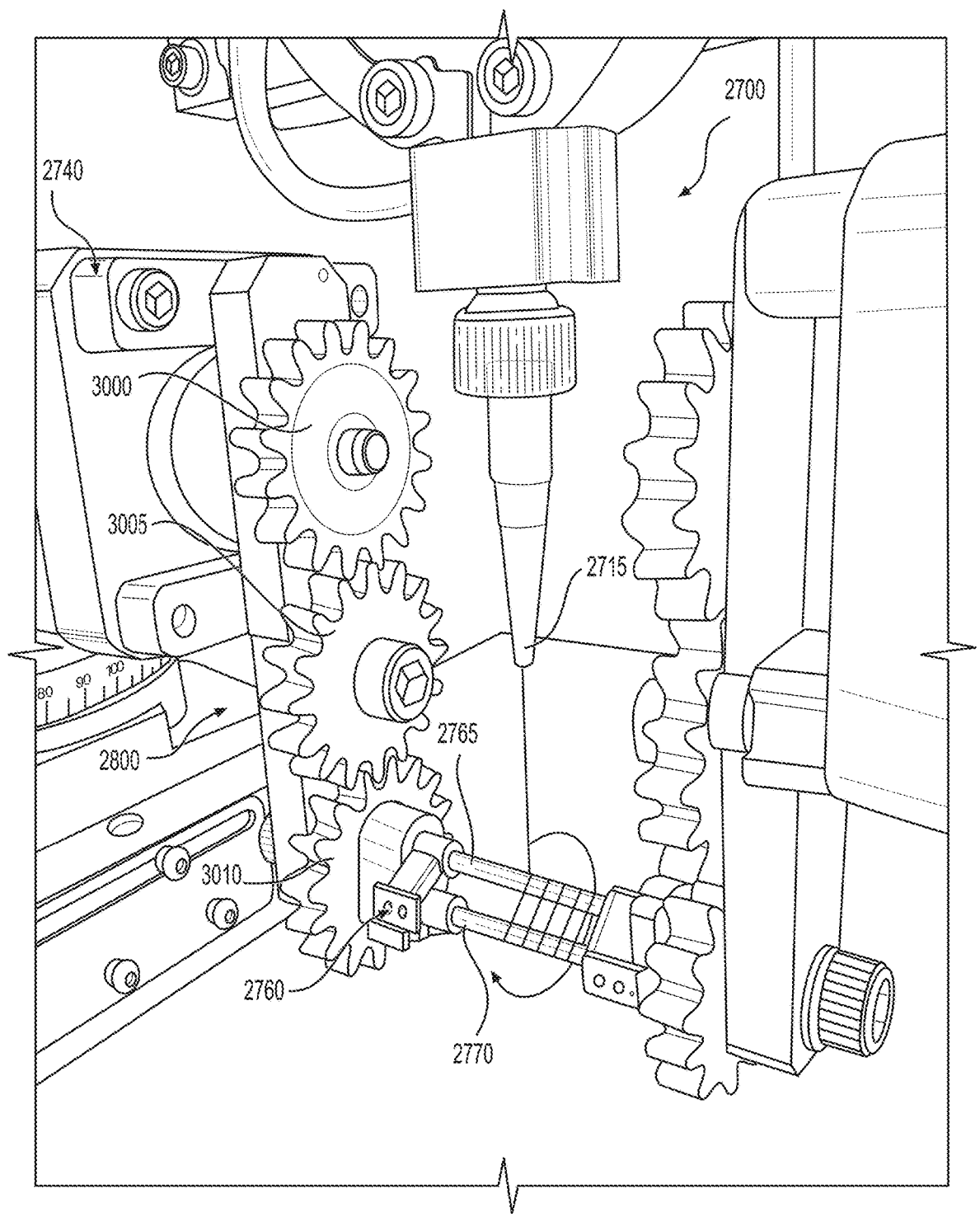
FIG. 30 is a schematic perspective front view of a gear system of the apparatus of FIG. 27.

FIG. 30 is a schematic perspective front view of gear system 2800 of apparatus 2700. As shown in FIG. 30, gear system 2800 may include a first gear 3000 mounted on the output shaft of a rotation motor. Gear system 2800 may also include a second gear 3005 that is driven by first gear 3000 and a third gear 3010 that is driven by second gear 3005. Third gear 3010 may be attached to rotatable frame support structure 2750. (See FIG. 27.)

Figure 31:
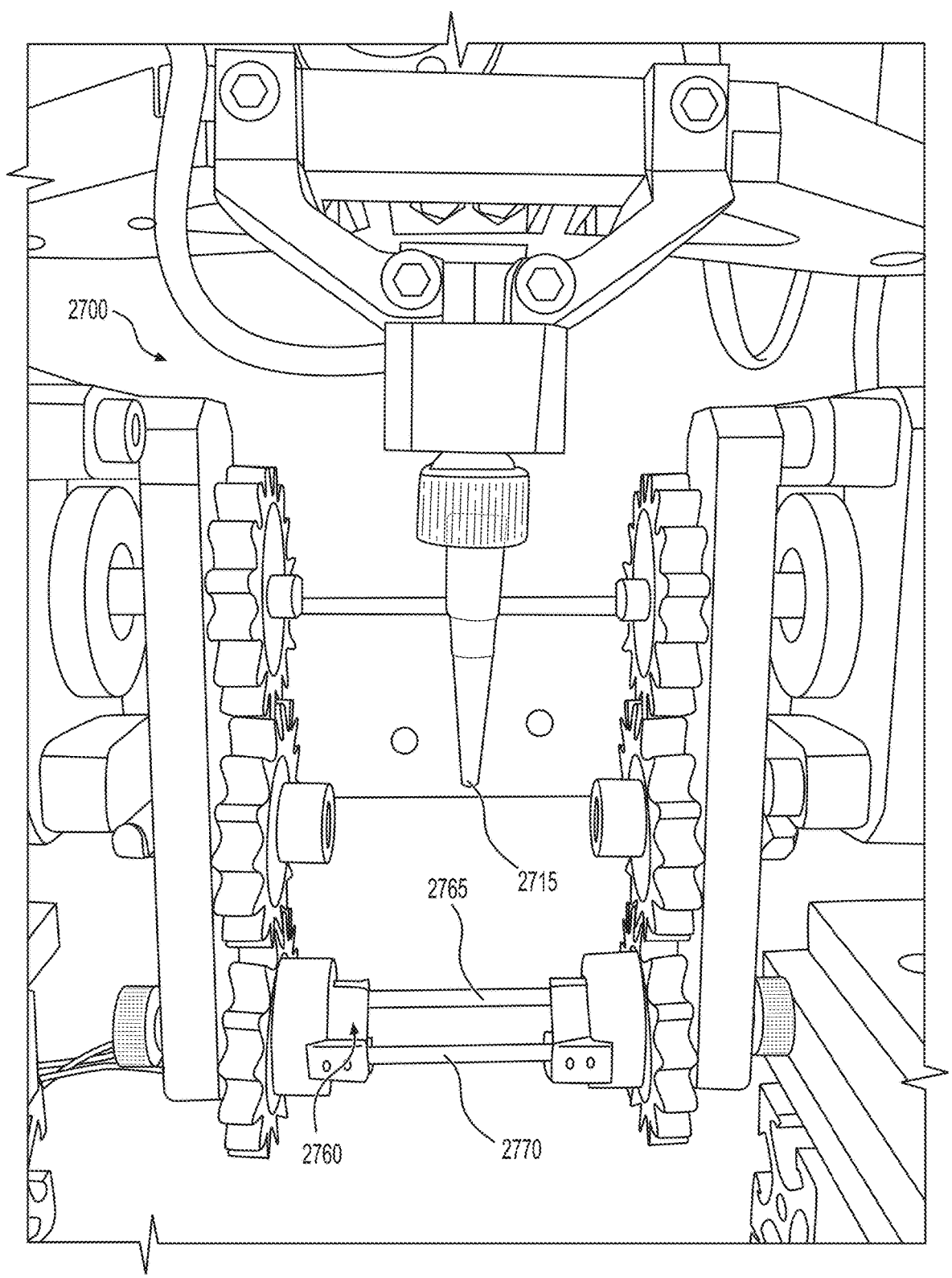
FIG. 31 is is a schematic front view of the gear system of the apparatus of FIG. 27.

FIG. 31 is is a schematic larger front view of the gear system of the apparatus of FIG. 27. Rotatable frame 2760 can clearly be seen mounted in the apparatus.

Figure 32:
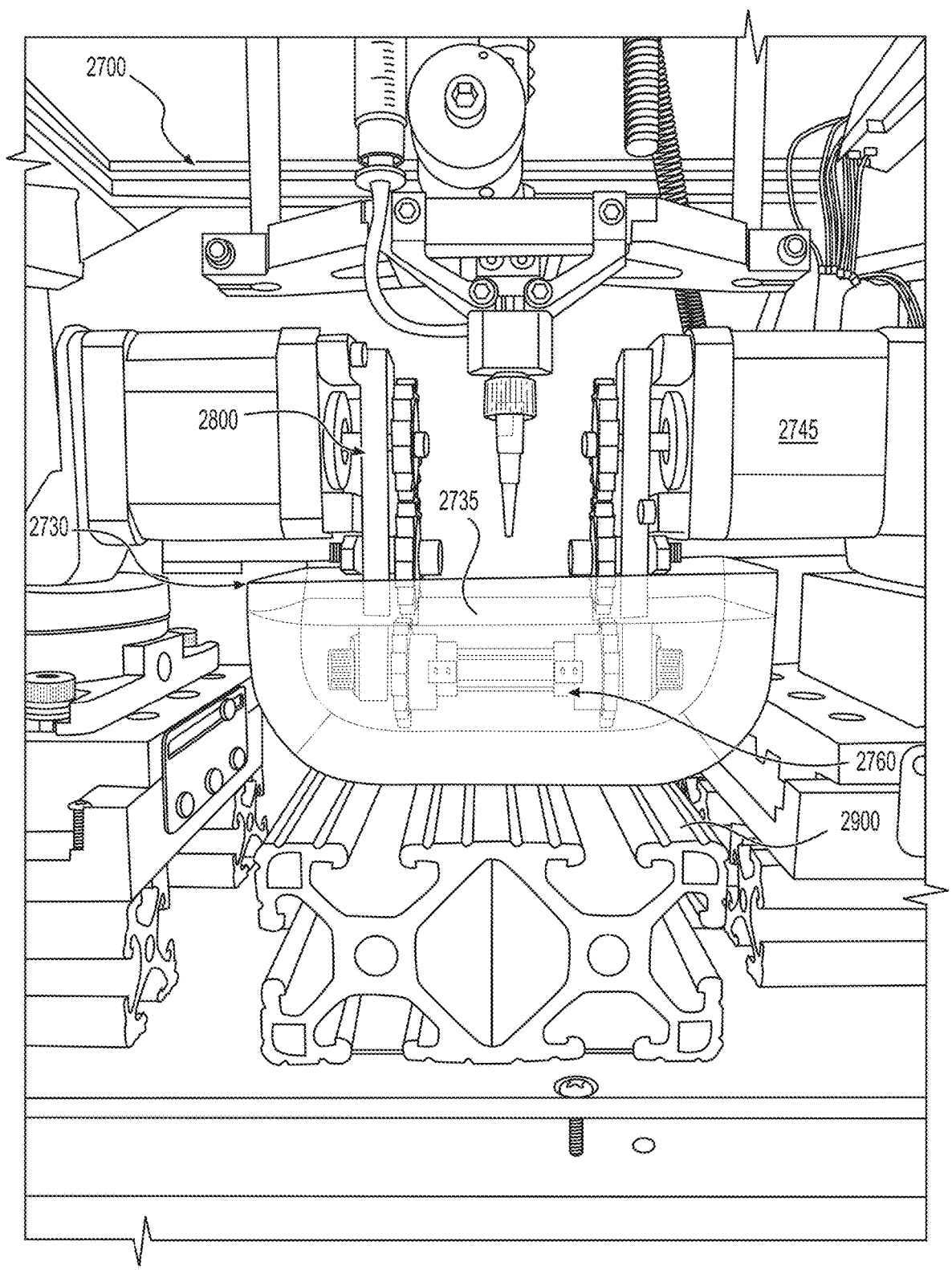
FIG. 32 is a schematic front view of the apparatus of FIG. 27 with the rotatable frame submerged.
Figure 33:
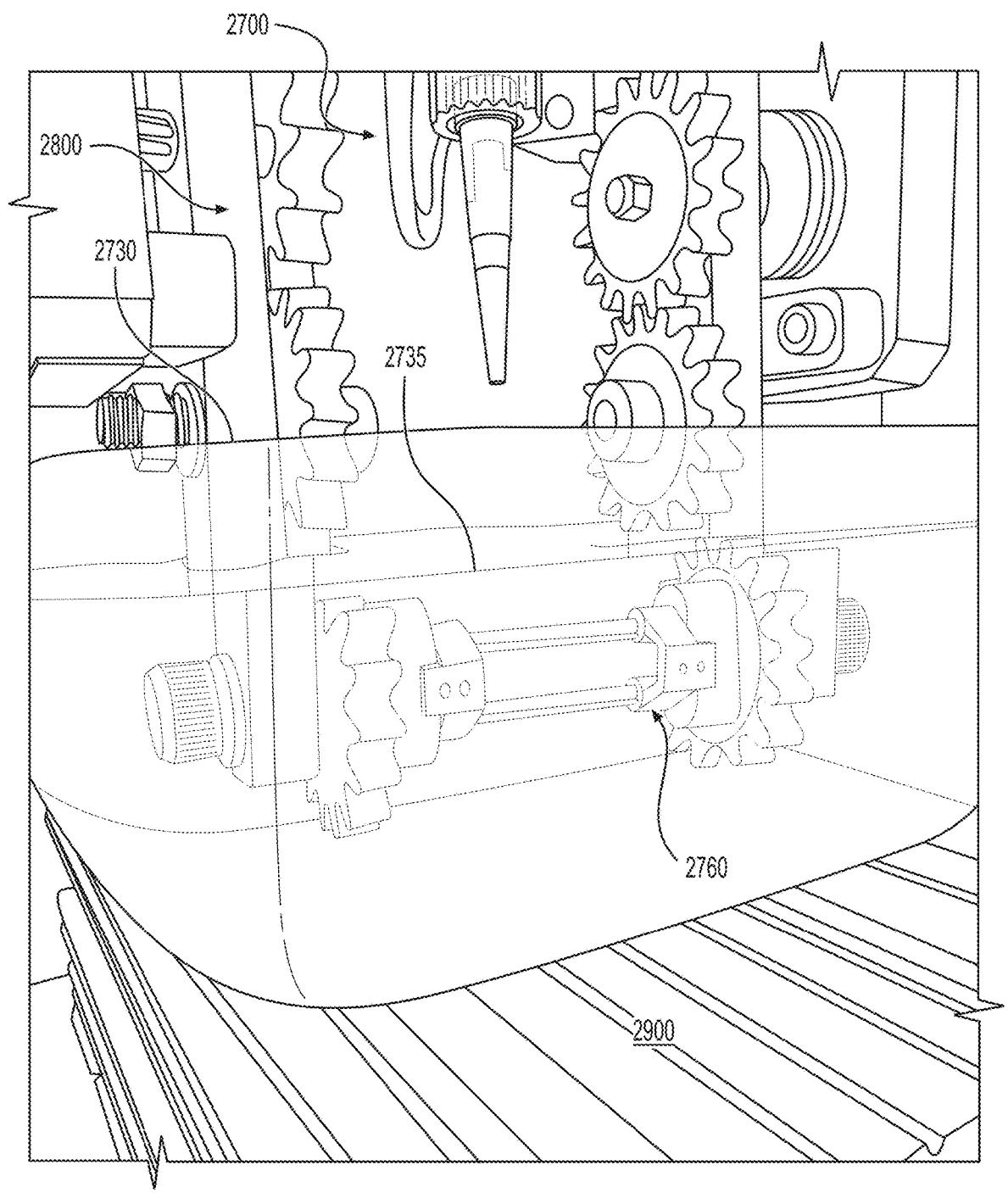
FIG. 33 is a schematic perspective front view of the rotatable frame of the apparatus of FIG. 27 while submerged.

FIG. 32 is a schematic front view of the apparatus of FIG. 27 with the rotatable frame submerged. As shown in FIG. 32, bath 2730 may be raised up and support block 2900 may be placed underneath it. In some embodiments, bath 2730 may be movable manually. In other embodiments, bath 2730 may be raised up and down with a mechanical lift system. Alternatively, rotatable frame 2760 may be lowered into bath 2730. FIG. 33 is a schematic perspective front view of rotatable frame 2760 mounted in apparatus 2700 and submerged in bath 2730.

Figure 34:
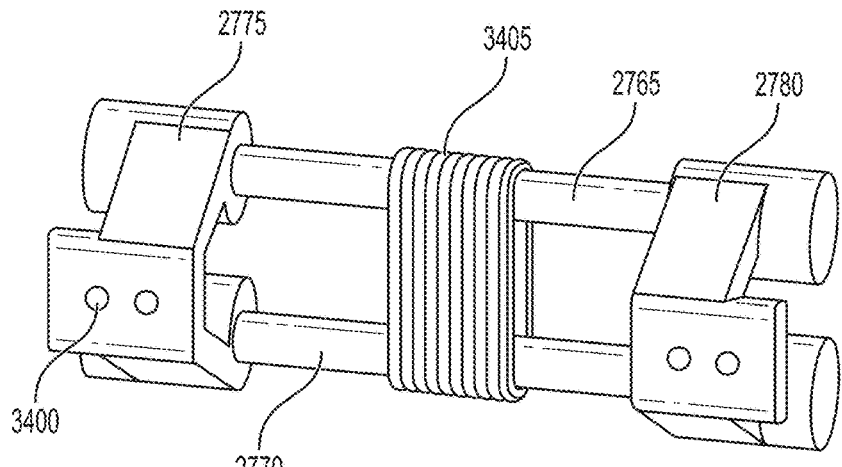
FIG. 34 is a schematic perspective rear view of a rotatable frame according to an exemplary embodiment.

FIG. 34 is a schematic perspective rear view of rotatable frame 2760. As shown in FIG. 34, rotatable frame 2760 may be composed of first beam 2765 and second beam 2770, which may be fixed with respect to one another by first end piece 2775 and second end piece 2780. First end piece 2775 and second end piece 2780 may be configured to be mountable in the rotation mechanism. And, again, one or both of the end pieces may be removable from the beams in order to slide the scaffold construct (3405) off the beams. In some embodiments, the end pieces of the frame may be formed of a flexible material, such as rubber, so that the beams may be squeezed together in order to reduce tension on the scaffold construct and permit the scaffold construct to be removed from the rotatable frame.

In addition, first end piece 2775 and/or second end piece 2780 may include holes 3400. After winding, the collagen microfiber strand may be cut from the spool, thus leaving a loose end. The loose end of the strand may be tied through holes 3400 to keep the scaffold construct from unraveling. This can be seen in FIG. 35 where the loose end 3430 is tied through holes 3400. In some cases, holes 3400 may be utilized to secure the leading end of the collagen microfiber to the rotatable frame before the winding takes place.

Figure 35:
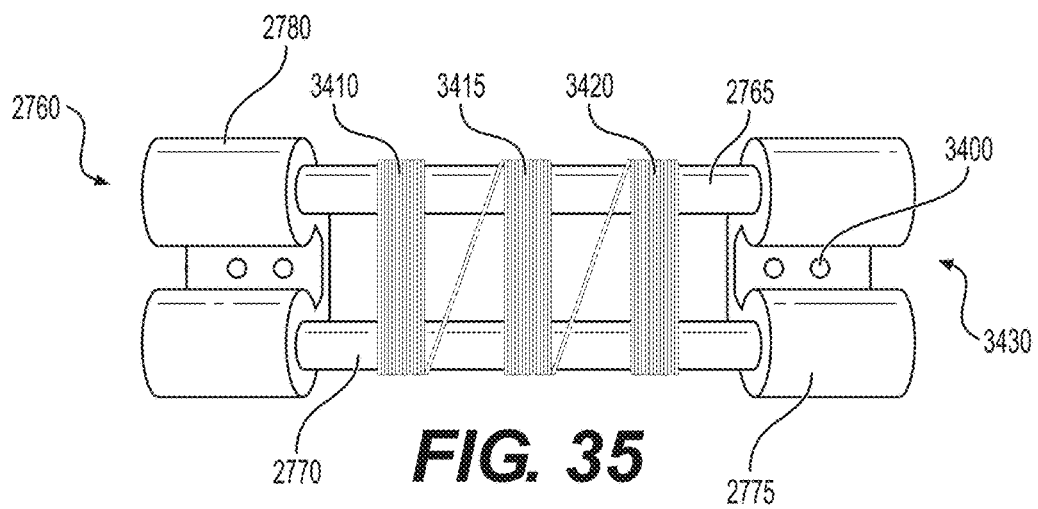
FIG. 35 is a schematic front view of the rotatable frame of FIG. 34 with a collagen microfiber wound in three separate sections.

As explained with respect to the embodiments discussed above, the apparatus may be configured such that the delivery device and the rotatable frame are translated relative to one another along the axis of rotation in order to wrap the collagen microfiber strand about different portions of the rotatable frame. FIG. 35 is a schematic front view of the rotatable frame of FIG. 34 with a collagen microfiber wound in three separate sections. By moving the frame laterally with respect to the orifice (or vice versa), the collagen microfibers may be collected in different sections of the rotatable frame.

Figure 36:
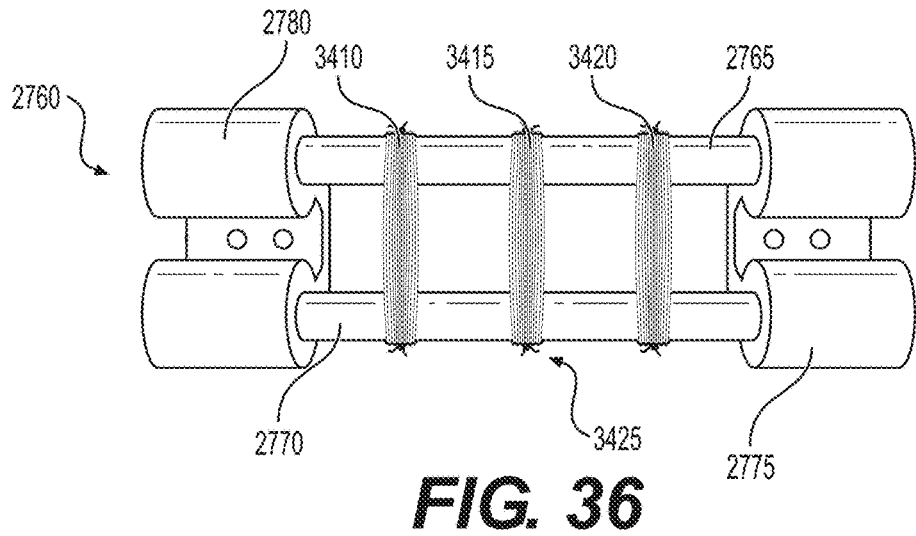
FIG. 36 is a schematic front view of the rotatable frame with three sections of wound collagen microfiber with sutures binding each end of the sections, thus forming three separate scaffold constructs.

In particular, a first scaffold construct 3410 may be formed in a first area of rotatable frame 2760. A second scaffold construct 3415 may be formed in a second area of rotatable frame 2760. And a third scaffold construct 3420 may be formed in a third area of rotatable frame 2760. The number of scaffold constructs formable on the rotatable frame may depend on the overall size of the frame, the number of strands drawn/wound simultaneously, the thickness of the collagen microfiber strand(s), and the overall size of the scaffold contructs. FIG. 36 is a schematic front view of rotatable frame 2760 with three sections of wound collagen microfiber with sutures 3425 binding each end of the sections, thus forming three separate scaffold constructs.

Cell Alignment, Cell Distribution, and Mechanical Properties

The following section describes aspects of cell alignment, cellular distribution, and mechanical properties of the scaffold constructs formed using the methods disclosed herein. The manufacturing methods are described below for each sample that was evaluated. However, it will be understood that mechanical properties are expected to be similar for scaffold constructs formed by each of the different manufacturing methods described herein, since the majority of the strength is provided by the collagen microfibers, which are common to all types of the scaffold constructs disclosed.

Testing has revealed exceptional implant fidelity and cellularity. Cellularized collagen microfiber scaffold constructs were formed using a single solution technique (i.e., with a collagen microfiber strand dispensed through a cellularized hyaluronic acid solution). After winding, the scaffold constructs were secured into individual bundles using sutures as described above.

Benchmark implants were printed with hMSCs to assess cell metabolic activity after 1, 4, and 7 days in culture using the alamarBlue assay. Fluorescence indicated that metabolic activity of cellularized implants was found to increase 5-fold over a 7-day culture period, indicating an increase in cell health, activity, and proliferation.

Figure 37:
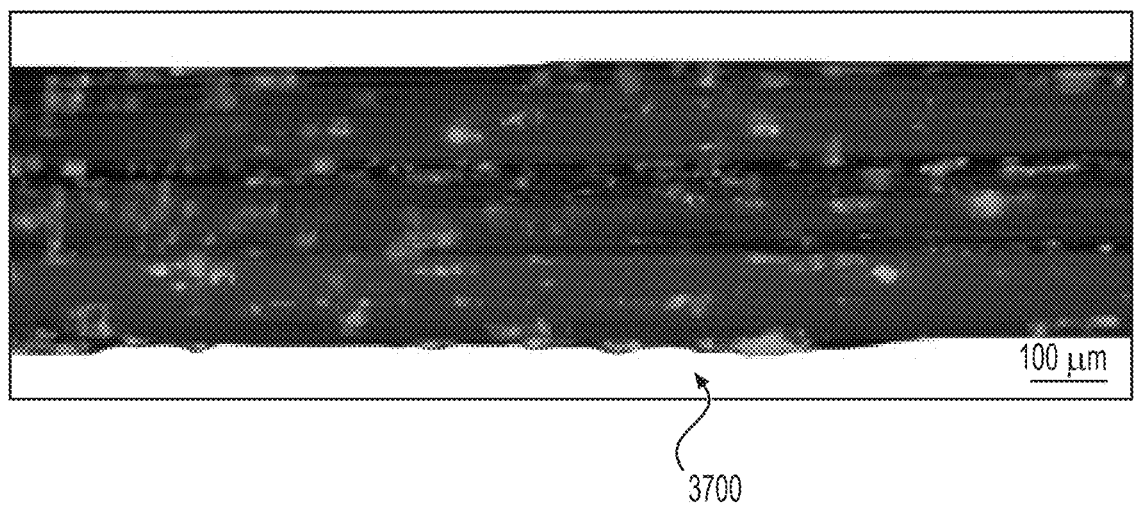
FIG. 37 is an image of three collagen microfibers that have been dispensed through a cellular hyaluronic acid solution showing cells disposed immediately on the surface of the microfibers.

Cell viability throughout printed implants was assessed qualitatively and quantitatively by fluorescent imaging of hMSCs. FIG. 37 is an image of three collagen microfibers that have been dispensed through a cellular hyaluronic acid solution. Qualitatively, generally, high viability is indicated by live cells (green) greatly outnumbering dead cells (red). Additionally, FIG. 37 shows cells 3700 disposed immediately on the surface of the collagen microfibers. This is one benefit of the single solution approach, namely that the cells tend to gravitate to the strand, as opposed to the two-solution approach that forms a hydrogel in which the cells tend to float or remain suspended in the gel with slight separation from the surface of the strand. On the other hand, the hydrogel may keep the cells more evenly distributed on the scaffold construct as it is more solid.

Quantitatively, ImageJ was used with established cell counting techniques to compare the number of live and dead cells throughout implants immediately after printing. For representative implants printed with typical process parameters, hMSCs were found to be 93.2±1.7% viable immediately after printing, and cell viability was consistently above 90% for various implants geometries and printing conditions.

Additionally, fluorescence imaging of cells and fiber autofluorescence showed printed implants with a uniform initial distribution of hMSCs throughout after one day in culture and confluent densely-cellularized implants after 26 days in culture. Printed cells were found to attach to and grow along the collagen fiber within 24 hours and continued to proliferate to confluency at a rate dependent on cell type, initial cell printing density, and culture conditions.

In extended culture, the gross appearance of implants transitioned from largely translucent with visible fiber-like surface texture to an opaque white to yellowish color with a smooth surface texture, indicating a significant accumulation of deposited extracellular matrix (ECM). Dense cellular ingrowth as cells bridged gaps between adjacent fibers was also observed.

Over time, the cells elongate along the longitudinal length of the collagen microfibers. The directionality of the matrix has been shown to affect function, cellular remodeling potential [Foolen 2018] and the alignment of cell-produced extracellular matrix [Wang 2003]. As such, directionality analysis in ImageJ was used to quantify matrix directionality throughout Assembled Cell-Decorated Collagen (AC-DC) implants using fluorescence imaging and image processing techniques. A representative composite image of a typical 2×2 mm field of view of an implant printed with MPCs after 14 days of culture is shown in FIG. 38.

Figure 38:
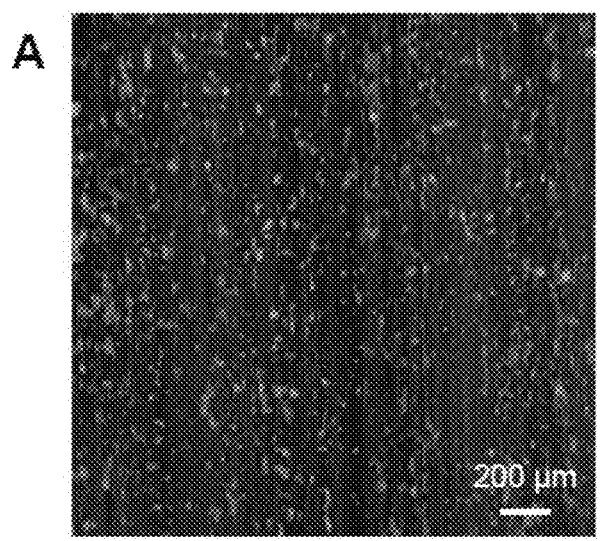
FIG. 38 is a field view of a scaffold construct with rat muscle progenitor cells (MPCs) distributed throughout and aligned after 14 days in culture.
Figure 39:
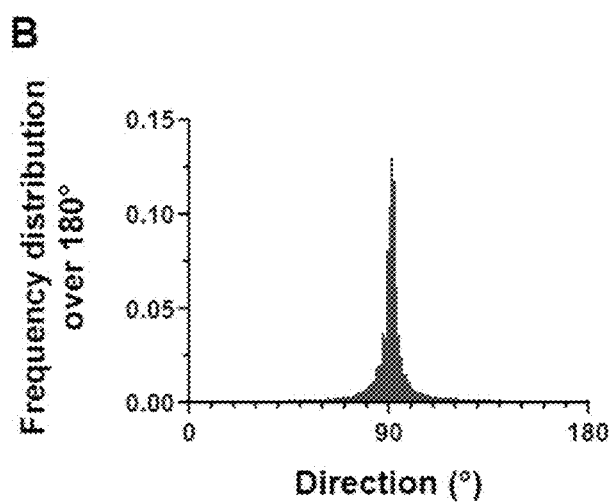
FIG. 39 is a graph illustrating a directionality analysis of the fiber-only component of the scaffold construct shown in FIG. 38.
Figure 40:
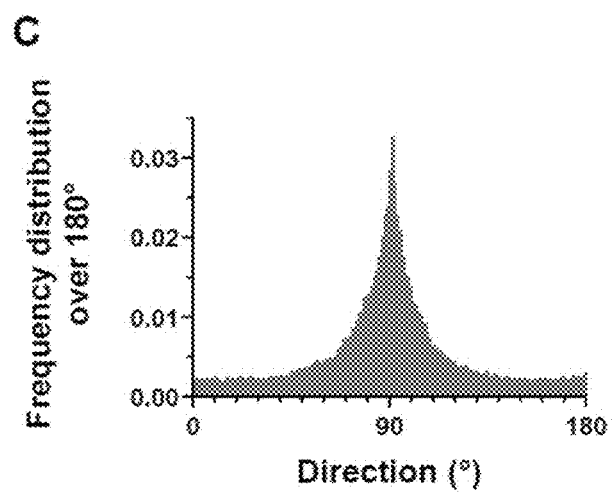
FIG. 40 is graph illustrating a directionality analysis of the cell-only component of the scaffold construct shown in FIG. 38.

This alignment is quantified and illustrated in FIGS. 39 and 40. In particular, FIG. 39 is a graph illustrating a directionality analysis of the fiber-only component of the scaffold construct shown in FIG. 38. Analysis of the fiber-only component shows a narrow frequency distribution, indicating highly parallel fiber with nearly all directional features within ±10° of the peak orientation.

FIG. 40 is a graph illustrating a directionality analysis of the cell-only component of the scaffold construct shown in FIG. 38. Analysis of the cell-only component shows a frequency distribution with a peak orientation essentially identical to the fiber direction with nearly all components within ±20° of the peak, indicating a significant degree of cell alignment parallel to the fiber. Implementing this analysis across printed implants with both hMSCs and MPCs, it was concluded that implants consistently show highly aligned parallel collagen fiber and significant cell elongation in the fiber direction with a high degree of directionality.

In addition, a uniform cellular distribution was achieved. The Applicant has developed methods to quantify the distribution of cells throughout scaffold constructs by adapting means for analyzing the distribution of particles within a field of view [Han 2014, Ober 2015]. These methods offer a quantitative means to validate AC-DC process control and repeatability for the uniform placement of cells throughout implants. The results shown herein are representative and illustrate the capabilities of the cell distribution analysis methods.

Figure 41:
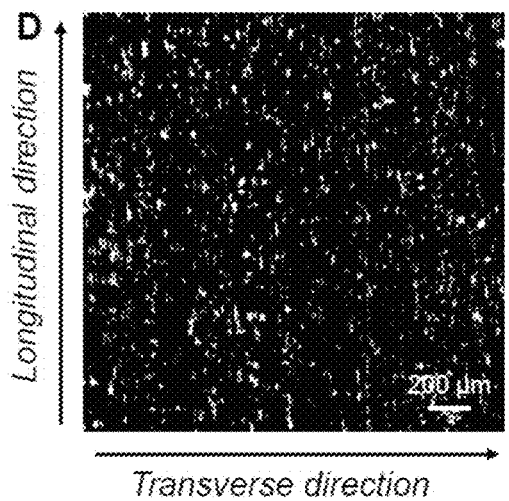
FIG. 41 is an image of the scaffold construct shown in FIG. 38 after processing for cell distribution analysis with cells shown in white.

FIG. 41 is an image of the scaffold construct shown in FIG. 38 after processing (e.g., fluorescent labeling of MPC cytoplasmic membranes) for cell distribution analysis with cells shown in white. It will be noted that the cells are relatively evenly distributed across and along the construct. This even distribution has been quantified and illustrated in FIGS. 42 and 43.

Figure 42:
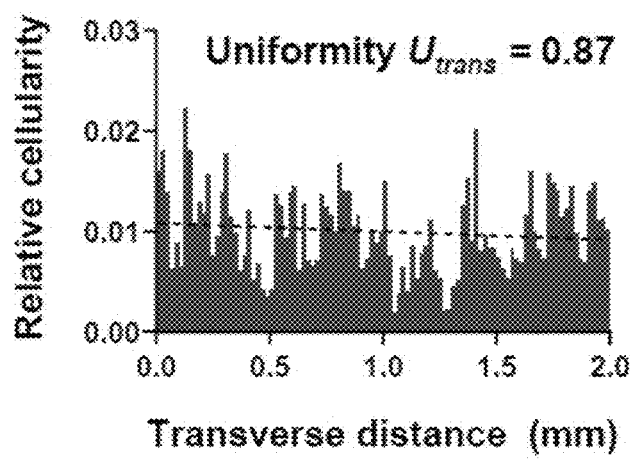
FIG. 42 is a graph illustrating the relative cellularity of the scaffold construct shown in FIG. 41 plotted along the transverse axis.
Figure 43:
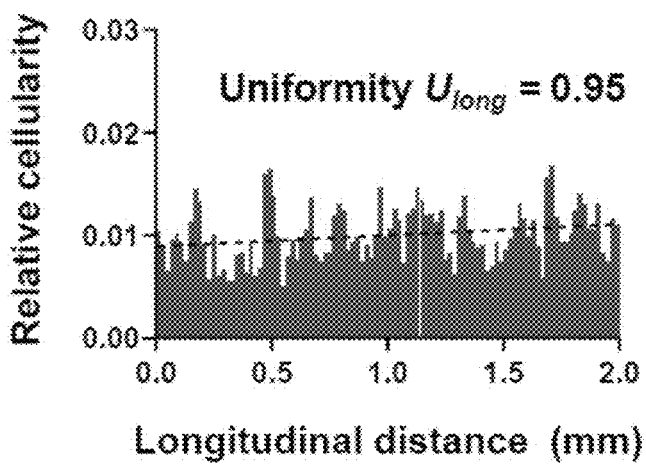
FIG. 43 is a graph illustrating the relative cellularity of the scaffold construct shown in FIG. 41 plotted along the longitudinal axis.

Images of printed implants with (e.g., the image shown in FIG. 41) were processed according to our protocols. The relative cellularity along the transverse and longitudinal directions of the image, determined by the number of white pixels indicating cellular material compared to black pixels indicating space devoid of cells, is calculated and plotted. FIG. 42 is a graph illustrating the relative cellularity of the scaffold construct shown in FIG. 41 along the transverse axis. FIG. 43 is a graph illustrating the relative cellularity of the scaffold construct shown in FIG. 41 along the longitudinal axis.

Plots of relative cellularity offer a means to easily visualize cell distribution throughout printed implants, with peaks, valleys, and skewness indicating variations in the number and placement of cells throughout a field of view. Linear regression analysis can further be used as a facile method to assess cellularity. For a perfectly uniform cell distribution with data analyzed in 100 bins, linear regression analysis will result in a horizontal line with a y-intercept of 0.01. Thus, the relative cellularity of each bin will be one-hundredth of the total number of cells. From a representative field of view of a printed AC-DC implant with MPCs, it is seen that linear regression results in a nearly horizontal line when measured across both the transverse and longitudinal directions (FIGS. 42 and 43), indicating an essentially uniform distribution of cells throughout the print. To contrast this.

As shown in FIGS. 42 and 43, the Applicant further implemented an additional method to quantify the distribution of cells with a uniformity measure U based on Shannon entropy [Han 1014, Ober 2015]. Briefly, the uniformity measure U ranges from 0 to 1, where a perfectly nonuniform distribution in which cells are present in exactly one half of a field of view scores a 0, and a perfectly uniform distribution in which cells are present exactly equally throughout scores a 1. As with calculating and plotting relative cellularity, uniformity was calculated across the transverse direction ($U_{trans}$ in FIG. 42), and the longitudinal direction ($U_{long}$ in FIG. 43) and was determined using the same imaging and image processing techniques. For example, for a representative AC-DC implant with MPCs, cell uniformity analysis yields $U_{trans}=0.87$, as shown in FIG. 42, and $U_{long}=0.95$, as shown in FIG. 43.

Scaffold constructs formed using the processes described herein exhibit mechanical properties that approximate or exceed those of human musculoskeletal tissues. As MPCs are difficult to isolate and culture, and MSCs are well characterized, well adapted to culture, and used widely among different labs, MSCs were used for seeding in biomechanical testing. The Applicant assessed the mechanical properties of AC-DC implants printed with and without hMSCs after 1 day and 28 days in static culture to evaluate the load-bearing capabilities, stability, and effects of cellular remodeling in vitro. A custom 2-pin mounting approach for tensile testing was found to provide significantly more consistent results when compared to mounting implants in standard compression grips, which often lead to implant damage, slippage, or staggered breakage of individual fibers within an implant.

Figure 44:
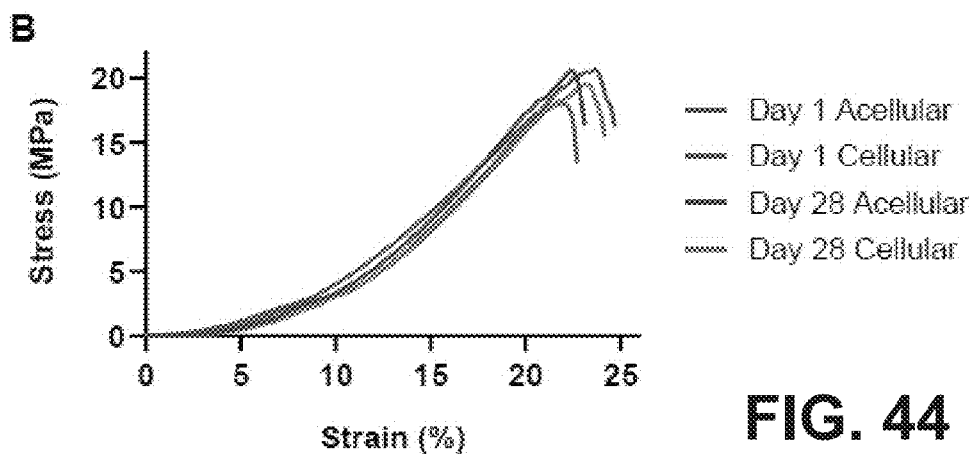
FIG. 44 is a graph illustrating stress-strain curves for acellular and cellular scaffold constructs.

FIG. 44 is a graph illustrating stress-strain curves for acellular and cellular scaffold constructs. As illustrated, the representative stress-strain curves for each tested group shown in FIG. 44 exhibit distinct "toe" regions of gradually increasing slope followed by linear regions of maximum slope and ultimately well-defined rapid decreases in stress indicating failure.

Figure 45:
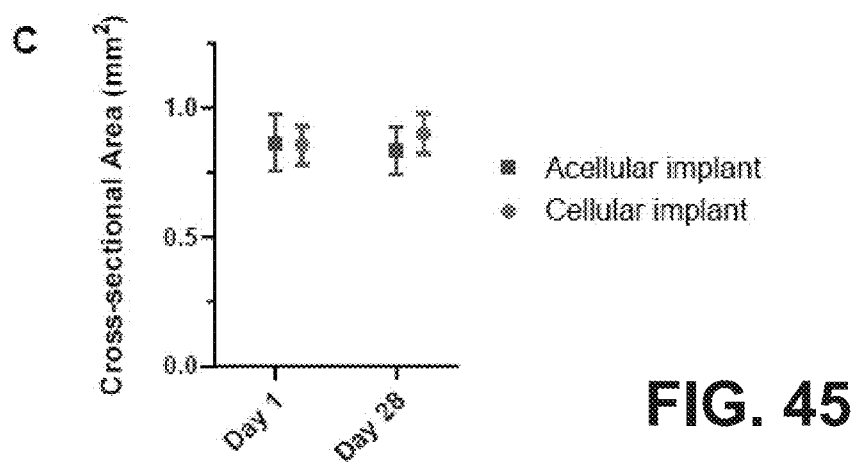
FIG. 45 is a graph illustrating measured cross-sectional areas of acelluar and cellular scaffold constructs.
Figure 46:
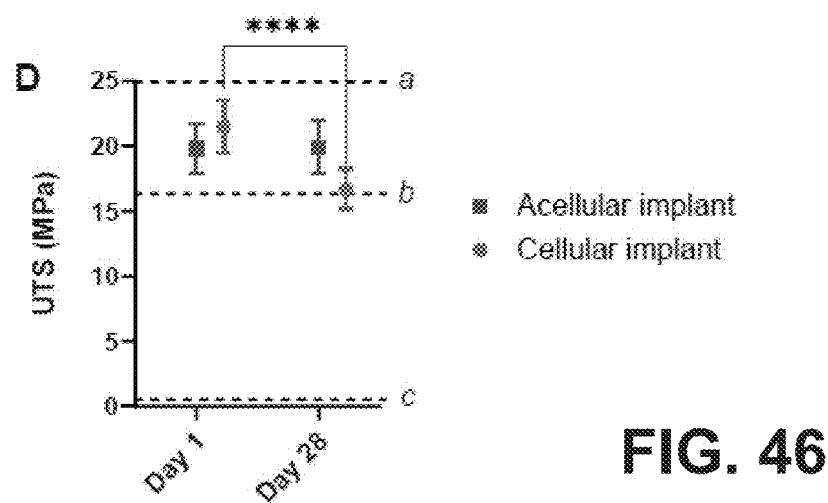
FIG. 46 is a graph illustrating the ultimate tensile stress (UTS) of acellular and cellular scaffold constructs.
Figure 47:
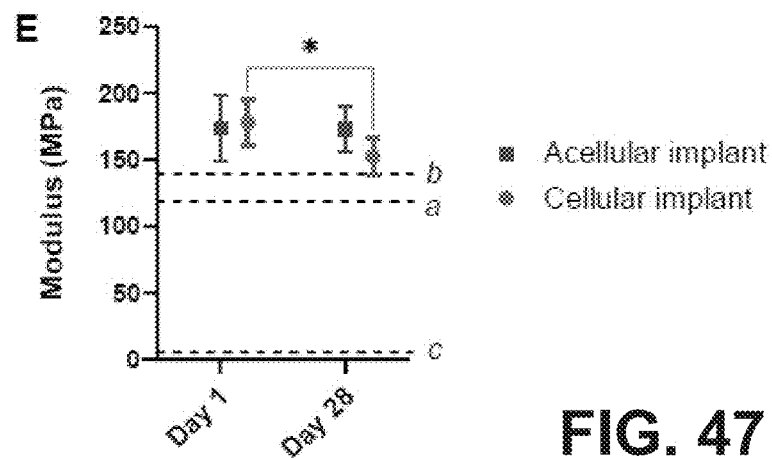
FIG. 47 is a graph illustrating the tangent modulus of acellular and cellular scaffold constructs.
Figure 48:
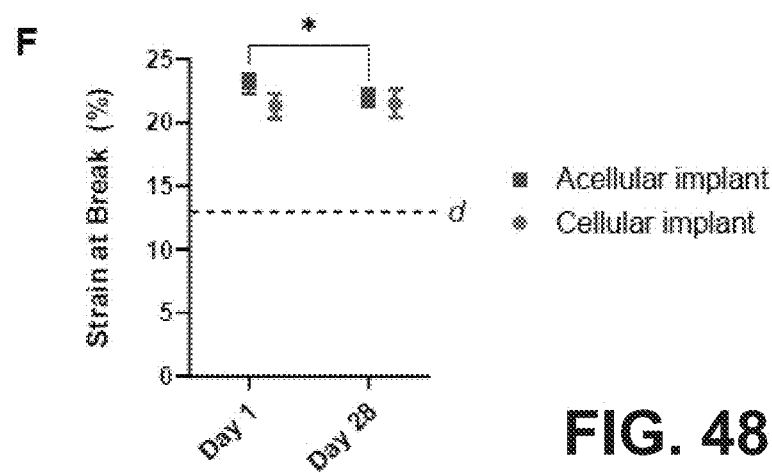
FIG. 48 is a graph illustrating the strain at break of acellular and cellular scaffold constructs.

The cross-sectional area (FIG. 45), ultimate tensile strength (UTS) (FIG. 46), tangent modulus (FIG. 47), and strain at break (FIG. 48) were measured as well. For plots displaying UTS (FIG. 46) and tangent modulus (FIG. 47), horizontal lines are plotted indicating the mean UTS and tensile modulus of human ACL (a) [Chandrashekar 2006], the strongest portion of the human supraspinatus tendon (b) [Itoi 1995], and typical collagen gels used in tissue engineering (c) [Achilli 2010]. As shown in FIGS. 46-48, acellular and cellular implants produced using AC-DC bioprinting nearly match or exceed key mechanical properties of representative native human tendons directly after printing and continue to do so after 28 days in culture.

Notably, the UTS and modulus of collagen microfiber implants are several orders of magnitude larger than the strength and stiffness of collagen gels commonplace in biomanufacturing approaches, which have a typical UTS around 20 kPa and tensile modulus around 200 kPa [Achilli 2010]. These values are characteristic of a collagen gel itself, irrespective of cell types included or the intended maturation of a 3D printed construct. Both acellular and cellular implants after 1 day and 28 days in culture underwent greater than 20% strain before failure (FIG. 48). Thus, AC-DC implants providing sufficient elasticity to withstand typical strain values in vivo, such as the peak strain of 13.2% of the ACL during normal walking [Taylor 2013]. While muscle biomechanical testing is very difficult to accurately assess due to its anisotropic, viscoelastic, hyperelastic, and highly nonlinear elastic behaviors, and thus largely understudied in the field, generally, the tensile properties of AC-DC implants greatly exceeded those of muscle, which can have as low as 0.44 Mpa of UTS, around 2.0 Mpa of modulus, and strain at break exceeding 40% along the direction of the fibers.

Treatment of Volumetric Muscle Loss

Musculoskeletal tissue injuries, including volumetric muscle loss (VML), are commonplace and often lead to permanent disability and deformation. One aspect of the present invention relates to the preparation and use of cellularized collagen microfiber implants to facilitate functional repair and regeneration of such musculoskeletal soft tissues. Clinically relevant cells were positioned controllably along clinically relevant, high strength collagen fibers to biomanufacture musculoskeletal tissue analogs for restoring form and function to injured tissues.

Human mesenchymal stem cells (hMSCs) or rat muscle progenitor cells (MPCs) are bioprinted to create an engineered implant that may be valuable for a diverse array of indications including, tendon or muscle regeneration. Mesenchymal stem cells offer excellent potential for augmenting musculoskeletal tissue repair and regeneration due to their immune-evasive properties [Ankrum 2014, Zhang 2015], therapeutic effects [Zhang 2015, Jang 2015, Lee 2017], multilineage differentiation potential [Pittenger 1999], and availability as a commercial clinically relevant cell type. Similarly, MPCs have shown marked therapeutic effects in facilitating functional recovery in volumetric muscle loss injuries in validated animal models [Mintz (2020), Passipieri (2019)].

The present invention is based in part on the discovery that glyoxal crosslinked collagen fibers with high tensile strength can be used as a filament for bioprinting and can recreate the structural, cellular, and mechanical likeness of native tissue in an automated, scalable fabrication process, which was previously an ambitious and unrealized challenge [Murphy (2014, Murphy 2020)].

Results using implants produced using the Assembled Cell-Decorated Collagen ("AC-DC") bioprinting process showed that the directionality and distribution of cells throughout implants mimic the cellular properties of native musculoskeletal tissue. Bioprinted implants according to the invention approximate and can be adusted to exceed the strength and stiffness of human musculoskeletal tissue. Moreover, they exceeded the properties of commonplace collagen hydrogels by orders of magnitude.

The regenerative potential of such implants was also assessed in vivo in a rodent VML model. A critically sized muscle injury in the hindlimb was created and repaired, and limb torque generation potential was measured over 12 weeks. Both acellular and cellular implants were found to promote functional recovery compared to the unrepaired group, with AC-DC implants containing therapeutic muscle progenitor cells promoting the highest degree of recovery.

Histological analysis and automated image processing of explanted muscle cross-sections revealed increased total muscle fiber count, median muscle fiber size, and increased cellularization for injuries repaired with cellularized implants. These studies introduce the tremendous potential of an advanced bioprinting method for generating tissue analogs with near native biological and biomechanical properties with the potential to repair numerous challenging musculoskeletal injuries.

Example: Functional Recovery in a VML Model

In vivo skeletal muscle repair studies were conducted over 12 weeks in a validated rodent VML model. Details of these studies are available at K. W. Christensen, J. Turner, K. Coughenour, Y. Maghdouri-White, A. A. Bulysheva, O. Sergeant, M. Rariden, A. Randazzo, A. J. Sheean, G. J. Christ, M. P. Francis, "Assembled Cell-Decorated Collagen (AC-DC) bioprinted implants mimic musculoskeletal tissue properties and promote functional recovery," published Jul. 2, 2021, and available pre-print via bioRxiv at: https://doi.org/10.1101/2021.06.22.449431. The entire disclosure of this publication is incorporated herein by reference.

Figure 49B:
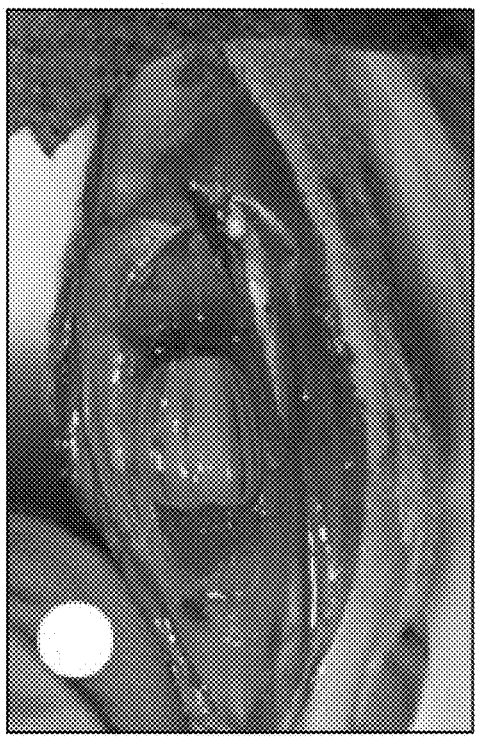
FIG. 49B is an image showing initial placement of an implant in the VML injury created in the rodent.
Figure 49D:
FIG. 49D is an image showing the injury site with a tissue flap ("fascia") sutured over the implant as placed in FIGS. 49B and 49C.
Figure 49A:
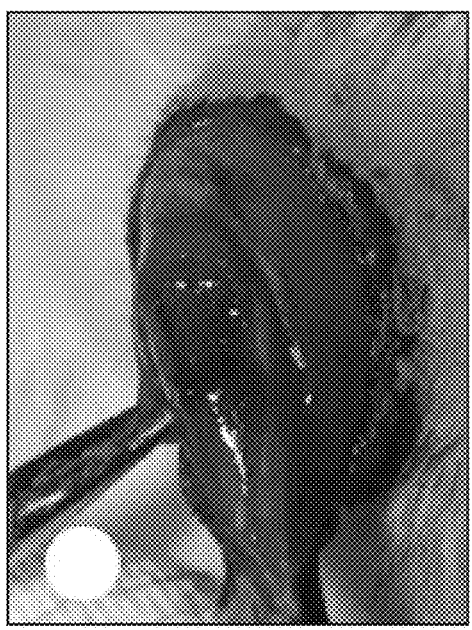
FIG. 49A is an image showing the creation of a volumetric muscle loss (VML) injury in a rodent test specimen.
Figure 49C:
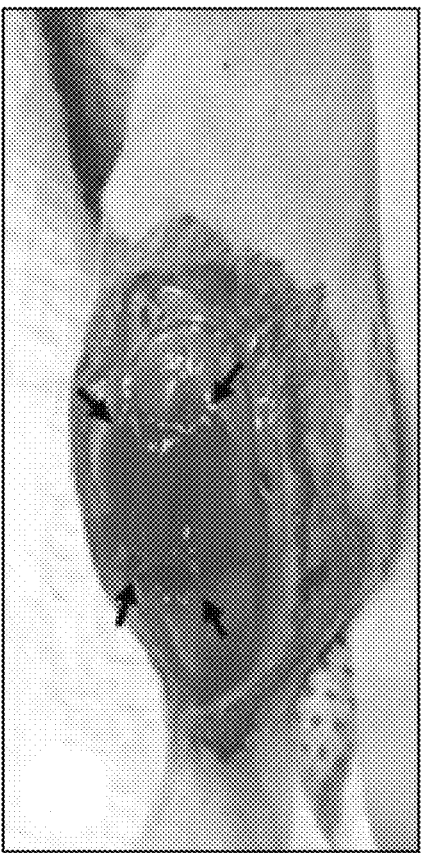
FIG. 49C is an image showing corner attachment points at which the implant is secured to the native tissue of the rodent.
Figure 49E:
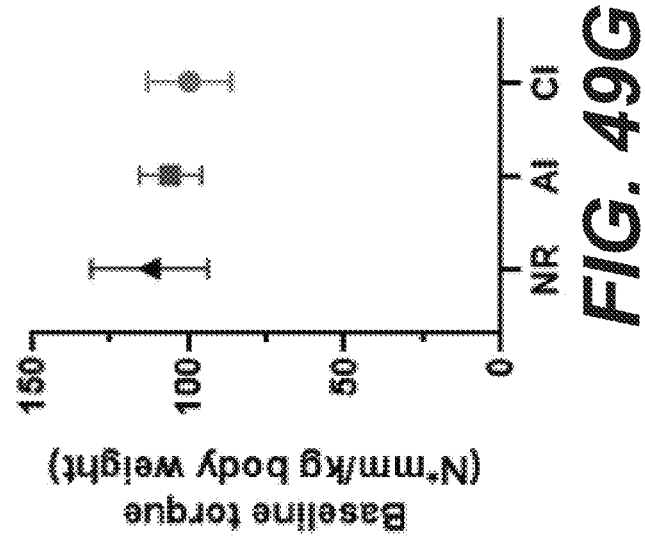
FIG. 49E is a graph illustrating the body weight of the animals during the weeks following the implantation of the implant as shown in FIGS. 49B-D.

At least 20% of overall muscle weight was removed from the tibialis anterior (TA) muscle of the lower left hindlimbs of Lewis rats [Mintz (2020), Corona (2014)]. Three methods of repair were assessed head-to-head: a control group receiving no repair, an acellular implant group receiving repair with AC-DC implants with no cellular component, and a cellular implant group receiving repair with AC-DC implants printed with rodent MPCs. Defect creation, initial placement of an implant, suture placement for implant attachment, and fascia replacement are shown in FIG. 49A-D, respectively. Specifically, FIG. 49A shows creation of a VML injury measuring approximately 1 cm×0.7 cm×0.5 cm and weighing at a minimum 20% of the overall TA weight. FIG. 49B shows an acellular AC-DC implant inserted into the injury site, which, in FIG. 49C is sutured into the injury site with arrows indicating attachment points. FIG. 49D shows fascia sutured overtop of the injury site to secure the implant in place further.

Figure 49F:
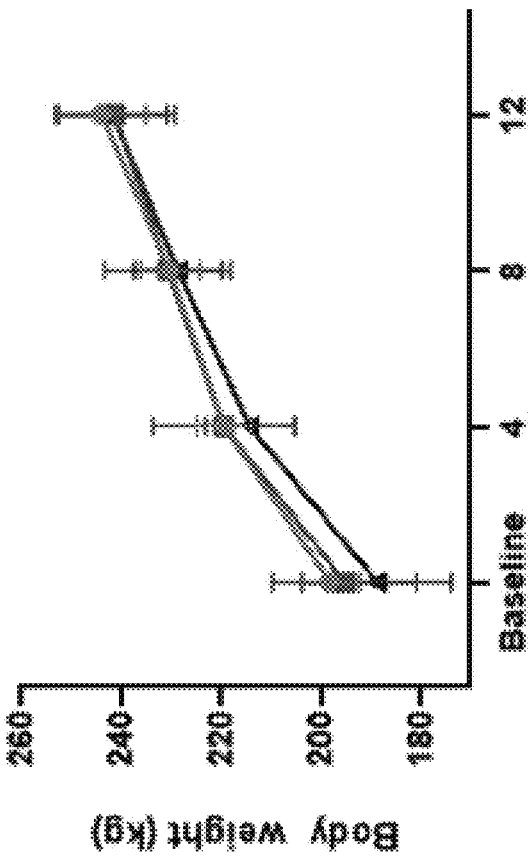
FIG. 49F is a graph illustrating the weight of the defects (i.e., how much tissue was removed) for each animal at the time of surgery.

All animals recovered post-surgery, and there were no signs of infection and no deaths. Across experimental groups, animal body weight increased similarly over the 12-week period (FIG. 49E), which shows animal weight pre-injury and at 4, 8, and 12-weeks postinjury, corresponding to functional testing timepoints. Measured defect weight at the time of surgery was not statistically different, as shown in FIG. 49F, which presents the weight of defects created for "no repair," "acellular implant," and "cellular implant" (NR, AI, and CI, respectively) experimental groups (p=0.8, no significant difference). In FIGS. 49E to I, all data is based on n=7 per group per time point (*p<0.05 indicates significance).

Figure 49G:
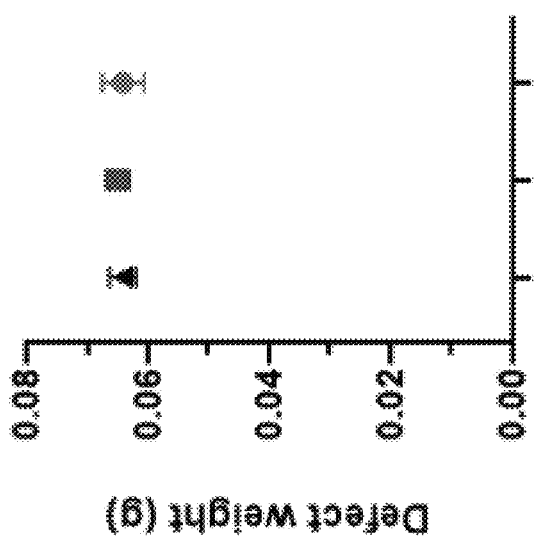
FIG. 49G is a graph illustrating the baseline torque generated by each animal prior to defect creation.

Functional testing was performed in vivo before defect creation and at 4, 8, and 12-weeks post-repair to assess muscle recovery post-operatively. Briefly, rat hind limbs were attached to a motorized footplate and stimulated electrically to measure maximum isometric torque generation [Mintz (2020), Passipieri (2019), Corona (2014)]. Mean values are expressed as torque normalized to animal body weight at each time point (N-mm/kg of body weight) to control for increases in torque production due to animal growth. Baseline torque generation capability before defect creation did not vary statistically between treatment groups, as shown in FIG. 49G (p=0.9, no significant difference. Torque generation post-repair is expressed as raw torque (FIG. 49H) and percent of baseline torque generation is shown in FIG. 49I. Measured torque and percent of baseline torque is shown at 4, 8, and 12 weeks post-repair. These figures indicate that functional recovery is facilitated by implant implantation. Both methods show similar trends with only slight variations in statistical significance.

Most notably, significant improvements in torque generating capability were observed over 12 weeks for injuries repaired with cellularized implants containing therapeutic MPCs. At 4 weeks, raw torque generation was significantly lower in the acellular and cellular implant groups than no repair, and the percent of baseline torque was significantly lower in the cellular implant group. This initial decrease in torque generation capabilities is believed to be due to the early wound healing processes, or possibly related to the initial tensile properties of the implant. However, by 8 weeks post-repair, there was no difference observed between the treatment groups.

At 12-weeks post-repair, in contrast to findings at 4 weeks, raw torque generation was found to be significantly higher in the cellular implant group compared to the no repair group, and the percent of baseline torque was significantly higher in both the acellular and cellular implant groups, revealing key trends in the functional recovery of a VML injury among treatment groups. In addition, significant deterioration of function was found over 12 weeks for animals receiving no repair. In contrast, torque generation remained largely consistent for animals repaired with acellular implants, indicating that the presence of the collagen fiber implant without cells attenuated the functional deterioration associated with no repair.

Notably, the ablation of synergistic muscles during defect creation removes ~20% of torque generation in the anterior compartment [Mintz (2020)]. As such, normalized torque would be limited to ~85 N-mm/kg across the treatment groups (106 N-mm/kg average at baseline). The mean functional recovery of the cellularized implant group at 12 weeks was 76% of the maximum theoretical recovery following synergist ablation compared to 67% in the acellular group and 57% in the no repair group. In addition, three of the seven animals receiving repair with cellular implants were observed to have a functional recovery of greater than 87%, with one animal recovering to near-maximal theoretical recovery compared to preinjury levels (99%).

Following assessment of functional recovery in vivo at 12-weeks, isolated TA muscles were collected for morphological and histological examination. The gross morphology of those repaired by acellular and cellular AC-DC implants appeared more similar to control muscles than did the no repair group, which exhibited convex indentations at the injury location. More fascia was also noted in the repair groups. The distinction between implants and surrounding tissue was not obvious, indicating tissue ingrowth around or resorption of the collagen fiber implants. Isolated muscles were cross-sectioned through the belly and processed for H&E staining, with representative images for each experimental group shown in FIGS. 50A-D.

In FIG. 50A-D, representative H&E images of the tibialis anterior (TA) muscle are shown for (A) uninjured control, (B) no repair, (C) acellular implant, and (D) cellular implant experimental groups after 12 weeks. A black dashed line indicates the approximate area of defect creation. Green dashed ovals identify AC-DC implant locations.

In FIG. 50E-F, magnified views of (E) acellular implant and (F) cellular implant locations with magnified windowed views showing cellular ingrowth and muscle fiber formation in the cellular implant location (yellow dashed oval). All scale bars in FIG. 50 are 1 mm unless otherwise noted.

Figure 50A:
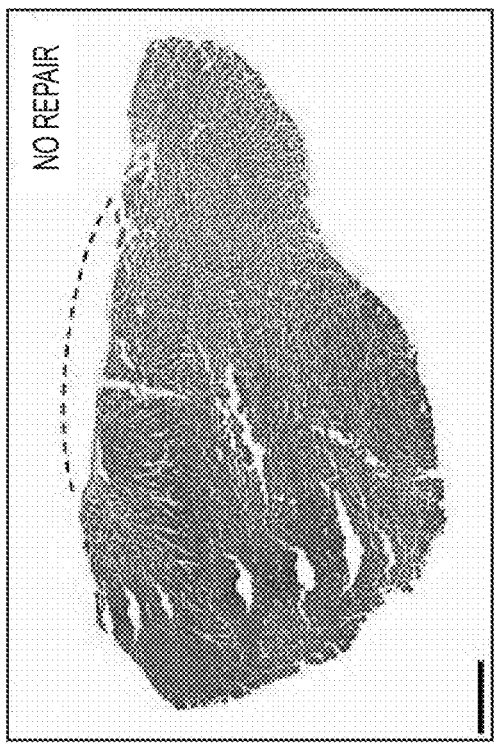
FIG. 50A is an H&E photomicrograph showing a histological assessment of the tibialis anterior (TA) muscle of a control rodent with no injury.
Figure 50B:
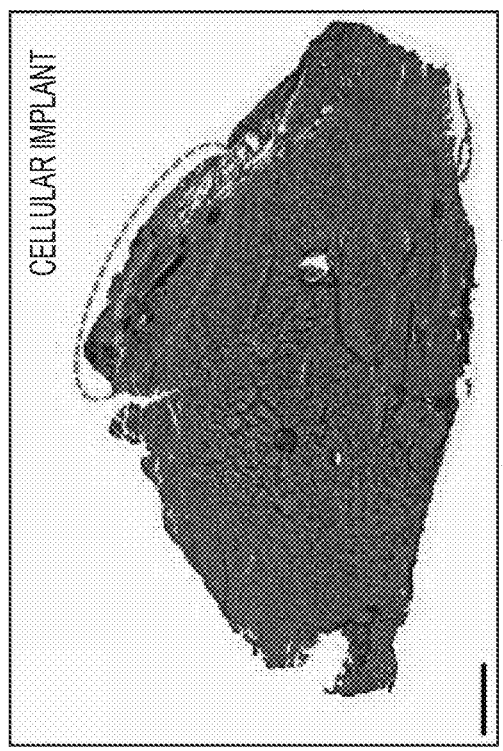
FIG. 50B is an H&E photomicrograph showing a histological assessment of the tibialis anterior (TA) muscle of a rodent with a VML injury to which no repair was made.
Figure 50C:
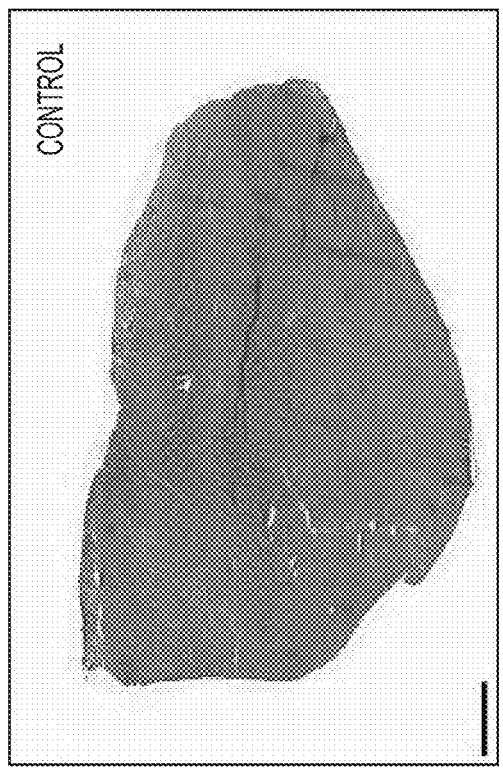
FIG. 50C is an H&E photomicrograph showing a histological assessment of the tibialis anterior (TA) muscle of a rodent with a VML injury which has been repaired with an acellular implant.
Figure 50D:
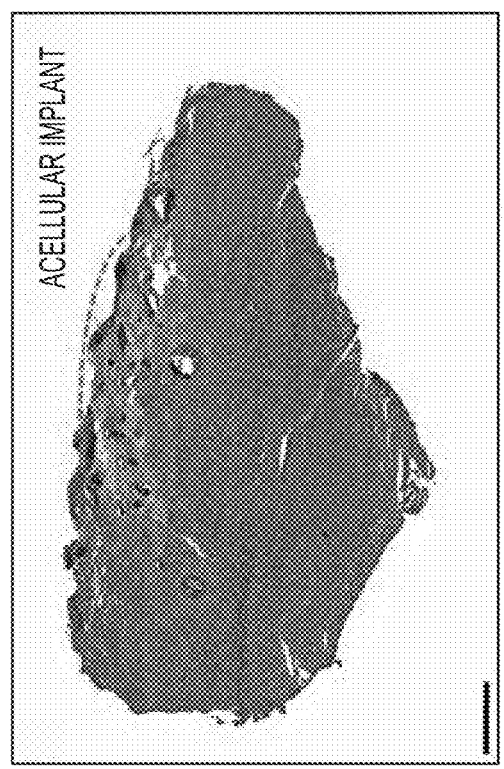
FIG. 50D is an H&E photomicrograph showing a histological assessment of the tibialis anterior (TA) muscle of a rodent with a VML injury which has been repaired with a cellular implant.

As with gross examination, the unrepaired group exhibited distinct depressions at the injury site indicating a lack of tissue regeneration (FIG. 50B). Animals repaired with acellular and cellular implants, in contrast, exhibited more fullness to the tissue and uniform cross-sections similar to uninjured controls and thus improved cosmesis. Collagen fiber remaining from implants is visible within the injury sites as deep pink somewhat-circular cross-sections on the order of 100 μm diameter. Cellular ingrowth is visible in and around the implants (FIGS. 50E and 50F). Fiber cross-sections are more apparent in the acellular implant group than the cellular implant group, possibly indicating an increased rate of fiber resorption for cellularized implants. For injuries repaired with cellular AC-DC implants, the presence of new muscle fibers at the implant site was noted (FIG. 50F).

Figure 51:
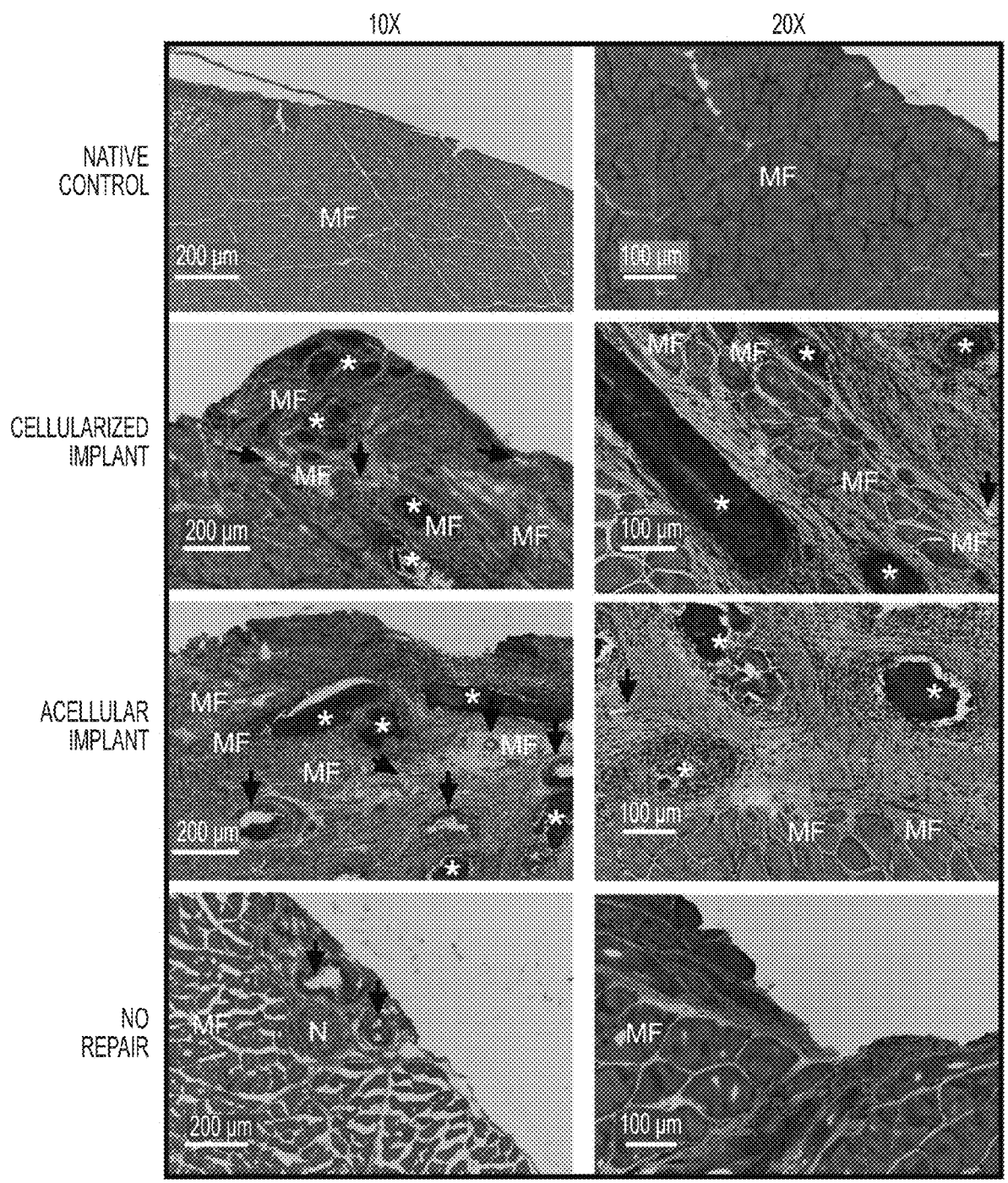
FIG. 51 is a collection of H&E photomicrographs showing prominent new muscle fibers (labeled with "MF") growing within the scaffold construct implants as demarcated by the implant collagen fibers (labeled with "*")
Figure 52:
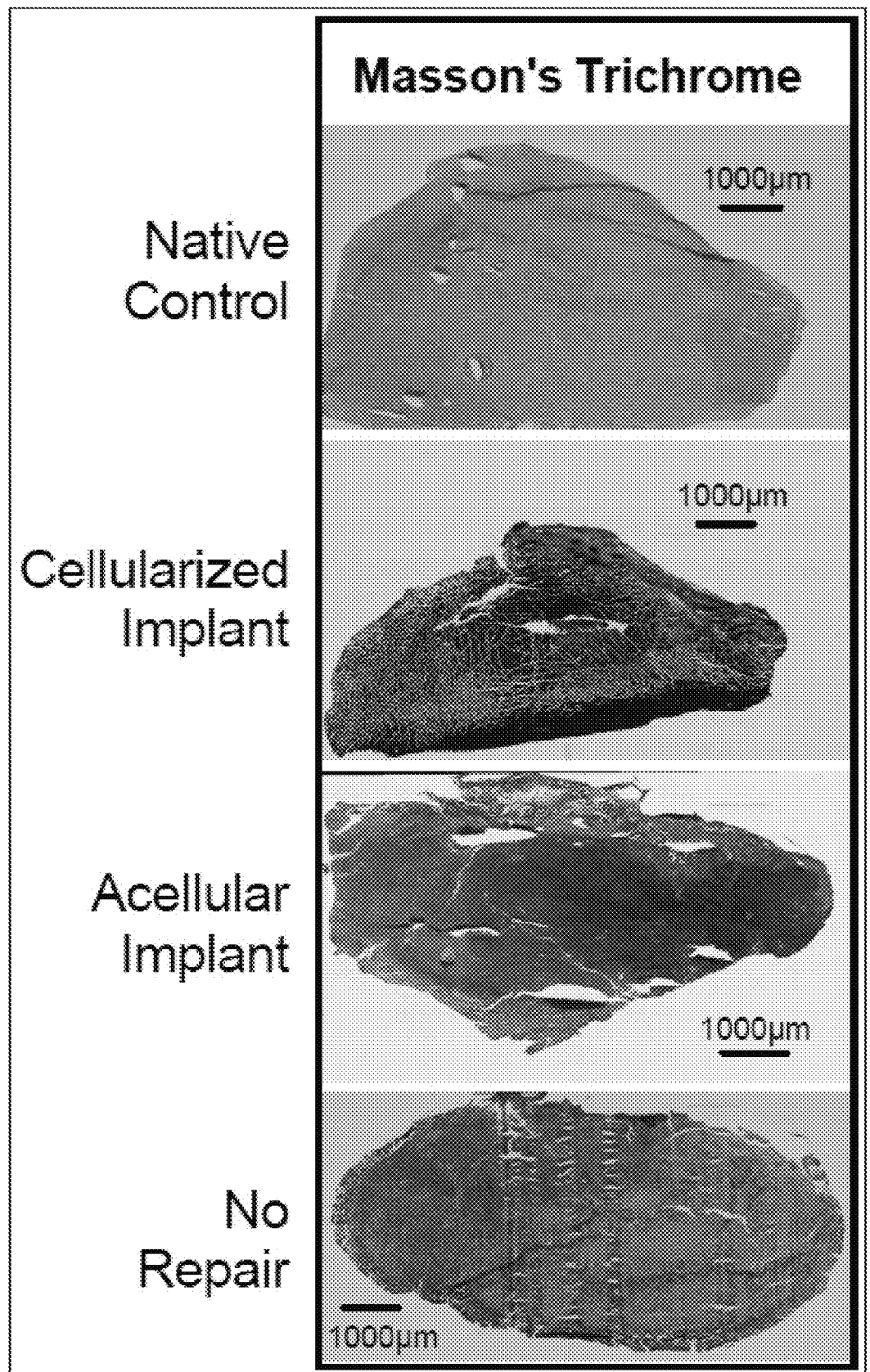
FIG. 52 is a collection of Masson's Trichrome photomicrographs showing the presence of collagen within and around the implant region and defect area from each identified group.

Higher magnification images from the H&E section further revealed the new muscle fibers and angiogenesis within the implant region FIG. 51 along with new collagen deposition as qualitatively indicated by Masson's Trichrome staining around the implant region in FIG. 52. In FIG. 51, prominent new muscle fibers are labeled with "MF" and were found growing within the AC-DC implants as demarcated by the implant collagen fibers (labeled with "*"). Nearby blood vessels are also noted prominently in the implant region and are called out with a black arrow. Nerve bundles are noted with "N." In FIG. 52, a section from each group show the presence of collagen within and around the implant region and defect area.

Figure 53B:
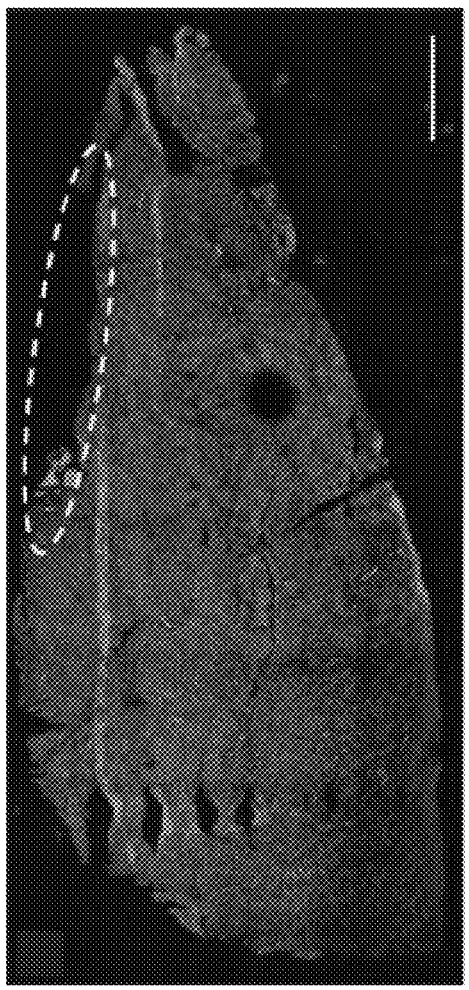
FIG. 53B is photomicrograph of a TA muscle belly processed for analysis using SMASH showing a specimen with VML injury with no repair.
Figure 53D:
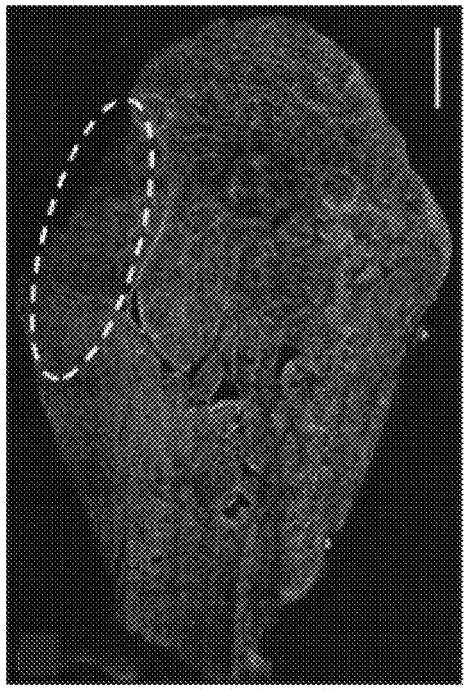
FIG. 53D is photomicrograph of a TA muscle belly processed for analysis using SMASH showing a specimen with VML injury that has been repaired with a cellular implant.
Figure 53A:
FIG. 53A is photomicrograph of a TA muscle belly processed for analysis using SMASH (a semi-automated muscle fiber analysis software) showing an uninjured control.
Figure 53C:
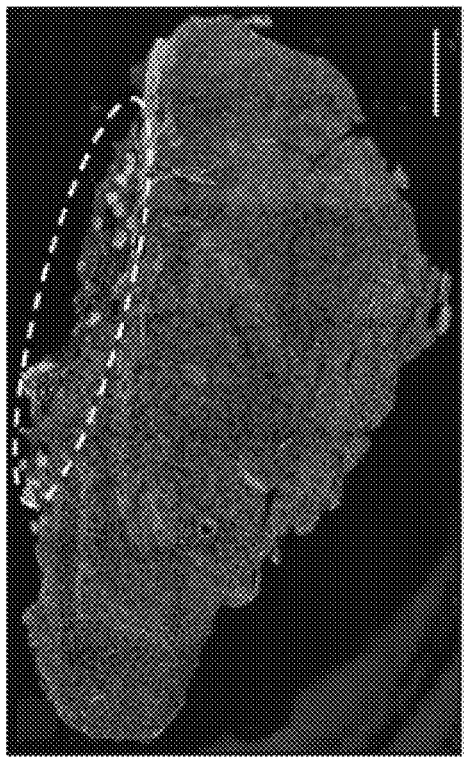
FIG. 53C is photomicrograph of a TA muscle belly processed for analysis using SMASH showing a specimen with VML injury that has been repaired with an acellular implant.
Figure 53F:
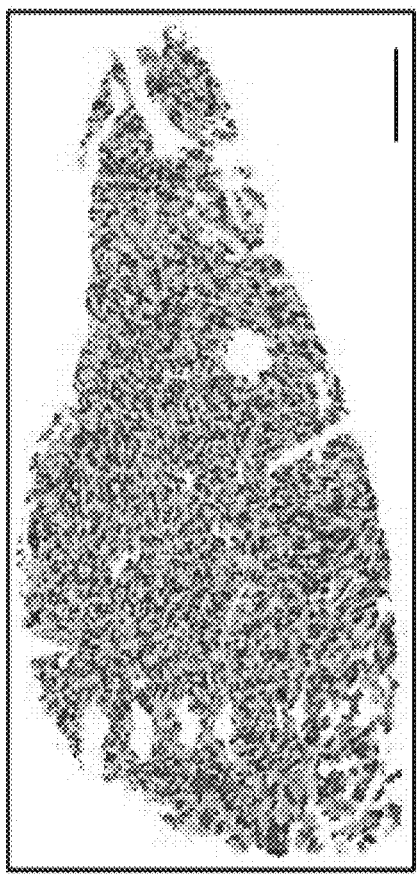
FIG. 53F is a colorized output from the SMASH software identifying individual muscle fibers within sections corresponding to FIG. 53B.
Figure 53H:
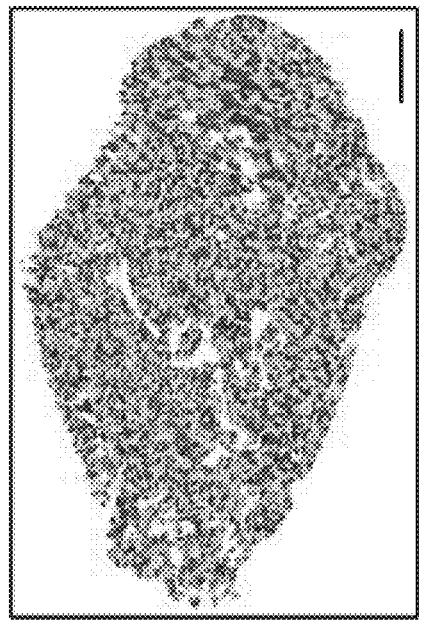
FIG. 53H is a colorized output from the SMASH software identifying individual muscle fibers within sections corresponding to FIG. 53D.
Figure 53E:
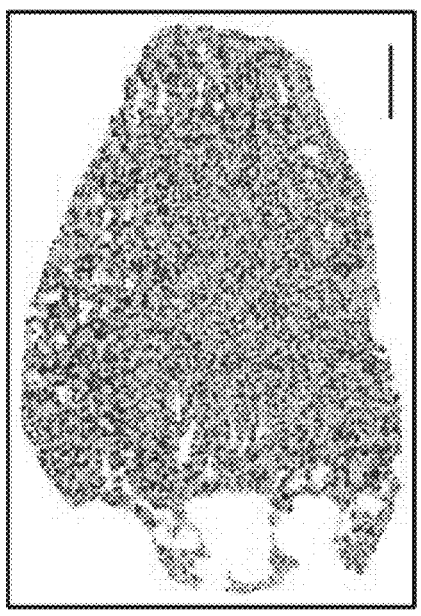
FIG. 53E is a colorized output from the SMASH software identifying individual muscle fibers within sections corresponding to FIG. 53A.
Figure 53G:
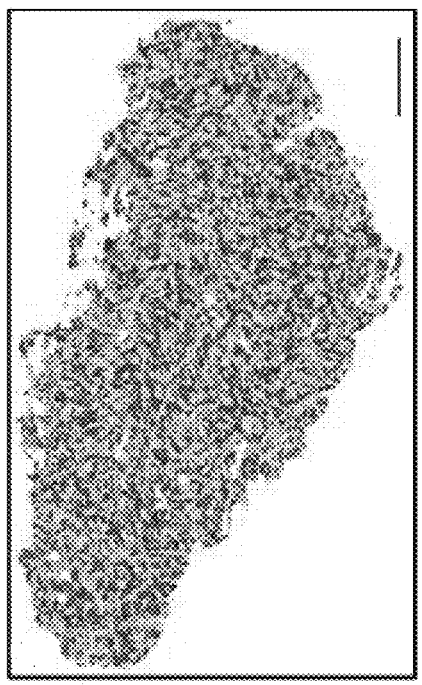
FIG. 53G is a colorized output from the SMASH software identifying individual muscle fibers within sections corresponding to FIG. 53C.

Additional sections from the TA muscle belly were processed for analysis using SMASH, a semi-automated muscle fiber analysis software as shown in FIGS. 53A-K. In FIGS. 53A-D, representative laminin-stained sections of the TA muscle are shown for for (A) uninjured control, (B) no repair, (C) acellular implant, and (D) cellular implant experimental groups with dashed ovals indicating the approximate region of injury. In FIGS. 53E-H, colorized outputs from the software identifying individual muscle fibers within sections corresponding to (FIGS. 53A-D), respectively. FIG. 53I shows total fiber count, FIG. 53J shows median fiber cross-sectional area (FCSA), and FIG. 53K shows the product of fiber count and FCSA for uninured control (Ctrl), no repair (NR), acellular implant (AI), and cellular implant (CI) experimental groups. All scale bars in FIG. 53 are 1 mm. The data presented are based on n=7 per group per time point, and *p<0.05 indicates significance.

Referring to FIG. 53, laminin and fluorophore 488 staining identify the outline of muscle fibers throughout sections (FIGS. 53A-D) and SMASH analysis allows for individual fiber distinction, as seen with colorization applied (FIG. 53E-H). Analysis of the total number of fibers yields no significant difference between the uninjured control, no repair, acellular implant, and cellular implant groups (FIG. 53I). However, the median fiber cross-sectional area (FCSA) in muscle sections repaired with acellular and cellular AC-DC implants was significantly larger than that of the no repair group and did not differ significantly from the uninjured control (FIG. 53J). The cellularized implant and control groups show the greatest difference from the no repair group, with p values of 0.0007 and 0.0002, respectively.

Multiplying the total number of fibers by the median fiber cross-sectional area offers a representation of the total muscle fiber cross-sectional area (FIG. 53K). Again, this product shows no significant difference between uninjured controls and injuries repaired with acellular and cellular implants after 12 weeks in life, supporting that AC-DC implants facilitated an increase in total muscle fiber area.

To summarize, a method of treating volumetric muscle loss (VML) may include affixing, within a VML wound site, a scaffold construct formed of a plurality of collagen microfibers arranged in an organized sheet-like configuration and coated with a biocompatible solution. In some cases, affixing the scaffold construct within the VML wound site may include suturing two or more portions of the scaffold construct to muscle tissue within the VML wound site. For example, four corners of the scaffold construct may be sutured within the wound site. In addition, in some cases, the method may further include replacing the fascia over the scaffold construct after affixing the scaffold construct within the VML wound site.

It will also be noted that, in some cases, the scaffold construct implanted within a given VML wound site may include multiple sheet-like layers of the collagen microfibers. The number of layers utilized may vary depending on the depth of the wound site. Similarly, the overall size of the scaffold construct used may vary depending on the size of the wound site.

In some cases, the biocompatible solution with which the collagen microfibers is coated may be hyaluronic acid. In some cases, the biocompatible solution may be a cell suspension. In such cases, the cell suspension may include muscle progenitor cells (MPC's). The cell suspension may include approximately 4,000,000 cells/mL. Other concentrations could alternatively be used to form the scaffold construct.

The scaffold construct implanted to treat VML may have mechanical properties substantially approximating or exceeding those of human tendon. Notably, the scaffold construct may have a mean ultimate tensile strength (UTS), tensile modulus, and strain at break that substantially approximate or exceed those of human tendon.

Preferred Biocompatible Scaffold Constructs:

Preferred embodiments of the scaffold constructs according to the invention will have a length dimension and a width dimension independently ranging from about 1 mm to 10 mm, depending on the size and shape of the damaged area for which a repair is intended. Preferably, the length and width of a scaffold construct to be used for VML will independently be about 2 cm to 9 cm, 3 cm to 8 cm or 4 cm to 7 cm. Alternative embodiments may be standardized in a 4 cm (width) by 10 cm (length) construct, more preferably 6 cm by 10 cm, 8 cm by 10 cm and 10 cm by 10 cm.

The thickness of a scaffold construct according to the invention may be limited by the ability of the recipient host's surrounding tissue to vascularize the implant such that the cells adhered to the construct remain viable. Accordingly, preferred scaffold constructs will be about 0.5 mm, 1 mm, 1.5 mm, 2 mm, 2.5 mm, 3 mm, 3.5 mm, 4 mm, 4.5 mm, and 5 mm in depth (thickness). In preferred constructs, the implant is produced by forming about 2 to 8 layers of dispensed and coated fiber, which reflects about 2 to 4 passes of the printhead along the frame, because each pass wraps 360 degrees around the frame and forms 2 layers.

For purposes of implantation, multiple scaffold constructs may be used by a surgeon in the repair of VML. These constructs may be stacked or arranged sequentially along an area for which repair is intended.

The printhead may be configured to produce scaffold constructs in which the spacing between fibers may be adjusted as discussed above. For example, the spacing between fibers preferably will range on average from about 0 (that is, the fibers are directly adjacent) to about 1 mm. In preferred embodiments, the average spacing between fibers will be about 100, 200, 300, 400, 500, 600, 700, 800, 900 and 1,000 microns.

The preparations of cell suspensions according to the invention will be sufficiently dense to effectively coat the dispensed fibers of a scaffold construct. Preferred cell densities range from about 0 to about 10 million cells/mL, as discussed above. Preferred cell suspension densities will be about 100,000, 200,000, 400,000, 600,000, 800,000, 1 million, 1.5 million, 2 million, 3 million, 4 million, 5 million, 6 million, 7 million, 8 million, 9 million and 10 million cells/mL. Preferably, about 0.1 to 10 microliters of cells suspension are extruded per millimeter of drawn fiber for preferred embodiments.

For the cells populations that are adhered to the scaffold constructs, preferred numbers of cells on the construct will range from about 100,000 to about 1 million cells per implant or more than 1 million cells per implant. Preferred ranges are about 200,000 to 900,000, 300,000 to 800,000, 400,000 to 700,000 and 500,000 to 600,000 cells per implant.

Preferred hydrogels, as described above, should stabilize rapidly, with solidification beginning within seconds of contact with a crosslinking solution.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. The features, parameters, properties, and metrics associated with the various embodiments discussed above, apply to other embodiments disclosed herein, unless expressly indicated to the contrary or otherwise impractical. Accordingly, the embodiments are not to be restricted except in light of the attached claims and their equivalents. Also, various modifications and changes may be made within the scope of the attached claims.

REFERENCES

Abrahamsson (2010) "Chondrogenesis and mineralization during in vitro culture of human mesenchymal stem cells on three-dimensional woven scaffolds"
Ghorbanian (2014) "Microfluidic direct writer for cell-laden hydrogel constructs"
Kaiser (2019) "Digital design and automated fabrication of bespoke collagen microfiber scaffolds"
Liberski (2011) "Organ weaving—woven threads and sheets as a step towards artificial organ development"
Mandrycky (2016) "3D bioprinting for engineering complex tissues Mauck (2009) Mechanics of nanofibrous assemblies for fiber-reinforced tissue regeneration"
Merceron (2015) "3D bioprinted complex structure for engineering muscle-tendon unit"
O'Keefe (2019) "American society for bone and mineral research report on cell-based therapies"
Onoe (2011) "Living cell fabric"
Sahoo (2007) "Hybrid polymer scaffolds for potential ligament and tendon tissue engineering"
Sugimoto (2011) "Implantable hydrogel microfiber encapsulating pancreatic cells for diabetes treatment"
Tamayol (2013) "Fiber-based tissue engineering progress, challenges, and opportunities"
Walters (2012) "Design and analysis of braid-twist collagen scaffolds"
Wu (2015) "Direct E-jet printing of 3D fibrous scaffold for tendon tissue engineering"
Mintz (2020) "Long-Term Evaluation of Functional Outcomes Following Rat Volumetric Muscle Loss Injury and Repair"
Murphy (2014) "3D bioprinting of tissues and organs"
Murphy (2020) "Opportunities and challenges of translational 3D bioprinting"
Itoi (1995) "Tensile properties of the supraspinatus tendon"
Ankrum (2014) "Mesenchymal stem cells: immune evasive, not immune privileged"
Zhang (2015) "The challenges and promises of allogeneic mesenchymal stem cells for use as a cell-based therapy"
Jang (2015) "Efficacy and Safety of Human Umbilical Cord Blood-Derived Mesenchymal Stem Cells in Anterior Cruciate Ligament Reconstruction of a Rabbit Model: New Strategy to Enhance Tendon Graft Healing"
Lee (2017) "Therapeutic Mechanisms of Human Adipose-Derived Mesenchymal Stem Cells in a Rat Tendon Injury Model"
Pittenger (1999) "Multilineage Potential of Adult Human Mesenchymal Stem Cells"
Passipieri (2019) "In Silico and In Vivo Studies Detect Functional Repair Mechanisms in a Volumetric Muscle Loss Injury"
Foolen (2018) "Tissue alignment enhances remodeling potential of tendon-derived cells—Lessons from a novel microtissue model of tendon scarring"
Wang (2003) "Cell orientation determines the alignment of cell-produced collagenous matrix"
Han (2014) "Lagrangian analysis of consecutive images: Quantification of mixing processes in drops moving in a microchannel"
Ober (2015) "Active mixing of complex fluids at the microscale"
Chandrashekar (2006) "Sex-based differences in the tensile properties of the human anterior cruciate ligament"
Achilli (2010) "Tailoring Mechanical Properties of Collagen-Based Scaffolds for Vascular Tissue Engineering: The Effects of pH, Temperature and Ionic Strength on Gelation"
Taylor (2013) "In vivo measurement of ACL length and relative strain during walking"
Corona (2014) "Implantation of In Vitro Tissue Engineered Muscle Repair Constructs and Bladder Acellular Matrices Partially Restore In Vivo Skeletal Muscle Function in a Rat Model of Volumetric Muscle Loss Injury"

What is claimed is:

1. A scaffold construct, comprising:
a plurality of substantially aligned collagen microfibers arranged in multiple layers, wherein the collagen microfibers are spaced on average between about 100 to about 1000 microns with respect to each other;
wherein a first portion of the collagen microfibers is coated by a first biocompatible solution comprising cells suspended in hyaluronic acid solution and a second portion of the collagen microfibers is coated by a second biocompatible solution different from the first biocompatible solution; and
wherein the first portion is disposed in a first longitudinal portion of the scaffold and the second portion is discretely disposed in a second longitudinal portion of the scaffold different from the first longitudinal portion.

2. A scaffold construct, comprising:
a plurality of collagen microfibers fabricated on a rotating frame and arranged in a continuous loop configuration, wherein the microfibers are substantially parallel to one another and spaced on average between about 100 to about 1000 microns with respect to each other;
the collagen microfibers are coated with a first biocompatible solution and a second biocompatible solution, the first and second biocompatible solutions being different from each other; and
wherein the scaffold construct has mechanical properties approximating or exceeding those of human musculoskeletal tissues.

3. A scaffold construct, comprising:
a plurality of collagen microfibers arranged in an organized configuration in a continuous loop,
wherein the microfibers are spaced on average between about 100 to about 1000 microns with respect to each other and have properties comparable to biological tissue;
wherein the collagen microfibers are coated with a first biocompatible hydrogel comprising fibrin gel and a second biocompatible hydrogel different from the first biocompatible hydrogel; and
wherein the first biocompatible hydrogel is formed by combining a first biocompatible solution with a second biocompatible solution during fabrication.

* * * * *